United States Patent
Zhang

(10) Patent No.: US 12,417,214 B1
(45) Date of Patent: Sep. 16, 2025

(54) SYSTEM AND METHOD FOR ADAPTIVE SEMANTIC PARSING AND STRUCTURED DATA TRANSFORMATION OF DIGITIZED DOCUMENTS

(71) Applicant: ALTHQ, INC., San Francisco, CA (US)

(72) Inventor: Mike Zhang, San Francisco, CA (US)

(73) Assignee: ALTHQ, INC., San Francisco, CA (US)

( * ) Notice: Subject to any disclaimer, the term of this patent is extended or adjusted under 35 U.S.C. 154(b) by 0 days.

(21) Appl. No.: 19/187,417

(22) Filed: Apr. 23, 2025

(51) Int. Cl.
*G06F 16/00* (2019.01)
*G06F 16/21* (2019.01)
*G06F 40/205* (2020.01)
*G06F 40/30* (2020.01)

(52) U.S. Cl.
CPC .......... *G06F 16/212* (2019.01); *G06F 40/205* (2020.01); *G06F 40/30* (2020.01)

(58) Field of Classification Search
CPC ......... G06F 16/21; G06F 40/205; G06F 40/30
See application file for complete search history.

(56) References Cited

U.S. PATENT DOCUMENTS

| | | | |
|---|---|---|---|
| 2004/0236805 A1* | 11/2004 | Gordon | G06F 16/345 |
| 2005/0289182 A1* | 12/2005 | Pandian | G06Q 10/10 |
| 2014/0214503 A1* | 7/2014 | Chircorian | G06Q 10/10 726/28 |
| 2018/0191686 A1* | 7/2018 | Ghafourifar | H04L 9/14 |

* cited by examiner

*Primary Examiner* — Yicun Wu
(74) *Attorney, Agent, or Firm* — Outlier Patent Attorneys, PLLC

(57) ABSTRACT

A computing system is disclosed for transforming document data into schema-conformant structured outputs. The system obtains document data comprising multi-format structured documents and classifies each document by type and class using vector-based modeling and structural feature analysis. An extraction configuration is selected for each document, the configuration comprising machine-executable instructions for parsing based on semantic and layout characteristics. The system extracts semantic data using structured inference, transforms the semantic data into schema-conformant outputs, and validates the outputs using temporal and domain-specific constraints. Validated structured data may be used for downstream processing, visualizations, or optimization based on performance metrics.

20 Claims, 14 Drawing Sheets

SYSTEM AND METHOD FOR ADAPTIVE SEMANTIC PARSING AND STRUCTURED DATA TRANSFORMATION OF DIGITIZED DOCUMENTS

FIELD OF THE ART

The systems and methods disclosed herein relate generally to data processing systems and, more specifically, to systems and methods for adaptive semantic parsing, dynamic document classification, and structured data transformation from digitized documents.

BACKGROUND

Businesses and organizations commonly process large volumes of digitized documents that vary significantly in format, structure, and quality. These digitized documents typically include scanned images, compressed PDFs, layered documents, and various unstructured or semi-structured files. Conventional methods for processing these documents often involve manual classification, extraction of relevant data, and subsequent normalization into structured datasets. Such manual processing is inherently slow, resource-intensive, prone to errors, and unable to efficiently handle high document volumes or diverse data types.

Existing automated solutions for digitized document processing commonly rely on predefined templates or static field-mapping approaches. These systems require extensive manual intervention to create, manage, and update templates whenever document formats or structures change. For example, certain conventional approaches involve manual definition of bounding-boxes (e.g., coordinate-based outlines) to identify fields within documents, a process that becomes inefficient and impractical as document variability increases.

Another technical limitation of conventional document processing systems is their reliance on spatial or positional information (e.g., coordinates of data fields) to perform data extraction. This reliance results in limited adaptability when encountering documents with varying formats or when dealing with text that shifts position due to watermarking, compression artifacts, or OCR-based scanning processes. Consequently, these methods frequently fail to reliably extract data from multi-page, multi-format documents, and in documents that do not conform to strict structural templates or that have been altered by common digitization processes.

Moreover, existing document processing systems generally lack robust mechanisms to dynamically resolve entity inconsistencies, such as variations in entity naming conventions, aliases, or subtle typographical discrepancies. Without dynamic and automated entity resolution capabilities, downstream data management and analysis become increasingly inaccurate and labor-intensive, requiring significant manual corrections and reconciliation.

Additionally, most existing automated systems do not adequately address the need for maintaining temporal consistency and accuracy across multiple reporting periods or document sequences. Financial and operational data contained within digitized documents frequently requires complex cross-validation, detection of nested transactions, and reconciliation of inconsistent or missing data points. Current automated approaches typically lack effective mechanisms to handle these complexities, resulting in incomplete, inconsistent, or erroneous datasets.

Furthermore, automated data extraction queries used in conventional document processing systems are typically static, unable to dynamically adapt or refine themselves based on historical performance metrics or evolving data characteristics. This rigidity limits extraction accuracy and consistency over time, necessitating manual intervention or periodic manual updates to queries and extraction rules.

Accordingly, there remains a need for systems and methods that address the technical limitations of current document processing systems.

SUMMARY

Systems and methods in accordance with the embodiments described herein address technical limitations in traditional digitized document ingestion, data extraction, entity reconciliation, and temporal data validation. In particular, embodiments described herein provide adaptive semantic parsing systems operable to classify and extract content from digitized documents using vector-based language models, reconcile entity discrepancies across time, validate extracted information against historical data, and iteratively optimize extraction workflows based on prior performance.

For example, embodiments ingest digitized documents from diverse sources, including PDFs (structured or unstructured, compressed or layered), scanned images, and OCR-converted financial records. These documents are classified using vector-based semantic parsing that evaluates the meaning of extracted text rather than relying on positional layout or templates. In an embodiment, classification includes identifying the document type (e.g., capital account statement, capital call notice), associating a document class (e.g., hedge fund, private equity), and selecting an appropriate data extraction blueprint based on semantic attributes.

After classification, embodiments disclosed herein perform semantic parsing to extract raw text content while preserving document metadata. Contextual interpretation methods analyze extracted terms and determine appropriate field mappings. For instance, the system distinguishes between similar terms such as net asset value and capital account balance, dynamically assigning the correct field representations based on the surrounding language and document class.

The extracted data can be converted into structured representations through multi-step document mapping. These representations are aligned with predefined schemas, and normalization logic is applied to classify and label temporally-distinctive data points such as inception-to-date versus year-to-date values. The system also determines and models one-to-one, one-to-many, and many-to-many relationships between entities and documents, supporting polymorphic document association and multi-entity data normalization.

In accordance with various embodiments, the system may distinguish between entity extraction and entity resolution, which can operate concurrently during the data transformation process. In an embodiment, entity extraction can refer to the identification and parsing of references to entities (e.g., fund names, investor names, management firms) present in the document text. This process can leverage the semantic parsing capabilities of the system, including blueprint-guided prompts and transformer-based language models, to recognize relevant terms in context and assign provisional field labels.

In an embodiment, entity resolution can refer to the mapping of extracted references to canonical entities, which may be stored in a user-defined or system-maintained resolution database. Resolution logic can incorporate fuzzy matching, user-configured aliases, and external reference registries. In certain embodiments, a configurable feedback layer enables users to define which entity references are treated as authoritative across reporting periods and document sets.

In accordance with various embodiments, the extraction and resolution processes can operate in parallel or in interleaved stages. For example, candidate entities identified during extraction may be evaluated against previously resolved mappings or anchored to known entities, influencing resolution in real time. Likewise, ongoing resolution activity may inform subsequent extraction logic as new document content is encountered. This flexible coordination supports accurate normalization across complex naming patterns and fund structures.

A dynamic entity resolution engine is operable to reconcile entity discrepancies across documents. This includes detecting minor variations in entity names and applying direct or fuzzy matching techniques to determine canonical entity representations. Alias detection and temporal tracking are used to ensure consistency across historical reporting periods.

Embodiments validate structured data by analyzing relationships across time-based reporting intervals. This includes automatically applying logic to infer missing periods, cross-referencing inception-to-date calculations with prior data, detecting inconsistencies, and reconciling multiple sub-transactions such as nested transactions within capital calls. The validation process supports accurate reconstruction of financial records even when documents are missing, incomplete, or contain both aggregate and nested data points.

The system also tracks temporal consistency by comparing values across quarterly, annual, and inception-to-date reporting periods, detecting informational gaps, duplicate data points, or anomalies using automated techniques. When discrepancies are found, inferred corrections are applied based on historical patterns and structured rules.

In certain embodiments, the system is operable to detect when fields expected to persist across reporting periods are unintentionally omitted due to document sparsity or formatting variations. For example, when a structured field previously extracted and validated in a prior period is not present in a subsequent record—and no intervening activity or transactional data suggests a change—the system may flag the absence as a potential anomaly. This evaluation is based on continuity expectations derived from prior extraction lineage, field-level metadata, and domain-specific schema rules. These omissions may indicate missed carry-forward inferences or blueprint execution edge cases. Detected anomalies are logged with contextual metadata, enabling corrective processing such as blueprint adjustment or re-application of inference logic, thereby supporting machine-level detection and recovery from structured data sparsity conditions.

Embodiments further include adaptive query optimization processes. These components monitor performance and accuracy of prior extractions and automatically refine classification and extraction prompts. This refinement allows the system to improve over time, adapting to new document formats, language variations, and fund-specific terminologies without manual reprogramming.

Advantageously, the disclosed systems improve the technical field of digitized document data processing by replacing template-based extraction and manual field mapping with semantic classification and extraction techniques. The system avoids rigid dependencies on visual layouts and enables scalable ingestion of documents with diverse structures.

Further, dynamic entity resolution reduces manual review and reconciliation efforts by automatically detecting and correcting inconsistent naming across time and document sets.

Further still, temporal validation logic detects inconsistencies and performs inferred corrections using previously extracted values, which enhances downstream data reliability and enables automated analytics on incomplete data sets.

Further yet, adaptive query refinement improves future extraction accuracy by analyzing and learning from prior outcomes, resulting in workflows that evolve with each ingestion cycle.

Additionally, the system reduces the need for dedicated template development and manual validation processes, enabling greater throughput and lowering processing latency without sacrificing accuracy.

Embodiments output structured data in formats such as CSV, JSON, or SQL for use with downstream reporting platforms, analytics tools, or integration pipelines, allowing seamless interoperability with external systems.

Further still, the system architecture supports hybrid deployment models combining cloud-based inference engines with on-premise preprocessing or validation layers. This supports dynamic resource allocation and ensures processing scalability across various environments.

As used herein, the term "digitized documents" refers to electronic files obtained from various sources, including scanned paper records, PDF exports, layered print streams, and other unstructured document formats. "Semantic parsing" refers to algorithms operable to identify meaning, context, and relationships within textual content. "Structured data" refers to logically mapped and normalized data representations suitable for integration into analytics or reporting workflows.

As further used herein, the term "structured inference instructions" is intended to encompass any form of guided model directive—whether referred to as "model query instructions," "domain-specific extraction directives," "parameterized inference requests," "context-aware machine-learning queries," or any other functionally equivalent terminology used in connection with instructing a machine-learning process. These terms generally include any data, rules, parameters, or operational context provided to a model to facilitate inference, extraction, classification, or analysis within the scope of the present disclosure.

Further still, the term "model-based inference" is intended to encompass any form of machine-learning-based, neural-network-based, deep-learning-based, or otherwise algorithmically enabled process—whether referred to as "ML-based," "intelligent computing," "automated intelligence," or any other functionally equivalent terminology. These expressions broadly include systems that apply predictive modeling, statistical inference, or adaptive algorithms to carry out data processing, classification, extraction, or analysis within the scope of the present disclosure.

Although described in connection with fund reporting and investment documentation, the disclosed systems and methods may be adapted for use in technical domains such as healthcare, logistics, compliance, insurance, and supply chain operations, where extraction of structured content from unstructured documents is required.

Various other functions and embodiments are described and suggested below as may be provided in accordance with the various embodiments.

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

Figure 1A:
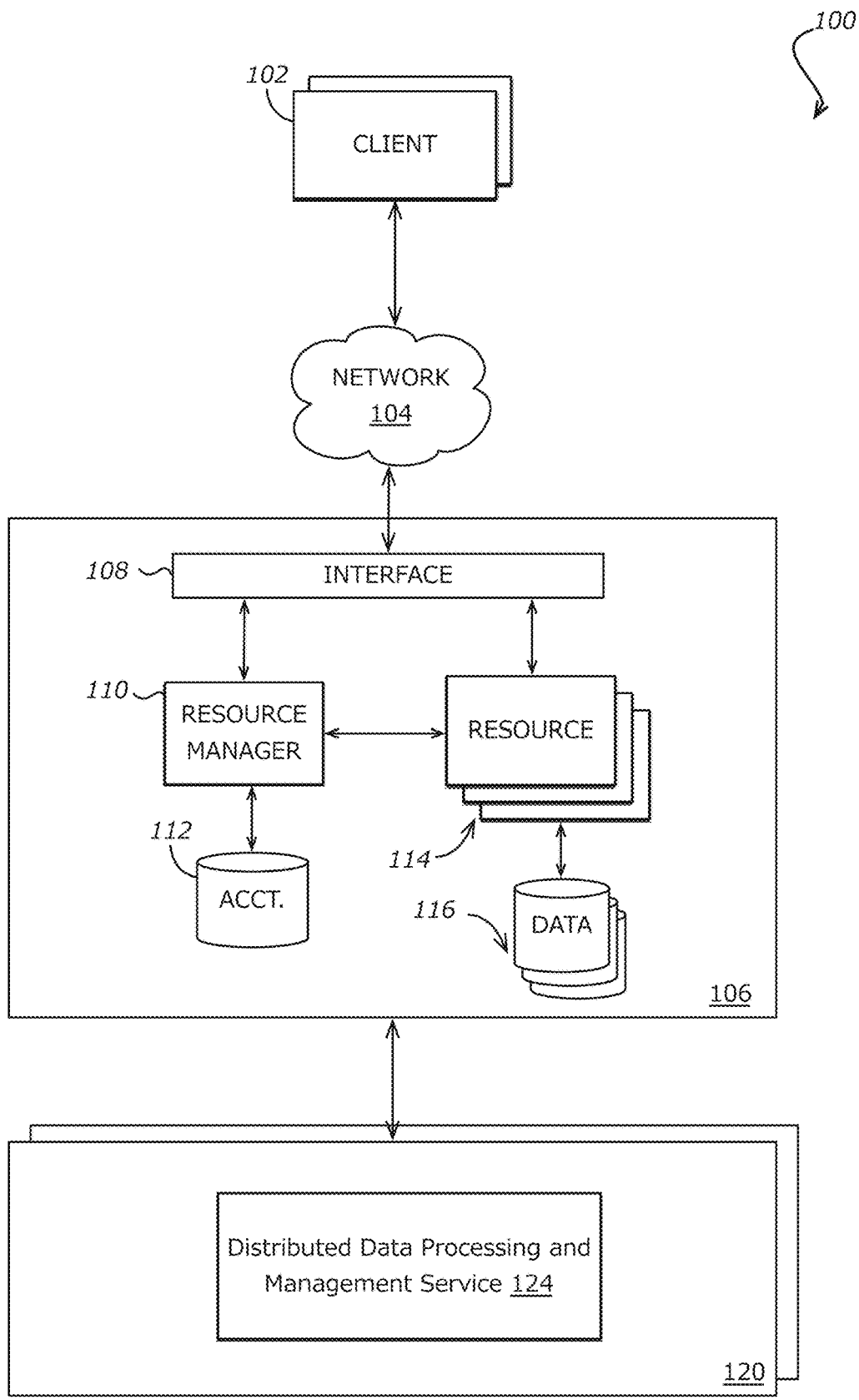
FIG. 1A illustrates an example environment in which aspects of the various embodiments can be implemented.

The embodiments described herein relate to systems and methods for adaptive semantic parsing and structured data transformation of digitized documents. The system is operable to ingest unstructured document data from multiple sources, apply model-based inference for classification and extraction, validate semantic integrity, reconcile entities dynamically, and generate structured outputs for downstream processes. In various embodiments, the system includes components for document ingestion and preprocessing, data processing and transformation, data validation and integrity, and adaptive query execution—thus enabling automated, scalable, and accurate parsing of diverse document types. The system processes digitized documents (such as PDFs, scanned images, or OCR outputs), applies domain-specific modeling, iterative refinement instructions, and entity resolution to extract and normalize key fields, and executes semantic parsing and transformation based on real-time document characteristics and historical performance metrics. In certain embodiments, the system integrates machine-learning techniques, anomaly detection engines, and multi-interval reconciliation, ensuring a computationally efficient, robust, and extensible framework for converting unstructured data into high-fidelity structured formats without relying on fixed positional templates.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conceptual Architecture

FIG. 1A illustrates an example environment 100 in which aspects of the various embodiments can be implemented. It should be understood that reference numbers are carried over between figures for similar components for purposes of simplicity of explanation, but such usage should not be construed as a limitation on the various embodiments unless otherwise stated.

In this example, a user can utilize a client device 102 to communicate across at least one network 104 with a resource provider environment 106. The client device 102 can include any appropriate electronic device operable to send and receive requests or other such information over an appropriate network, and to convey information back to a user of the device. Examples of such client devices 102 include personal computers, tablet computers, smartphones, and notebook computers. The user can include a person or entity authorized to manage various aspects of the resource provider environment.

The networks 104 may comprise a variety of forms, such as intranets, the internet, cellular networks, or local area networks (LANs). These networks facilitate communication through both wired and wireless means, enabling the client device 102 to interact with remote systems for the purposes of ingesting and transforming unstructured data. The scope and reliability of the networks may further support distributed operation of a data processing service 124, as well as other related systems or components, which may themselves be distributed across various servers, regions, or data centers.

The resource provider environment 106 includes a distributed data processing and management service 124, configured to implement adaptive semantic parsing and structured data transformation in a multi-tenant or dedicated resource model. This service 124 can receive digitized documents (e.g., PDFs, images, or OCR outputs) from various client devices or third-party sources, apply classification and extraction workflows, validate the resulting structured data, and provide outputs usable by downstream analytics or applications. The resource provider environment 106 can manage requests at scale, enabling automated ingestion, semantic parsing, data validation, and structured export without requiring users to maintain on-premises infrastructure.

In some embodiments, resource provider environment 106 can also include or interact with other services and components (e.g., a resource manager 110 or data store 112) for provisioning compute resources, storing ingestion and transformation results, or managing user credentials. These services may be hosted on multiple server computers and/or distributed across multiple systems. By implementing such a distributed model, the environment can dynamically scale to accommodate fluctuating loads, ensuring high availability and resilience. The resources, shown generally at 114 and 116, can include application servers, storage devices, or database systems that are allocated, reserved, or shared among various users. Each of these components can be instantiated, updated, or decommissioned based on usage demands.

The resource provider environment 106 may further include an interface layer 108 supporting APIs or other web service interfaces, enabling the client device 102 to submit ingestion jobs, retrieve transformed data, or configure extraction parameters. In many embodiments, this interface layer 108 can serve as the external entry point for customer-facing operations, handling authentication, request validation, throttling, and routing. A resource manager 110 can then ensure that appropriate credentials are valid and that account data is stored or updated in at least one data store 112. In this approach, the resource provider environment supports flexible deployment scenarios—ranging from purely cloud-based provisioning of the data processing service 124 to hybrid models in which parts of the service are deployed on-premises or in user-specific virtual networks.

In at least some embodiments, the host machine 120 may be configured to host a portion or entirety of the distributed data processing and management service 124. The service 124 can operate either directly within the resource provider environment 106 or in conjunction with other resource provider environments. This design facilitates specialized document ingestion, semantic extraction, and data validation across diverse user scenarios—such as large-scale enterprise content management or real-time data streams. In each scenario, the environment can dynamically allocate additional compute resources, data throughput, or storage to handle increased ingestion volumes.

In various embodiments, users or applications executing on client device 102 may subscribe to the distributed data processing and management service 124 to manage ingestion pipelines, retrieve analytics, or configure semantic extraction templates. The environment 106 can thus provide robust, multi-tenant APIs through interface layer 108, enabling straightforward integration of advanced document parsing functionality into user workflows. This architecture allows developers to leverage the provider environment's elasticity and high availability, while freeing them from the complexities of building and maintaining an on-premises solution.

One or more data stores 112, 116, or other repositories in resource provider environment 106 may retain configuration information, job status, extracted datasets, or logs of processed documents. Additional resource-sharing techniques, such as ephemeral compute instances or horizontally scaled container clusters, may be employed to ensure the system can handle varying levels of operational demand. Consequently, the distributed data processing and management service 124 remains responsive to the real-time needs of different tenant accounts, applications, or specialized workflows, while preserving data isolation, security, and compliance.

The resource provider environment 106 can also incorporate features such as role-based access control, encryption at rest or in transit, and multi-factor authentication to secure access to the service 124. Requests that originate from client device 102 can be routed through the interface layer 108, validated against resource manager 110 for user permissions, then orchestrated or distributed across multiple back-end server clusters to perform the ingestion, classification, transformation, and validation tasks. Through these processes, the environment 106 delivers an automated, scalable service for adaptive semantic parsing and structured data transformation of digitized documents.

In this manner, FIG. 1A exemplifies a model where client devices 102 communicate over networks 104 with a resource provider environment 106 hosting a distributed data processing and management service 124. This approach supports end-to-end ingestion, parsing, validation, and transformation of document data, illustrating how the system can be offered as a managed service with underlying resources and infrastructure abstracted from the end user.

Figure 1B:
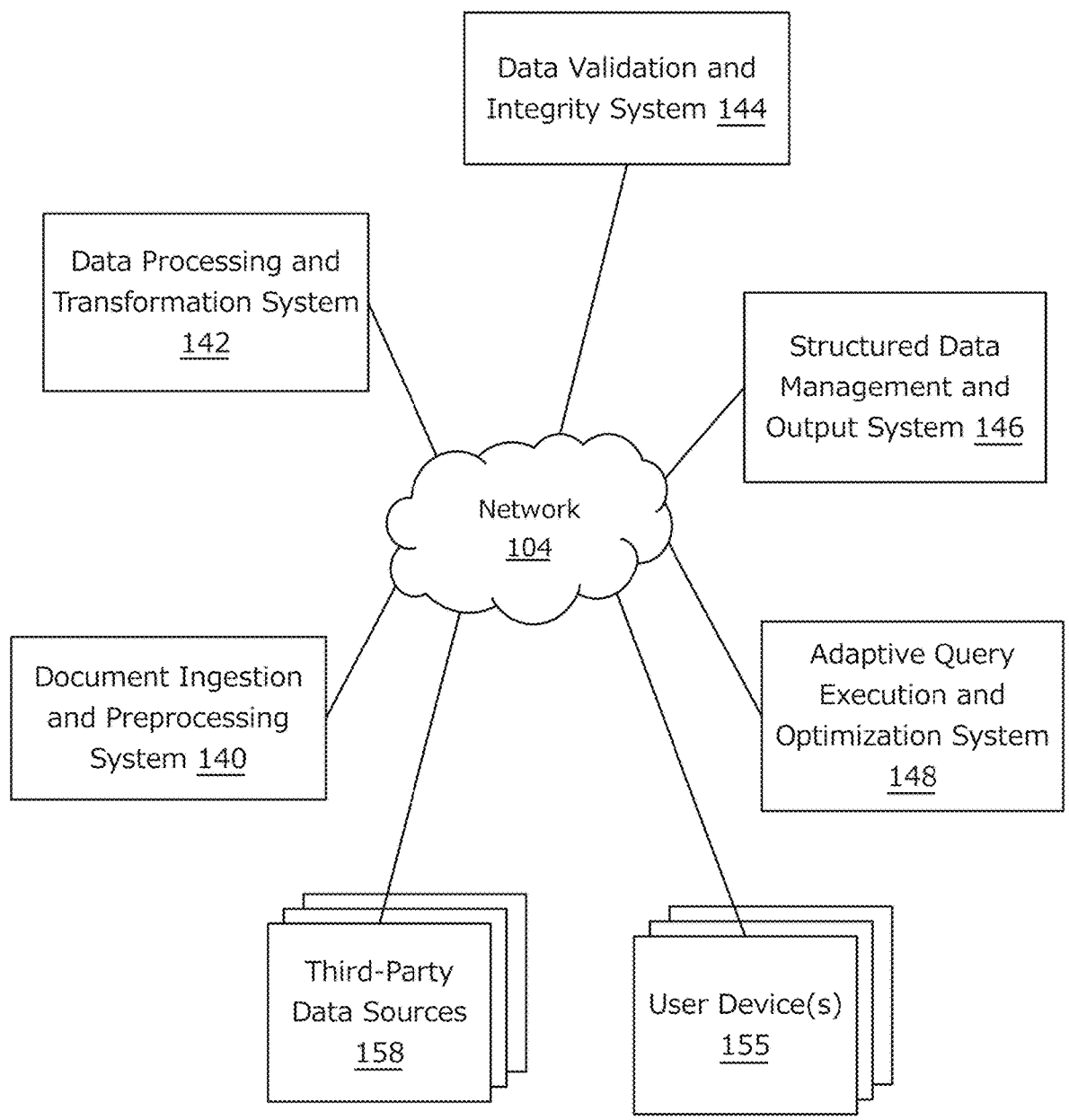
FIG. 1B illustrates an exemplary embodiment of a system architecture for adaptive semantic parsing and structured data transformation, in accordance with various embodiments.

FIG. 1B illustrates an exemplary embodiment of a system architecture for adaptive semantic parsing and structured data transformation, in accordance with various embodiments, as shown, the system includes document ingestion and preprocessing system 140, data processing and transformation system 142, data validation and integrity system 144, structured data management and output system 146, adaptive query execution and optimization system 148, user device(s) 155, and third-party data sources 158, and a network 104, over which the various systems and devices communicate and interact.

The various components described herein are exemplary and for illustration purposes only and any combination or subcombination of the various components may be used as would be apparent to one of ordinary skill in the art. Other systems, interfaces, modules, engines, databases, and the like, may be used, as would be readily understood by a person of ordinary skill in the art, without departing from the scope of the invention. Any system, interface, module, engine, database, and the like may be divided into a plurality of such elements for achieving the same function without departing from the scope of the invention. Any system, interface, module, engine, database, and the like may be combined or consolidated into fewer of such elements for achieving the same function without departing from the scope of the invention. All functions of the components discussed herein may be initiated manually or may be automatically initiated when the criteria necessary to trigger action have been met.

Document ingestion and preprocessing system 140 is operable to accept diverse document formats—including unstructured or semi-structured PDFs, scanned images, and compressed or layered documents—from user device(s) 155, third-party data sources 158, or other repositories. Upon receiving a new document, system 140 applies an adaptive document recognition process that leverages semantic meaning-based techniques, bypassing reliance on fixed spatial templates or bounding boxes. In particular, the system can (i) analyze textual and metadata cues to determine the document type (e.g., capital account statement, stock purchase agreement), (ii) classify the document for domain-specific handling (e.g., hedge fund vs. private equity), and (iii) select the appropriate extraction blueprint for structured field mapping.

As part of its preprocessing workflow, document ingestion and preprocessing system 140 may remove or flag overlaid text watermarks, flatten layered PDFs, and resolve compression artifacts to ensure full data recovery. For instance, an embedded watermark detection module automates the identification of large diagonal text overlays or graphic layers, thereby mitigating noise before passing extracted content to data processing and transformation system 142. Additionally, the system's semantic extraction mechanism is designed to handle financial documents—like LPAs, SPAs, or capital call notices—in a template-free manner by interpreting textual meaning in context, rather than relying on bounding-box solutions or template-driven approaches that require extensive manual configuration.

In some embodiments, system 140 further includes an automated three-stage classification flow: (1) identify the general document category, (2) detect the financial or investment class, and (3) retrieve an appropriate "blueprint" that governs how data fields are mapped (e.g., interpreting "NAV" vs. "capital balance" consistently). This classification logic, combined with contextual metadata extraction (e.g., file creation date, potential compression layers), supports robust ingestion across multiple sources without imposing rigid, user-defined templates. Once the ingestion and high-level interpretation complete, the system generates a standardized payload that includes both normalized text layers and relevant metadata, and forwards this payload to data processing and transformation system 142 for subsequent extraction, validation, and transformation.

Figure 2:
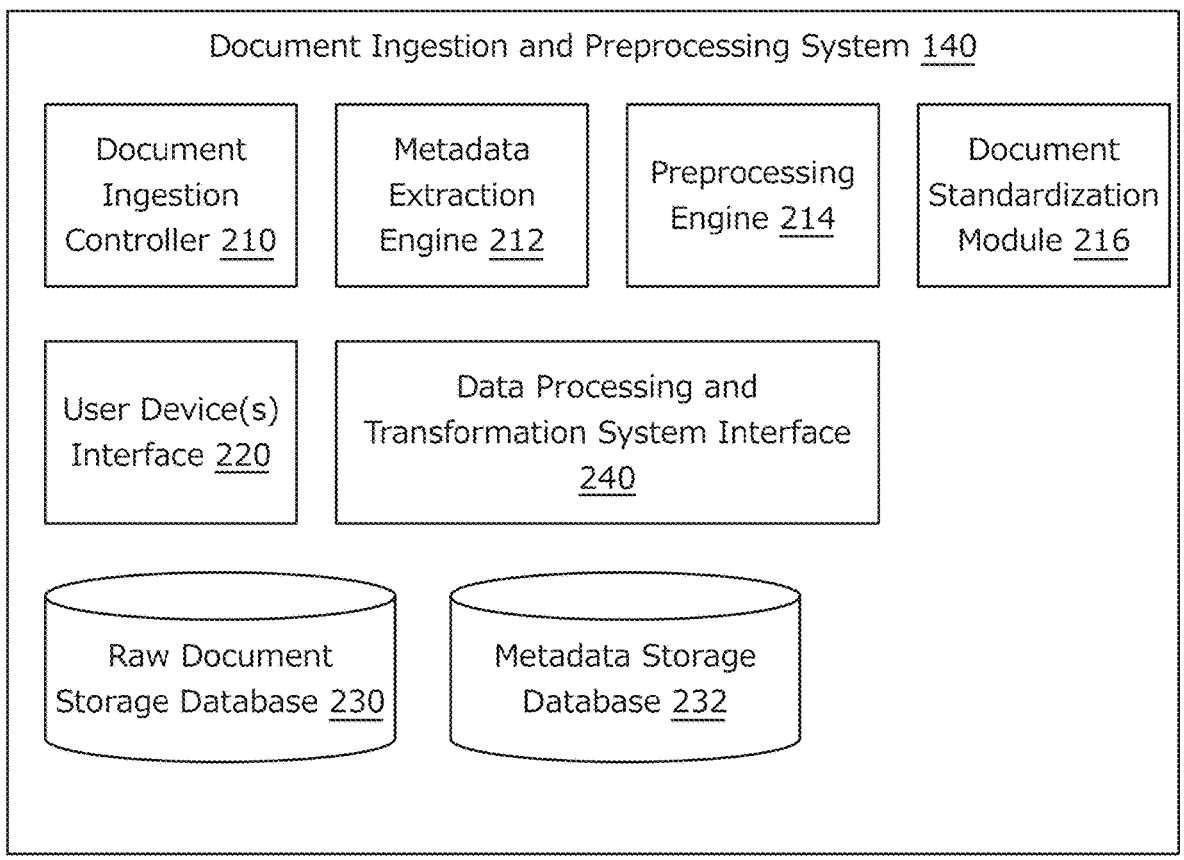
FIG. 2 illustrates a document ingestion and preprocessing system, in accordance with various embodiments.

As shown in FIG. 2, document ingestion and preprocessing system 140 can be subdivided into an ingestion controller for orchestrating multi-source file intake, a metadata extraction engine to parse relevant information (e.g., PDF tags, embedded OCR layers, or scannable image text), and a semantic classification module that assigns each document to the correct processing path. These subcomponents operate in an automated, event-driven fashion, eliminating the need for manual bounding-box labeling or file-specific templates. In certain optional embodiments, the system may skip certain modules—such as watermark removal—if either the user configuration so dictates or if the document has previously undergone partial preprocessing.

In accordance with various embodiments, document ingestion and preprocessing system 140 provides the foundational intake layer for the entire platform. By fusing semantic-based classification, watermark/compression remediation, and dynamic blueprint assignment, the system ensures that subsequent transformation, validation, and model-based inference extraction steps (i) receive a uniformly standardized document representation and (ii) remain robust across a wide array of financial and legal document classes.

Data processing and transformation system 142 receives the standardized payload from document ingestion and preprocessing system 140, carrying both normalized text data and relevant metadata. In certain embodiments, system 142 applies an iterative model-based inference workflow—comprising classification, domain-specific extraction, normalization, and validation—to convert unstructured or semi-structured data into structured, analytics-ready outputs. By leveraging the previously assigned "blueprint" (e.g., for hedge funds, private equity, or real estate structures), system 142 ensures that each document's key financial fields (e.g., contributions, distributions, capital account balances) are interpreted consistently according to the underlying domain rules.

In one example implementation, data processing and transformation system 142 uses a multi-step semantic extraction engine to identify specific data elements (e.g., year-to-date contributions, recallable distributions) without relying on fixed bounding boxes. This template-free approach enables the system to parse data within paragraphs, tabular sections, or embedded footnotes, regardless of layout variations. In contrast to traditional, template-based solutions, the semantic extraction mechanism in system 142 adapts dynamically to new or updated document formats by focusing on contextual meaning—for instance, recognizing "unfunded capital" even if presented under alternate terminology such as "remaining commitment."

Following extraction, data processing and transformation system 142 performs accounting-based consistency checks, reconciling each quarter's or period's reported values against multiple document types. For example, if the cumulative distributions extracted from a capital account statement exceed the sum of all composite distribution values extracted from individual distribution notices, system 142 automatically flags the relevant entry for manual review or applies advanced logic to infer missing or unaccounted-for distribution records. In some embodiments, the system's entity-resolution subcomponent employs alias matching to unify variations in fund or investor naming (e.g., "Western Growth Partners Fund II, L.P." vs. "Western Growth Partners II"), thereby minimizing data duplication and ensuring a single canonical record.

Data normalization sub-routines within system 142 align differing reporting styles—such as funds that supply only year-to-date figures versus those providing inception-to-date ledgers—by standardizing reported values into a coherent format. For instance, distribution documents may present a single net-distribution figure (accounting for fees, tax withholdings, recallable offsets, or simultaneous capital calls), whereas a capital account statement might reflect separate line items tracking the cumulative balances for each sub-transaction type. In such scenarios, system 142 applies blueprint-guided parsing and domain-specific normalization logic to decompose consolidated distribution transactions into constituent inflows and outflows. This approach yields a standardized ledger that reconciles net-reported distribution values with accrual-based capital account entries reported on a gross basis, thereby enabling precise extraction and allocation of fees, carried interest calculations, and tax obligations without reliance on rigid templates or manual calculation and reclassification.

In certain embodiments, system 142 may also incorporate specialized structured inference instructions optimized for particular fund types or asset classes. These instructions can direct the model-based inference engine to seek domain-specific attributes—such as "management fee offsets" in private equity statements—while ignoring irrelevant or redundant data. As the system encounters new terminology or document layouts, a dynamic, model-driven approach utilizing language models capable of semantic similarity automatically refines or optimizes extraction instructions in near real time, maintaining high accuracy without requiring a rigid template definition or vast catalogs of manually-updated templates. This reduces domain-expert overhead, since the system does not rely on creating and maintaining an expanding library of narrowly-defined templates for every document variant, thereby offering a scalable and adaptable solution as new data expressions or layouts emerge.

In accordance with various embodiments, by uniting semantic extraction, validation, alias resolution, and normalization, data processing and transformation system 142 delivers a clean, consistent data layer that feeds portfolio analytics, risk dashboards, or downstream accounting modules. The structured output can be made accessible via an API, a direct database feed, or a configurable export (e.g., CSV, JSON), allowing investment advisors, wealth managers, family offices, or specialized finance and accounting professionals to seamlessly integrate the newly transformed data into existing workflows. Data processing and transformation system 142 will be described in further detail with reference to FIG. 3.

Data validation and integrity system 144 is operable to perform consistency checks and reconcile extracted data across multiple time periods and document types. Referring to FIG. 1B, and described further in FIG. 4, system 144 ensures that the structured outputs generated by data processing and transformation system 142 accurately reflect all reported contributions, distributions, and valuations. By leveraging domain-specific accounting logic and temporally-aware balance roll-forward computation algorithms, system 144 confirms that new capital account balances reported accurately reflect the effect of capital activity (e.g., contributions or distributions) on the relevant prior-period reported balances.

More specifically, data validation and integrity system 144 enforces multi-period integrity by comparing inception-to-date and year-to-date totals, identifying any discrepancies in reported balances. For example, when the system detects an increase in the value of cumulative distributions between two consecutive statements without the presence of transactions which would adequately explain such an increase, it flags the entry for deeper analysis or human review. In one embodiment, nested transactions (such as a distribution embedded within a capital call) are parsed and traced, ensuring that offset amounts, fee accruals, or recallable proceeds are reflected accurately. Where partial or missing statements are discovered, the system may apply bridging logic-either inferring zero net activity for the absent period or prompting the user to provide the missing document for a more precise recalculation.

In certain implementations, data validation and integrity system 144 further manages entity-level consistency. As multiple references to a single fund or investor may vary in name format (e.g., "XYZ Partners, LP" vs. "XYZ Partners L.P."), the system's alias-based resolution engine unifies records under a canonical identifier. This enables the system to detect, for instance, when the same fund is disclosed under slightly different naming conventions across distinct reporting periods. Conflicting entries or obviously duplicate statements are reconciled by comparing extracted numeric fields, revision timestamps, or embedded metadata, after which system 144 retains the most complete or updated version and discards superfluous or outdated records.

Still further, data validation and integrity system 144 can escalate low-confidence or anomalous data points to an exception-handling workflow. In some embodiments, the system re-runs structured inference instructions in response to ambiguous entries, dynamically routing such entries to alternate computational workflows designed to resolve such exceptions programmatically (e.g., documents with structural or data sparsity issues). If repeated discrepancies persist, the system may queue a manual review by an authorized user, displaying contextual clues—such as the relevant page, paragraph, or figure from the original document—to facilitate rapid, targeted verification. After successful resolution, any confirmed corrections feed back into the system's domain-specific intelligence models, enhancing future validation runs and reducing the need for repetitive manual checks.

In certain embodiments, by combining automated reconciliation, temporal alignment, and alias-based name matching, data validation and integrity system 144 provides a high-integrity data layer for downstream analytics and reporting. Whether interfacing with external APIs, generating consolidated family office reporting statements, or feeding performance metrics into a risk assessment module, system 144 supplies only integrity-verified data. This robust validation approach, integrated with the upstream ingestion and transformation components, delivers end-to-end accuracy and reliability in handling complex financial disclosures—without relying on fixed positional templates or exhaustive manual checks.

Structured Data Management and Output System 146 is operable to organize, store, and distribute the integrity-verified information produced by data validation and integrity system 144. In certain embodiments, system 146 receives normalized records—such as investor allocations, inception-to-date contributions, net asset values, or other extracted financial metrics—and structures these records within a unified data repository to enable quick searching, sorting, and retrieval. By aligning each entry with a consistent database schema, system 146 ensures that downstream processes—whether analytics, reporting, or further model-based inference evaluations—consume data that is internally consistent and easily indexed.

More specifically, structured data management and output system 146 may incorporate one or more schema enforcement modules to validate incoming records against domain-specific formats (e.g., private equity fund schemas, hedge fund schemas). Any material deviations from the expected schema (for instance, missing time periods, incomplete entity references, or unrecognized transaction types) are flagged for review, thus preventing downstream modules from ingesting incomplete or misaligned data. In certain implementations, system 146 further includes a version-control mechanism that preserves historical snapshots of the dataset. If, for example, an amended capital account statement is received after a reporting cycle closes, the system updates only the specific data fields in need of revision, retaining earlier states for auditing or compliance.

Additionally, structured data management and output system 146 may provide one or more output gateways through which validated records are automatically published to reporting tools, wealth management platforms, or third-party APIs. In some embodiments, these gateways can generate batch exports or real-time data feeds in multiple formats (e.g., CSV, JSON, SQL), enabling effortless integration with common financial software. This output logic can also incorporate user-defined schedules or event triggers so that newly ingested documents—once cleared by data validation and integrity system 144—instantly propagate to relevant stakeholders.

In accordance with various embodiments, by furnishing a standardized, high-fidelity data layer, structured data management and output system 146 underpins automated portfolio analytics, consolidated investor reporting, and other essential platform features. Coupled with the upstream ingestion and validation steps, system 146 ensures that users receive coherent, query-ready data without manual intervention or reliance on rigid, template-bound techniques. Structured data management and output system 146 will be described in further detail with reference to FIG. 5.

Adaptive query execution and optimization system 148 is operable to orchestrate and refine the structured inference instructions issued to the underlying inference engines, thereby ensuring that each query—whether for classification, data extraction, or entity resolution—runs efficiently and accurately. In various embodiments, adaptive query execution and optimization system 148 governs how data processing and transformation system 142 and data validation and integrity system 144 route requests among multiple model-based inference modules (e.g., large language models, vector-based similarity searches, or domain-specific extraction engines). By continuously monitoring performance indicators (e.g., confidence scores, prompt efficacy, or computational efficiency), adaptive query execution and optimization system 148 can adapt both the content of these structured inference instructions and the selection of AI models over time.

More specifically, adaptive query execution and optimization system 148 may employ a multi-stage workflow to optimize how queries interact with domain-specific extraction dictionaries, alias engines, and caching mechanisms. In some implementations, the system pre-processes each request by attaching relevant metadata—such as the recognized document class or detected fund type—to the structured inference instruction. By doing so, system 148 enables a more targeted extraction strategy (e.g., focusing on synonyms for "inception-to-date contributions" vs. "total funded" for a private equity statement). If an initial inference attempt produces low-confidence values or misses critical fields, system 148 can refine the instruction set, add supplementary synonyms from domain-specific dictionaries, or switch to an alternate AI model capable of parsing nuances in financial terminology.

In certain embodiments, adaptive query execution and optimization system 148 orchestrates requests in parallel for unusually lengthy or intricate documents. For instance, a multi-section limited partnership agreement (LPA) may be partitioned into discrete segments—one for management fees, another for distribution waterfalls, and another for governance structure and terms. System 148 can dispatch these segments to different model instances for faster processing, then reconcile the extracted fields once each segment completes. Conversely, if sequential analysis is required (e.g., context-building across consecutive paragraphs or spanning multiple pages), system 148 coordinates the inference calls to preserve continuity of meaning.

As part of its optimization logic, adaptive query execution and optimization system 148 may implement model confidence aggregation and re-try logic. If key terms (e.g., "carried interest," "management fee offsets," or "capital calls") are not extracted above a certain confidence threshold, system 148 can initiate a corrective sequence by augmenting the prompts or switching model providers. In certain higher-tier implementations, the system monitors real-time cost metrics for each model call, enabling high-sensitivity extraction requests (e.g., imminent capital call documents with an acceptable fault tolerance of zero) to receive priority on more capable reasoning models that are more resource-intensive. Through these adaptive techniques, system 148 ensures that structured inference instructions remain accurate and cost-effective, while integrating with preceding and subsequent modules in FIG. 1B and avoiding the need for complex, manual template configuration processes. Adaptive query execution and optimization system 148 will be described in further detail with reference to FIG. 6.

User device(s) 155 include, generally, any computer or computing device having the capability to communicate over network 104, such that a user may interact with the systems described herein. Data may be collected from user device(s) 155, and data requests may be initiated from each user device 155. By way of example, a user device 155 may be a server, a desktop computer, a laptop computer, a personal digital assistant (PDA), an in-vehicle or handheld navigation system, a smartphone or cellular phone, or a mobile gaming device. Each user device 155 may execute one or more applications—such as a web browser or dedicated software—to submit digital documents, initiate extraction tasks, or retrieve structured data from downstream systems over the network 104.

In particular embodiments, each user device 155 is an electronic device incorporating hardware, software, embedded logic components, or a combination thereof, to carry out the functions described or supported by user device 155. For instance, a user device 155 may be a desktop computer system, notebook computer system, netbook computer system, handheld electronic device, or a mobile telephone. The present disclosure contemplates any suitable form of user device 155. A user device 155 may enable a remote or local user to access network 104 and, in some implementations, interface with document ingestion and preprocessing system 140, data processing and transformation system 142, or other modules discussed herein.

User device 155 may include a web browser (e.g., MICROSOFT INTERNET EXPLORER, GOOGLE CHROME, MOZILLA FIREFOX) with or without various add-ons, plug-ins, or extensions (e.g., a toolbar). A user device 155 may enable a user to enter a Uniform Resource Locator (URL) or other address directing the web browser to a server, whereupon the user device 155 may generate a Hyper Text Transfer Protocol (HTTP) request for the server. The server can respond with one or more Hyper Text Markup Language (HTML) files, which the user device 155 may render for display to the user. The present disclosure contemplates the use of various suitable web technologies, including HTML, XHTML, XML, JAVASCRIPT, JAVA, MICROSOFT SILVERLIGHT, AJAX, or other comparable technologies.

In some embodiments, user device 155 may host an application installed locally, allowing the user to upload unstructured or semi-structured financial documents, retrieve structured outputs, or visualize extracted data fields. The application may obtain data from network 104 and display it within a dedicated interface, streamlining interactions with the inventive systems.

Any suitable number of user devices 155 may be employed, and they may take any appropriate physical form. Examples include but are not limited to an embedded computer system, a system-on-chip (SoC), a single-board computer (SBC), a desktop system, a laptop or notebook system, a mobile phone, a personal digital assistant (PDA), a server, or any combination thereof. In certain scenarios, user device(s) 155 may be geographically distributed, reside in a cloud environment, or operate in real time or batch mode. One or more steps or methods described herein may be performed partially or wholly by one or more user devices 155 at different times, or at different locations, depending on system requirements.

Third-party data sources 158 include any external systems, repositories, or platforms that supply raw or partially processed information to the systems described herein. In particular embodiments, third-party data sources 158 may consist of remote servers, cloud-hosted databases, investor portals, or fund administrator platforms, each storing unstructured or semi-structured documents (e.g., capital account statements, limited partnership agreements, certificates of incorporation). By integrating with such data sources, the inventive system can automatically retrieve relevant documents or metadata—such as valuation updates, investor notices, or capital activity records—without requiring manual uploads from user device(s) 155.

In some implementations, third-party data sources 158 provide direct data feeds over network 104, using secure file transfer protocols or application programming interfaces (APIs). For example, a private equity fund administrator might publish quarterly capital account statements to a secure portal, while a federated data platform for corporate documents may expose an API endpoint through which relevant valuation and performance data can be pulled. The system can periodically poll or subscribe to these channels, synchronizing newly available documents into the document ingestion and preprocessing system 140.

Third-party data sources 158 may employ diverse data formats (e.g., PDF, XML, JSON), varying compression schemes, or layered file structures. Accordingly, the present disclosure contemplates various integration strategies, such as metadata tagging, domain-specific adapters, or watermark and compression-layer detection—thereby enabling robust ingestion regardless of the file's origin. In certain embodiments, third-party data sources 158 may also maintain entity registries or investor account mappings that further enhance alias resolution and help unify naming conventions when documents arrive in system 140.

In accordance with various embodiments, by leveraging third-party data sources 158, the system gains access to an expanded corpus of financial materials, supporting a broader range of document types and domain-specific workflows. Combined with user device(s) 155 input, these external repositories ensure that users receive a comprehensive, real-time view of relevant statements, reports, and transactional data for subsequent transformation, validation, and integration.

Network 104 generally represents one or more interconnected networks (such as the Internet, a corporate intranet, or a combination thereof) over which the various components shown in FIG. 1B—such as user device(s) 155, third-party data sources 158, document ingestion and preprocessing system 140, data processing and transformation system 142, data validation and integrity system 144, structured data management and output system 146, and adaptive query execution and optimization system 148—communicate and interact. In particular embodiments, network 104 may be an intranet, an extranet, a virtual private network (VPN), a local area network (LAN), a wireless LAN (WLAN), a wide area network (WAN), a metropolitan area network (MAN), a portion of the Internet, or another network, or a combination of two or more such networks. One or more links couple the systems and storage resources described herein to network 104, with each link including one or more wired, wireless, or optical connections. The present disclosure contemplates any suitable network 104 and any suitable link for connecting the various systems and data repositories described herein.

Network 104 connects and enables the flow of unstructured financial documents, structured data outputs, inference instructions, and validation signals among the modules described in FIG. 1B. For instance, network 104 facilitates transmitting newly ingested PDFs or scanned images from third-party data sources 158 to document ingestion and preprocessing system 140, as well as enabling user device(s) 155 to retrieve processed outputs and analytics from structured data management and output system 146. In certain embodiments, data processing and transformation system 142 and adaptive query execution and optimization system 148 interact over network 104 to coordinate model-based inference, caching, or cost-aware scheduling.

One or more links connect these modules, allowing secure, real-time or batch-mode data transmission in configurations such as on-premises deployments, cloud-based environments, or hybrid setups. Each link may include any combination of wired Ethernet, Wi-Fi, cellular, or fiber-optic channels, depending on implementation requirements and performance considerations. In some implementations, network 104 also enables communication with ancillary components or databases—such as entity-alias registries or fund-schema repositories—thereby supporting the end-to-end life cycle of document ingestion, extraction, validation, and reporting.

In particular embodiments, each system may reside entirely on a unitary server or be distributed across multiple servers or datacenters. For example, certain resource-intensive tasks—such as large-language-model inference or vector-based classification—may be offloaded to a cloud environment via network 104, while local servers maintain real-time transactional data. Such a setup permits each subsystem to scale and adapt based on document volume, user concurrency, or analytic complexity, all while synchronizing seamlessly over network 104.

The system may also contain other subsystems and databases, not illustrated in FIG. 1B, but which would be readily apparent to a person of ordinary skill in the art. For example, the system may include additional databases for storing specialized blueprint configurations, extraction dictionaries, or user access policies, as well as interfaces for interacting with external software platforms such as wealth-management systems, accounting applications, or portfolio-monitoring tools. Other databases and subsystems may be added or removed as needed without departing from the scope of the invention.

FIG. 2 illustrates an example configuration of document ingestion and preprocessing system 140 in accordance with an exemplary embodiment of the present disclosure. In this example, document ingestion and preprocessing system 140 includes document ingestion controller 210, metadata extraction engine 212, preprocessing engine 214, document standardization module 216, user device(s) interface 220, raw document storage database 230, metadata storage database 232, and data processing and transformation system interface 240.

Document ingestion controller 210 is operable to coordinate the initial intake, scheduling, and queuing of digitized documents for subsequent processing within document ingestion and preprocessing system 140. In various embodiments, document ingestion controller 210 communicates with both user device(s) interface 220 and third-party data sources 158 (via network 104) to receive files in diverse formats (e.g., PDF, ZIP). By orchestrating multi-source inputs—such as investor portals, local file uploads, or automated system feeds—document ingestion controller 210 enforces standardized protocols for file submission, ensuring each incoming document is reliably captured and identified before entering the downstream modules.

More specifically, document ingestion controller 210 may manage parallel or distributed ingestion workflows. For example, when hundreds of document uploads arrive concurrently from different stakeholders (e.g., wealth managers, fund administrators, or end users), controller 210 maintains an ingestion queue, assigning computational resources or "workers" to each upload in real time with dynamic infrastructure auto-scaling to meet variable runtime resource demand. In certain embodiments, the system tracks partial or segmented file transfers, allowing large, compressed, or layered PDFs to be ingested without exceeding memory or bandwidth limits. By monitoring transfer integrity (e.g., through checksums or file-hash comparison), document ingestion controller 210 can automatically retry failed uploads or flag corrupted and duplicated files for manual review. This flexible queuing and error-handling process reduces bottlenecks and preserves the consistency of raw data.

In one implementation, document ingestion controller 210 maintains an internal event dispatcher or scheduler, which triggers specialized pre-check routines. These pre-checks may verify file properties like size, format or potential compression artifacts. Based on configurable workflows, the controller then initiates the document processing pipeline involving steps handled by engine 214 (e.g., for watermark-removal tasks) or metadata extraction engine 212 if no additional cleanup is warranted. Moreover, controller 210 can associate each document with initial metadata—such as upload timestamp, originating user device, or file source—to aid subsequent classification and transformation steps.

Still further, document ingestion controller 210 updates raw document storage database 230 with references to newly arrived files, while also creating an entry in metadata storage database 232 to record high-level attributes (e.g., source endpoint, fund or investor identifiers, or prior ingestion attempts). In certain embodiments, these steps are executed atomically to prevent orphaned references or mismatched document states. For example, if a file fails integrity checks midway through ingestion, controller 210 rolls back its database entries, thereby avoiding partial records in the system.

By handling the low-level logistics of receiving, buffering, verifying, and routing digital documents, document ingestion controller 210 serves as the gateway to document ingestion and preprocessing system 140. This robust control layer abstracts away hardware and network complexities, allowing higher-level components—such as metadata extraction engine 212 and preprocessing engine 214—to focus on semantic parsing, normalization, and domain-specific transformations.

Metadata extraction engine 212 is operable to parse the attributes of an incoming digitized document—such as text content and basic file properties—and convert these details into standardized records for storage and downstream use. In various embodiments, engine 212 retrieves file pointers or references from document ingestion controller 210, then applies specialized parsing routines tailored to handle various file formats (e.g., PDF, ZIP) and complexities such as layered PDFs or embedded text. For instance, if the document is a layered PDF, metadata extraction engine 212 utilizes specific extraction functions that can access text across multiple layers.

More specifically, metadata extraction engine 212 can handle parallel ingestion streams. When multiple files arrive simultaneously, each file's processing can run on a separate thread or containerized service. This approach prevents large documents from blocking smaller ones. During processing, engine 212 captures available parameters along with calculated checksums or file hashes where applicable to facilitate subsequent data validations within document ingestion and preprocessing system 140.

In one implementation, metadata extraction engine 212 identifies documents requiring optical character recognition (OCR) if the document lacks a discernible text layer. For example, scanned images or image-only PDFs often necessitate real-time text extraction. Under these circumstances, engine 212 coordinates with preprocessing engine 214 to apply optical character recognition, embedding a preliminary text layer back into the document file or storing it as an auxiliary reference. By systematically archiving these outputs, metadata extraction engine 212 builds a detailed audit trail to assist higher-level classification and transformation modules (e.g., data processing and transformation system 142).

Once the metadata is extracted, metadata extraction engine 212 updates metadata storage database 232 with records reflecting each document's core attributes and extracted content (e.g., file size, page count, text contents). In certain embodiments, the engine attaches additional indexing tags, such as potential domain indicators ("financial statement," "legal agreement," or "capital call notice"), derived from analysis of the extracted document content or other properties. These tags later assist in semantic classification tasks, enabling a faster and more accurate path through the model-based inference extraction pipeline. By preserving metadata in a consistent, query-ready structure, metadata extraction engine 212 equips subsequent modules to apply domain-specific extraction blueprints, anomaly detection, or advanced semantic transformations.

Preprocessing engine 214 is operable to transform raw, ingested documents into standardized, high-fidelity digital representations suitable for subsequent semantic extraction and transformation. In various embodiments, preprocessing engine 214 receives raw document data and associated metadata from metadata extraction engine 212, then applies a series of configurable preprocessing routines to mitigate challenges such as watermarks, compression artifacts, layered file structures, and skewed scans. For example, preprocessing engine 214 may employ preprocessing techniques to detect and address overlaid watermark text that could interfere with downstream semantic extraction and transformation. Additionally, preprocessing engine 214 can apply rotation detection and correction algorithms to deskew misaligned documents, thereby ensuring that the text remains properly oriented.

For example, when processing a scanned capital account statement that includes a watermark across each page, preprocessing engine 214 may structurally analyze the document format (e.g., PDF content streams) to identify and attempt removal of elements likely corresponding to the watermark. In parallel or sequence, rotation detection algorithms assess the orientation of the detected text lines; if an angular misalignment is identified, the engine applies a deskewing function to rotate the image back to horizontal, ensuring that subsequent OCR or model-based inference processes operate on properly aligned text.

In an embodiment, preprocessing engine 214 incorporates capabilities that consolidate multiple text or image layers present in complex PDFs into a single coherent representation. This process aims to preserve the semantic order of the extracted text and integrate content from various layers of the document. In certain embodiments, the engine verifies the integrity of the preprocessed document, thereby ensuring that modifications maintain data consistency prior to forwarding the document to document standardization module 216. By performing these detailed technical operations-ranging from watermark removal to image de-skewing and layer consolidation-preprocessing engine 214 provides a robust foundation for accurate semantic parsing and structured data transformation.

For example, consider a multi-layered PDF document. Preprocessing engine 214 employs a layer-flattening module to extract text from various layers. It processes these layers to generate a single coherent text representation that integrates content from different layers, ensuring that all textual content is available for subsequent semantic parsing and structured data transformation. As an integrity check, the engine may compute a checksum or file hash of the processed document, verifying data consistency prior to forwarding the document to the document standardization module 216.

Document standardization module 216 is operable to convert preprocessed documents into a normalized intermediate representation that aligns with a predefined schema for structured data extraction. The output of document standardization module 216 is configured to preserve semantic relationships, resolve layout inconsistencies, and prepare each document for blueprint-based field mapping without relying on fixed spatial templates or manual bounding-box definitions. In various embodiments, document standardization module 216 receives document inputs from preprocessing engine 214 along with metadata extracted by metadata extraction engine 212 and processes the document content to assign consistent field identifiers, determine section boundaries, and generate a canonical structure that can be consumed by downstream model-based inference systems.

More specifically, document standardization module 216 operates by applying a sequence of semantic and structural normalization routines. These routines include vector-based phrase embedding for field label alignment, context-based text clustering to infer logical regions (e.g., headers, transactional tables, footers), and rule-based post-processing to enforce consistency across document classes. For example, to standardize the label "NAV as of 3/31/2023" found in one document and "Net Asset Value-March 31" in another, the module maps both labels to a canonical field identifier (e.g., "net_asset_value_period_end") using an internal synonym resolution dictionary powered by vector similarity measures and document-class-specific mappings. The normalization process may further include token-level pattern recognition (e.g., identifying date formats, currency notation, or fund names) to reformat values according to system standards.

For instance, when processing a scanned capital account statement that includes multiple transactional tables spanning non-uniform page layouts, document standardization module 216 segments the document's contents into logical dimensions by correlating content elements—based on vector similarity and contextual alignment—with the definitional framework provided in the applicable extraction blueprint. Document standardization module 216 performs semantic classification for the identified dimensions, utilizing techniques such as phrase embeddings to assign canonical field labels and section types derived from the blueprint.

A table containing rows labeled "Contribution," "Management Fee Offset," and "Distribution," for example, will be associated with the canonical field structure expected for the relevant fund class (e.g., private equity capital account blueprint). In the situation the detected dimensional arrangement deviate from the blueprint's structure, document standardization module 216 maps the extracted data to the canonical schema through contextual correlation, thereby ensuring structural consistency irrespective of the original layout.

In certain embodiments, document standardization module 216 also inserts structural markers into the intermediate representation to facilitate downstream prompt generation by adaptive query execution and optimization system 148. These markers may identify page boundaries, section delimiters, and candidate fields for fallback validation if inference confidence scores fall below threshold. The standardized representation may then be serialized into a structured format (e.g., hierarchical JSON or XML) and written to temporary storage or passed directly to data processing and transformation system 142 for blueprint-based extraction.

By transforming layout-diverse financial documents into a normalized, schema-aligned format without requiring rigid templates, document standardization module 216 enables robust, repeatable, and automated extraction across fund types, reporting styles, and document variants. This module ensures that downstream components receive consistent document structures that preserve contextual meaning and support high-fidelity field mapping and validation.

User device(s) interface 220 is operable to manage communications between document ingestion and preprocessing system 140 and one or more user device(s) 155. In various embodiments, user device(s) interface 220 is configured to receive inbound documents, initiate document processing workflows, transmit status updates, and deliver structured results back to end users. The interface supports both browser-based interactions and direct API-based integration, enabling document submission through web uploads, scheduled syncs, or automated pipelines originating from user-controlled environments. In certain embodiments, user device(s) interface 220 is also operable to retrieve documents through additional acquisition methods, including monitored email inboxes, cloud-based storage providers (e.g., S3 buckets or shared folders), third-party platform downloads, and streaming endpoints. These retrieval mechanisms may be event-driven or scheduled and may include secure credentialed access for fetching documents from investor portals or administrative systems.

More specifically, user device(s) interface 220 includes one or more request-handling endpoints capable of accepting documents in a variety of formats, including PDFs, scanned image files, layered digital documents, and OCR-processed outputs. Each inbound request is validated by the interface against a set of predefined upload criteria (e.g., maximum file size, allowed MIME types, document encoding). Upon successful validation, the document is assigned a unique transaction ID and passed to document ingestion controller 210 along with metadata such as user ID, timestamp, upload method, and optional tags provided at submission (e.g., "Q4 capital call" or "Fund A LPA").

In certain embodiments, user device(s) interface 220 includes a session management module that tracks user-level activity throughout the document lifecycle. This includes maintaining references to raw file locations in raw document storage database 230, tracking processing state across the document pipeline, and serving partial or final extraction results back to the requesting device. For browser-based submissions, the interface may present dynamic upload forms with progress tracking and status polling, while API-based users may interact through token-authenticated requests and receive structured JSON responses detailing document state, completion percentage, or extracted field summaries.

For example, when a user uploads a scanned subscription agreement through a browser, user device(s) interface 220 receives the file via HTTPS POST, extracts submission metadata from the accompanying request, validates the file type, and streams the document to a secure buffer. The interface then creates a transaction record associated with the document and user session, pushes the document to ingestion controller 210, and returns a response confirming ingestion. As the document moves through preprocessing engine 214 and document standardization module 216, user device(s) interface 220 continuously updates the user-facing status (e.g., "watermark removal in progress," "awaiting entity resolution"), until final structured outputs are available for download or integration.

By coordinating secure upload, session tracking, and response delivery, user device(s) interface 220 provides a controlled and observable entry point into document ingestion and preprocessing system 140. Its support for multiple interaction modes—both human-initiated and machine-to-machine—ensures compatibility with a wide range of deployment environments while maintaining traceability, access control, and data integrity throughout the processing pipeline.

Raw document storage database 230 is operable to persistently store original document files received from user device(s) interface 220 or retrieved from third-party data sources 158. In various embodiments, raw document storage database 230 maintains a copy of each ingested document, indexed by a unique document identifier, and linked to associated metadata captured during ingestion and preprocessing. Raw document storage database 230 serves as the system's source of truth for all input documents, supporting both auditability and reprocessing workflows.

More specifically, raw document storage database 230 supports structured storage of file content along with associated attributes such as ingestion timestamps, origin source (e.g., user upload, email pull, or API retrieval), file type, encoding format, and version history. In one implementation, the system stores each document in a content-addressable storage layer, where the file is referenced by an object key or its cryptographic hash (e.g., SHA-256) computed at the time of ingestion. This ensures both deduplication and integrity verification over time. For example, if the same capital account statement is received through two ingestion channels, the system can detect the duplicate hash and associate both submissions with the same physical file reference while preserving independent metadata trails.

In certain embodiments, raw document storage database 230 includes support for tiered storage strategies. Documents that are recently uploaded or under active processing may reside on high-speed local or in-memory storage, while older or archived documents may be offloaded to cold storage layers (e.g., cloud-based object stores or encrypted archival databases). The storage system may automatically migrate documents between tiers based on age, access frequency, or completion of downstream processing steps.

Raw document storage database 230 is further configured to store and index a diverse set of financial and legal document types, including but not limited to limited partnership agreements (LPAs), capital account statements, stock purchase agreements, distribution notices, contribution confirmations, certificates of incorporation (COIs), and fund reporting packages which may incorporate by reference both audited financial statements produced by a fund's independent auditor and unaudited financial statements produced by a fund's general partner or manager. Metadata indicating document type or class (e.g., "capital call notice" under the "private equity fund" class or "monthly performance report" under the "hedge fund" class) derived from semantic classification and subsequent extraction steps is associated with the stored document within metadata storage database 232. This classification enables downstream systems to retrieve document collections or subsets filtered on domain-specific categories (e.g., fund type, reporting period, or financial transaction category) and informs dynamic blueprint selection in data processing and transformation system 142.

For example, after a scanned subscription agreement is uploaded and ingested, raw document storage database 230 stores the original PDF in a primary storage volume, associating it with metadata such as upload method, session ID, and processing status. As the document is processed by preprocessing engine 214 and document standardization module 216, system components may read from this stored version to resolve discrepancies or reprocess regions with updated logic. Once processing completes and the structured output is finalized, the document may be moved to long-term storage, preserving its full processing lineage while freeing primary resources.

Metadata storage database 232 is operable to store structured metadata associated with each ingested document, including both system-generated attributes and semantically derived classifications. In various embodiments, metadata storage database 232 receives metadata extracted by metadata extraction engine 212, user-provided submission tags collected via user device(s) interface 220, and classification outputs produced by preprocessing engine 214 or document standardization module 216. Each metadata record is linked to a corresponding document stored in raw document storage database 230 and indexed using a unique document identifier (e.g., object key, cryptographic hash).

More specifically, metadata storage database 232 maintains a normalized schema to capture key metadata fields such as upload timestamp, original file name, document class (e.g., private equity, hedge fund, venture capital), document type (e.g., capital account statement, subscription agreement), processing state, blueprint resolution path, and semantic field mappings. In certain embodiments, metadata storage database 232 also stores tokenized or vectorized representations of document sections, enabling similarity-based retrieval or reclassification. For example, if a newly ingested document has ambiguous structure, the system may use stored vector embeddings from prior documents in metadata storage database 232 to resolve blueprint selection by identifying the most similar prior instance.

In one implementation, metadata storage database 232 serves as the authoritative lookup source for document lineage and audit events. As each document proceeds through semantic parsing and structured field extraction, intermediate confidence scores, model-based inference decisions, and exception handling events are recorded as metadata annotations. These annotations are queryable and may be used to trace field-level discrepancies, such as mismatches between inception-to-date and year-to-date capital balances across reporting periods. In certain embodiments, these metadata entries also include versioning markers to enable reprocessing with updated blueprints or extraction logic while preserving historical inference paths.

For example, when a capital account statement is classified as belonging to the "alternative fund" class and mapped to a monthly reporting blueprint, metadata storage database 232 stores the resolved blueprint ID, a semantic tag indicating reporting period type, and a confidence score distribution across key fields (e.g., "NAV," "distributions," "capital contributions"). If a downstream validation system flags a potential anomaly in the NAV roll-forward logic, metadata storage database 232 can surface the originating inference steps, mapped field paths, and blueprint context for targeted correction or audit review.

In certain embodiments, the databases described herein may be combined, partitioned, or otherwise reorganized based on system architecture, performance optimization, or operational deployment requirements. For example, raw document storage database 230 and metadata storage database 232 may be implemented as a single storage service with both binary file storage and structured metadata indexing layers. Similarly, downstream systems may merge blueprint repositories, field mapping configurations, and extraction logs into unified knowledge stores supporting both inference control and validation traceability. Additional databases may be introduced to persist audit logs, document versioning histories, blueprint revision lineage, or user-defined configuration overrides. These database configurations may vary across on-premise, cloud-based, or hybrid deployments without departing from the scope of the present disclosure.

Data processing and transformation system interface 240 is operable to transmit standardized document representations and associated metadata from document ingestion and preprocessing system 140 to data processing and transformation system 142 for semantic field extraction, normalization, and blueprint-based transformation. In various embodiments, data processing and transformation system interface 240 provides a structured and modular communication layer that facilitates both synchronous and asynchronous processing workflows while preserving the linkage between the original document, its semantic classification, and the selected blueprint path.

More specifically, data processing and transformation system interface 240 receives normalized, preprocessed document data from document standardization module 216, along with enriched metadata from metadata storage database 232. The interface serializes this information into a structured payload, which may include vectorized text contents, entity identifiers, semantic dimension metadata, and references to previously resolved blueprint templates. This payload is formatted according to an internal document specification schema designed to support both direct field mapping and iterative refinement via structured inference instructions.

In certain embodiments, data processing and transformation system interface 240 is operable to assign routing directives based on document class or semantic context. For example, documents classified as "capital account statements" within the "alternative fund" class may be routed to a specific model version or transformation module optimized for that document type, obviating the need for rigid, manually-configured templates predefined prior to runtime. These directives may be appended to the interface payload and interpreted by orchestration logic within data processing and transformation system 142. Furthermore, the interface incorporates fallback routes, enabling dynamic retries utilizing alternate blueprints or escalating to manual review when predefined thresholds for data sparsity are exceeded.

For example, when a quarterly fund report is submitted and passes through document standardization module 216, data processing and transformation system interface 240 packages the flattened text, dimensional markers, and resolved semantic tags into a structured JSON payload. The interface then transmits this payload along with a blueprint reference (e.g., "BP-HF-QTR-v2") to data processing and transformation system 142 over an internal communication channel. If the receiving system detects that the document's layout partially deviates from expected blueprint structure, the interface may trigger re-submission with adjusted field tolerances or route the case to an alternate transformation routine optimized for variant fund formats.

Figure 3:
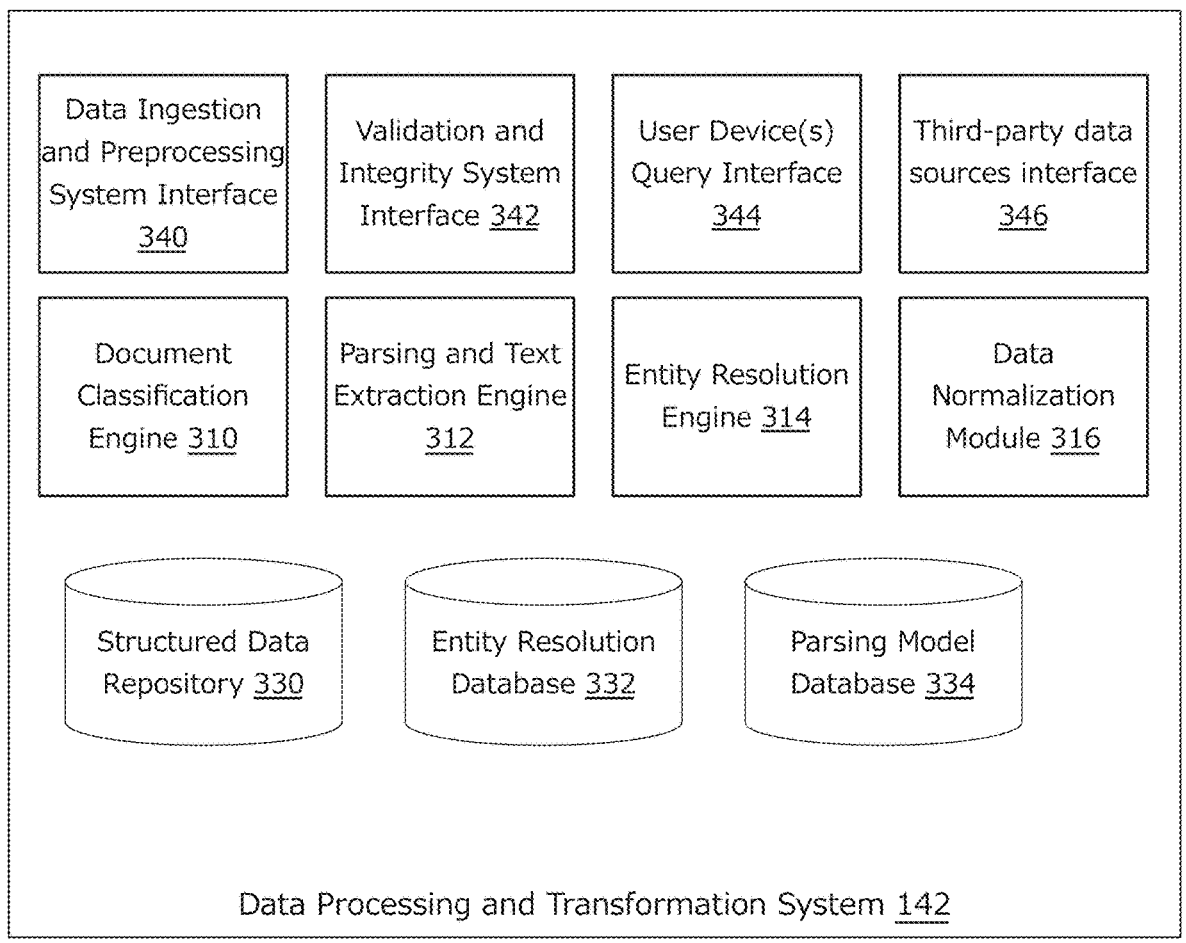
FIG. 3 illustrates a data processing and transformation system, in accordance with various embodiments.

FIG. 3 illustrates an example implementation of data processing and transformation system 142, in accordance with various embodiments of the present disclosure. As shown, data processing and transformation system 142 includes document classification engine 310, parsing and text extraction engine 312, entity resolution engine 314, and data normalization module 316. Parsing and text extraction engine 312 is operable to perform entity and field extraction using semantic parsing workflows and blueprint-guided prompts. Data processing and transformation system 142 further interacts with one or more supporting components and data interfaces, including structured data repository 330, entity resolution database 332, parsing model database 334, data ingestion and preprocessing system interface 340, validation and integrity system interface 342, user device(s) query interface 344, and third-party data sources interface 346.

Document classification engine 310 is operable to assign system-level document-type and document-class labels to normalized inputs for the purpose of directing structured data processing workflows, blueprint selection, and downstream parsing expectations. In various embodiments, document classification engine 310 receives preprocessed, structurally standardized input data from data ingestion and preprocessing system interface 340. Document classification engine 310 applies a multi-stage classification workflow designed to resolve the appropriate document type and semantic class based on latent feature representations, dimensional presence cues, and blueprint registry mappings. This classification enables the system to route each document instance to the correct transformation logic, parsing schema, and validation configuration.

For example, when processing a layered or scanned document, document classification engine 310 tokenizes the extracted text and encodes it using a transformer-based model trained on domain-specific corpora. The resulting text embedding is compared against a precomputed vector index containing archetypes of known schema-bound document types (e.g., agreement contracts, reporting forms, structured statements). Using cosine similarity or other distance metrics, the engine computes alignment scores and assigns the input to the closest matching document class. In one instance, a similarity score of 0.93 to an "LPA—Alternative Fund Legal Contract" class triggers assignment under that label. The classification is further refined using structural metadata, such as dimensional presence patterns, paragraph spacing uniformity, and occurrence of control tokens or anchor terms. These refinements help disambiguate otherwise overlapping formats that share semantic fields but differ in processing schema.

In certain embodiments, document classification engine 310 includes a blueprint selection module (e.g., extraction configuration selector) operable to retrieve a structured parsing definition upon classification resolution. For example, if a document is determined to match a structured form type linked to blueprint ID BP-PE-CALL-V4, the blueprint selection module retrieves field extraction rules, parsing anchors, and schema constraints associated with that blueprint. These may include logic to identify context-sensitive labels (e.g., "Contribution Amount"), extract temporal references in proximity to action phrases (e.g., "remit by"), and isolate the reporting entity name based on typographic features or contextual positioning. The blueprint selection module may apply a rules engine or trained decision model to determine whether the selected blueprint remains optimal or whether an updated variant better reflects document structure or token distribution.

As another example, when processing a document that includes structured headings such as "Beginning Balance," "Current Period Activity Adjustments," and "Ending Value," and is labeled "Quarterly Statement" in its header, document classification engine 310 maps both the title and field labels into a latent semantic space. The embeddings are compared against stored blueprint archetypes. If a top match exceeds the configured similarity threshold, the engine assigns the corresponding document type and blueprint class. Where multiple potential matches occur, a disambiguation module may be invoked to apply field-frequency heuristics, token co-occurrence logic, or document layout structure to resolve classification. The resolved classification output directs the selection of schema-specific parsing workflows, ensuring that downstream components operate on structurally aligned document representations.

Parsing and text extraction engine 312 is operable to extract structured field content from standardized document inputs using model-based inference techniques, blueprint-governed parsing workflows, and context-aware label resolution. In various embodiments, parsing and text extraction engine 312 receives semantically classified inputs from document classification engine 310, along with an assigned extraction blueprint, and performs a multi-phase token interpretation process designed to resolve entity references, normalize value associations, and align extracted information to a schema-conforming structure suitable for downstream transformation and validation.

More specifically, parsing and text extraction engine 312 applies a blueprint-guided segmentation and field-mapping process that anchors extraction logic to semantically meaningful regions within the document. This may include the application of structured inference instructions, sequence labeling models, and feature-sensitive parsing heuristics. In certain embodiments, parsing and text extraction engine 312 utilizes hybrid workflows that incorporate rule-based anchors—such as semantic trigger phrases or typographic cues—alongside probabilistic span detection based on model-derived token embeddings. Extraction blueprints may define field-level expectations through context windows, layout patterns, or relative positioning logic (e.g., values listed within two lines of a key phrase or within the bounds of a labeled table column).

For example, when processing a document containing the section header "Capital Activity Summary," parsing and text extraction engine 312 uses the blueprint-defined segmentation logic to isolate this section, identifying its spatial relationship to known anchor terms. Within the identified region, the engine applies a domain-tuned sequence labeling model to identify candidate field entities such as "Contributions," "Reversals," or "Fee Offsets." Structured inference instructions associated with the blueprint guide the extraction process by prioritizing numeric values appearing in close proximity to these anchor phrases, applying weight to formatting cues such as bolded or centered typography. When the term "Capital Called" is followed by an indented list of monetary entries, the engine uses a relative layout heuristic to link each amount to a schema-defined field.

In certain embodiments, parsing and text extraction engine 312 supports layered parsing workflows. In the initial pass, the engine partitions the document into structural regions, such as tables, callouts, headers, and footnotes, using geometric heuristics and content classifiers. Within each partitioned segment, the engine applies entity recognition models trained on structured data sources, followed by a token-level classification phase in which each candidate is mapped to a field type such as numerical amount, date, percentage, or organizational identifier. Extracted values are then reconciled against the active blueprint's parsing rules, which may define acceptable formats, value ranges, or co-occurrence constraints. Tokens that fail to satisfy blueprint conditions may be flagged for further review or secondary validation.

For example, in processing a document containing the text "Beginning Capital Balance: $1,250,000," parsing and text extraction engine 312 uses blueprint-specified anchors to associate the phrase "Beginning Capital" with the corresponding schema field. A type classifier confirms that the value is a currency-formatted numerical token, and a nearby header—e.g., "Quarter Ended Mar. 31, 2023"—is used to assign a time-context label to the extracted record. In documents containing poorly aligned tabular layouts, the engine may detect column dislocation or header skew and apply context-aware reconstruction logic to recover accurate cell associations before assigning values.

In another example, if the document contains the phrase "Please remit $450,000 by March 31," parsing and text extraction engine 312 interprets the imperative construct and adjacent numeric/date tokens as indicators of a request entry. Based on the assigned blueprint, the engine maps "$450, 000" to a schema field such as "capital call amount," and "March 31" to a date field such as "capital call due date." When similar constructs occur in multiple document regions, blueprint-defined disambiguation logic may apply dimensional-presence weighting or lexical tie-breakers to determine the most relevant instance for extraction.

Entity resolution engine 314 is operable to evaluate extracted entity references and associate them with canonical identifiers to ensure consistency across documents, reporting periods, and data sources. In accordance with various embodiments, entity resolution engine 314 operates in coordination with parsing and text extraction engine 312. While parsing and text extraction engine 312 is operable to identify and extract candidate references to entities from document content—using blueprint-guided prompts and transformer-based language models—entity resolution engine 314 is operable to perform canonicalization by evaluating the extracted references against a set of system-recognized or user-defined entities. Resolution logic may include fuzzy matching techniques (e.g., edit-distance algorithms), evaluation of aliases stored in entity resolution database 332, and application of contextual cues such as related party associations, document origin, or temporal proximity. In various embodiments, resolution decisions can be influenced by user-defined mappings, prior associations, or other metadata derived from document context. In certain implementations, entity resolution engine 314 maintains traceability between the raw reference, the resolved canonical name, and the contextual basis for that resolution.

Entity resolution engine 314 can operate in parallel or in interleaved stages with parsing and text extraction engine 312. For example, previously resolved entities may be used during extraction to disambiguate similar names or prioritize field mappings, while resolution decisions may evolve as new content is parsed and interpreted. In certain embodiments, entity resolution engine 314 can continuously update or refine candidate mappings as documents are processed, enabling the system to adapt resolution logic based on the surrounding content and cumulative processing state. This coordinated operation supports flexible and context-aware resolution across large volumes of documents with varied formatting, naming conventions, or semantic structures.

More specifically, entity resolution engine 314 employs a resolution strategy that can include exact string comparison, augmented by fuzzy matching algorithms (e.g., Levenshtein or Jaro-Winkler distance) and user-defined aliases or entity mappings stored in entity resolution database 332 to handle typographical variations of references to a given "root-level" entity. The engine evaluates potential canonical entity matches based on the results of these comparisons. To further refine or confirm potential matches, entity resolution engine 314 may also reference other data points associated with the source document or processing context—such as related party identifiers, document source indicators, or known aliases—to constrain candidate matches based on context-relevant indicators. In certain embodiments, entity resolution engine 314 determines the final mapping based on matching rules or configurable confidence thresholds, and can flag ambiguous resolutions or de-novo entities identified in documents for manual review and resolution.

For example, if the system encounters the input string "Crescendo Capital LP," entity resolution engine 314 first performs direct matching against known canonical labels stored in entity resolution database 332. If no exact match is found, fuzzy logic may be applied to evaluate candidate strings based on edit distance, identifying a close match such as "Crescendo Capital, L.P." The engine may also identify the input string as a predefined alias for the canonical entity. Furthermore, the engine can consult other contextual data points associated with the document—for instance, a shared administrator or manager name previously linked to the canonical entity—to increase confidence in the potential match. These contextual signals inform the final resolution decision, and the mapping is recorded along with a traceable audit key.

In certain embodiments, entity resolution database 332 is configured to maintain historical entity information and relationships, including defined aliases and records of entity merging or renaming events. This allows the system to represent the evolution of entity references over time. During processing, entity resolution engine 314 can utilize currently-active aliases stored in entity resolution database 332 to resolve references. Furthermore, the stored historical entity data supports referential continuity in longitudinal datasets and enables user-driven review and management of entity relationships and historical states. This ensures temporal consistency such that changes in entity naming over time do not introduce structural fragmentation across related documents.

For example, when parsing a reference to "Alpha Growth Fund LP," and an exact match against canonical entries in entity resolution database 332 is not found, the engine may utilize fuzzy matching or consult predefined active aliases to identify "Alpha Growth Fund, L.P." as a high-confidence candidate. This mapping can be further reinforced using metadata signals such as historical co-occurrence with the same investor registry details previously associated with the canonical entity. The final resolution is logged, including the raw input reference, the matched canonical name, and the basis for the match.

In another case, a document includes the distorted OCR string "Bcta Capital GP" (derived from "Beta Capital GP"). Entity resolution engine 314 detects the character-level anomaly using edit-distance correction or similar fuzzy matching techniques applied against the canonical entity list or predefined aliases stored in entity resolution database 332. The engine resolves the reference to "Beta Capital GP" and annotates the mapping with details such as a correction trace, confidence score, and OCR correction indicator, enabling explainability and system-wide consistency.

In accordance with various embodiments, entity resolution engine 314 enables system-wide unification of variant references to the appropriate canonical entity by employing resolution strategies that combine exact matching, fuzzy matching, user-defined aliases, and contextual metadata analysis. This disambiguation process, which leverages data maintained within entity resolution database 332, ensures consistent entity anchoring across documents, thereby supporting downstream schema alignment, data aggregation, and traceable record management.

Data normalization module 316 is operable to standardize and align extracted field-level data across heterogeneous document formats, varying source conventions, and schema variations, ensuring structural coherence and consistency within the system's data pipeline. In various embodiments, data normalization module 316 receives extracted values and associated metadata from entity resolution engine 314 and parsing and text extraction engine 312. Upon receipt, data normalization module 316 applies schema-conformant transformation routines, designed to harmonize units, normalize terminology, align temporal context, and reconcile cross-document structural differences based on blueprint-driven expectations and document classification metadata.

More specifically, data normalization module 316 applies a combination of document-type-specific normalization rules and historical consistency logic. These include: (i) resolving terminology variations—e.g., mapping semantically equivalent field labels across sources (e.g., "NAV" to "Ending Capital Balance"); (ii) standardizing numerical units and formatting—e.g., converting condensed figures such as "$1.5M" into "1500000.00"; and (iii) interpreting time-based labels and ranges based on document headers and previously observed reporting cadences. In certain embodiments, normalization logic is guided by schema mappings and field constraints retrieved from structured data repository 330.

For example, when processing two structured documents for the same entity across adjacent reporting intervals, one file may include the field "NAV" and another "Account Value." Data normalization module 316 references the active blueprint mappings and schema configuration to associate both with the canonical schema field "Ending Capital Balance." If the values differ across documents—for instance, "$1,050,000" in the earlier report and "$1,200,000" in the later one—data normalization module 316 retrieves temporal alignment metadata and uses embedded rollforward logic to validate the change based on intermediate contributions or adjustments recorded elsewhere in the document stream.

In certain embodiments, data normalization module 316 incorporates rule-based consistency checks that span both intra-document and inter-document contexts. These checks evaluate the internal coherence of extracted field values, as well as their consistency with previously validated and stored structured records. For example, if contribution and distribution totals do not reconcile with computed changes in aggregate balance, the module can flag discrepancies or detect field reclassifications. The system may invoke statistical outlier detection logic when numerical values deviate from the expected distribution for the corresponding entity or blueprint-defined range.

As one example, consider a document that includes a field labeled "Account Value" with a value of "$10,000,000." Based on the document classification and blueprint metadata, data normalization module 316 maps this to the canonical schema field "Ending NAV." The module compares this value to the prior-period entry of "$9,000,000," checks system records for supporting changes in contributions or withdrawals, and calculates a delta. If expected reconciliation logic fails—e.g., if intermediary activity does not explain the change—the module flags the record for downstream validation and attaches structured annotations indicating the discrepancy.

In another example, a document includes the reference "EUR 2M" for a committed contribution. The schema for this document class requires normalized USD values. Data normalization module 316 accesses historical exchange rate data via external database interface 346 using the document's effective date, computes the converted amount, and stores both the normalized value and its associated metadata—including original currency, FX rate, and timestamp—in structured data repository 330. This enables reproducibility and supports audit traceability across converted records.

In accordance with various embodiments, by applying blueprint-constrained transformation rules, unit normalization routines, temporal alignment checks, and semantic label standardization, data normalization module 316 outputs structurally normalized data records that are schema-aligned, referentially consistent, and suitable for downstream validation, temporal reconciliation, and analytics-driven querying.

Structured data repository 330 is operable to store standardized, schema-conformant representations of extracted financial data, along with associated metadata, normalization history, and validation annotations. In various embodiments, structured data repository 330 serves as the primary persistence layer for the system's downstream consumption workflows, including reporting, validation, analytics, and export.

More specifically, structured data repository 330 organizes data entries according to fund-specific schemas, where each schema includes canonical field names, data types, field-level constraints, currency and date formatting rules, and applicable reporting intervals (e.g., quarterly, annual). Data written to structured data repository 330 is versioned with respect to document origin, blueprint identifier, and transformation history, allowing complete traceability from original document input through normalized data output.

In certain embodiments, structured data repository 330 stores each record as a structured object (e.g., JSON, SQL row, or document-store entry) that includes canonical field names paired with resolved field values, associated currency and date metadata, source document references with location identifiers, and descriptions of the normalization and validation steps taken to derive the current value.

Structured data repository 330 may also maintain a registry of active schema definitions indexed by fund ID, entity class, or document type. When a new data record is submitted for storage, structured data repository 330 performs schema validation to ensure the record conforms to the expected structure. If field-level mismatches, type violations, or temporal anomalies are detected, the system flags the record for additional review or post-processing.

For example, when storing the normalized output of a capital account statement for "Fund A," structured data repository 330 references the schema definition for "Private Equity-Capital Account" and verifies that the record includes required fields such as "Beginning Balance," "Capital Contributions," "Distributions," "Net Income," and "Ending Balance." If the document includes an unrecognized field labeled "Liquidity Buffer," structured data repository 330 checks for a mapped equivalent in the schema. If no mapping is found, the system stores the unmapped field under a supplementary annotations section and flags it for downstream schema evolution or analyst review.

In another example, if multiple quarterly statements for the same fund entity are received and stored, structured data repository 330 supports period-over-period comparisons by maintaining each record's reporting interval and effective date as indexed fields. This enables temporal joins, rollforward computations, and anomaly detection workflows to operate efficiently against the persisted structured data.

Entity resolution database 332 is operable to store canonical representations of named entities referenced across ingested documents, including fund names, legal entities, investor accounts, and affiliated service providers. In various embodiments, entity resolution database 332 serves as the authoritative reference layer for matching, validating, and reconciling entity candidates during the entity resolution process executed by entity resolution engine 314.

More specifically, entity resolution database 332 maintains curated records for each known entity, including the entity's primary name, known aliases, legal identifiers (e.g., LEI codes or registration numbers), historical name variants, and associated metadata such as fund type, jurisdiction, administrator, and known document affiliations. The records may be versioned over time to reflect entity evolution, mergers, name changes, or restructurings, allowing for accurate temporal resolution during cross-period reconciliation workflows.

In certain embodiments, entity resolution database 332 facilitates efficient lookups through automated indexing of entity names and known aliases.

For example, if the phrase "Blue Ridge Holdings" is extracted from a capital call notice, entity resolution engine 314 queries entity resolution database 332 for potential matches based on direct comparison, fuzzy matching, or registered aliases. Candidate records such as "Blue Ridge Holdings, LLC," "Blue Ridge GP," and "Blue Ridge Partners" may be retrieved. The engine evaluates these candidates based on matching score and potentially reinforces the selection using common fund affiliations derived from previous records to confirm the resolution, updating the document's metadata accordingly.

In another example, if a scanned document references "NorthStar Capital Management," and OCR errors cause the extraction of "North5tar Cap1tal Mngmt," entity resolution engine 314 performs a fuzzy match using edit distance and retrieves potential candidates from entity resolution database 332. The candidate records are then ranked based on their alias history and co-occurrence with the investor account ID found in the same document, allowing the distorted reference to be mapped back to "NorthStar Capital Management, L.P." with high confidence.

Entity resolution database 332 supports dynamic updates and feedback loops from manual analyst review, allowing for the refinement of alias mappings, entity metadata, and embedding accuracy over time. Updates may be stored with audit trails and effective dates to ensure that each entity resolution is traceable and compliant with document lineage expectations.

Parsing model database 334 is operable to store and manage model artifacts, structured inference instructions, and blueprint-specific extraction logic used by parsing and text extraction engine 312. In various embodiments, parsing model database 334 functions as a repository for version-controlled machine learning models, including those trained to recognize financial field boundaries, interpret semantic relationships, and perform context-driven text labeling. More specifically, parsing model database 334 stores serialized representations of transformer-based language models, statistical sequence labeling models, and hybrid extraction configurations tailored to document classes such as capital account statements, capital call notices, subscription agreements, and fund LPAs. These models may include pre-trained weights, fine-tuning parameters, token classification schemes, and inference rules aligned with each blueprint.

In certain embodiments, parsing model database 334 includes structured inference instruction sets mapped to specific blueprint identifiers. Each instruction set encodes extraction logic using a declarative schema—for example, identifying a "Capital Contribution" value as the nearest currency-denoted numerical token following a semantic anchor such as "Please contribute" or "Capital Due." These instruction sets enable blueprint-specific interpretation without requiring full model retraining.

Parsing model database 334 may also store temporal versions of model checkpoints to support auditability, rollback, and adaptive model evolution. Each model artifact is indexed by blueprint ID, fund type, document class, model architecture, and deployment timestamp. In response to a request from parsing and text extraction engine 312, the database returns the appropriate model version or configuration based on the incoming document's classification and blueprint assignment. For example, when a document is classified as a "Capital Call Notice" under the "Private Equity" domain, parsing and text extraction engine 312 queries parsing model database 334 for the model set associated with blueprint ID BP-PE-CALL-V4. The database returns a token classification model trained on similar notices, along with an instruction file that defines field anchors for terms such as "Requested Capital," "Due Date," and "Fund Name." The engine then applies this model and instruction set to extract structured values from the document.

Data ingestion and preprocessing system interface 340 is operable to receive standardized document representations and associated metadata from document ingestion and preprocessing system 140, and to transmit them to downstream components of the parsing and transformation pipeline. In various embodiments, data ingestion and preprocessing system interface 340 provides a structured entry point for parsed and preprocessed document payloads, ensuring consistent formatting, schema tagging, and data integrity prior to semantic classification and extraction. More specifically, data ingestion and preprocessing system interface 340 receives preprocessed documents that have undergone watermark removal, layer flattening, compression remediation, rotation correction, and metadata enrichment via preprocessing engine 214. The interface normalizes incoming data into a defined interchange format—such as a document object model that preserves token positioning, extracted metadata fields, and logical structure markers (e.g., header tags, table indicators). This standardized payload is forwarded to document classification engine 310 for semantic interpretation.

In certain embodiments, data ingestion and preprocessing system interface 340 includes a schema validation layer that confirms the presence of required metadata fields, such as document type indicators, document source identifiers, preprocessing flags, and checksum hashes. This ensures that documents entering the parsing pipeline are complete, structurally coherent, and traceable. For example, when a scanned LPA is uploaded to the system and processed through preprocessing engine 214, data ingestion and preprocessing system interface 340 receives the post-processed output, including extracted metadata such as OCR confidence scores and compression flags. The interface then packages this document into a structured payload and appends a transformation history before passing the document to document classification engine 310.

Validation and integrity system interface 342 is operable to transmit structured data, metadata annotations, and extracted field values from the parsing and normalization pipeline to data validation and integrity system 144. In various embodiments, validation and integrity system interface 342 functions as the bridge between semantic data extraction workflows and downstream validation logic, enabling forensic consistency checks, rollforward calculations, and temporal reconciliation to be applied against normalized records. More specifically, validation and integrity system interface 342 receives structured field outputs from data normalization module 316 along with associated metadata, including source document identifiers, blueprint references, and resolution confidence scores. The interface packages these artifacts into validation-ready payloads and forwards them to data validation and integrity system 144, where domain-specific rules and accounting logic are applied.

In certain embodiments, validation and integrity system interface 342 assigns validation job identifiers to each outbound payload and maintains a reference mapping between incoming document instances and their associated validation results. This enables bi-directional traceability and downstream error propagation control. Additionally, the interface may include support for real-time or batch-mode validation workflows, depending on system configuration. For example, when a fund's quarterly capital account statement is parsed and normalized into a structured representation—including fields such as beginning balance, contributions, distributions, performance allocation, and ending balance—validation and integrity system interface 342 transmits this record, along with relevant temporal context and fund schema ID, to data validation and integrity system 144. The receiving system then applies balance rollforward logic and flags discrepancies if the reported ending balance does not reconcile with the other fields.

User device(s) query interface 344 is operable to receive structured query requests from user device(s) 155 and return document-level or field-level data derived from the parsing and transformation pipeline. In various embodiments, user device(s) query interface 344 enables authenticated users to retrieve extracted values, resolved entities, validation status, and historical document lineage through a programmatic or graphical interface. More specifically, user device(s) query interface 344 supports structured input formats—such as RESTful API calls, form-based requests, or embedded dashboards—configured to return canonical data representations from structured data repository 330. Query parameters may include document identifiers, field labels, reporting periods, fund names, or extracted value ranges. The interface executes query resolution logic, retrieves the requested data elements, and returns them to user device(s) 155 with associated context, including source document references, blueprint mappings, and processing history.

In certain embodiments, user device(s) query interface 344 supports interactive querying through a domain-specific query language, allowing users to compose queries such as: "Show all capital call notices for Fund ABC from Q2 2022 with Requested Capital greater than $1,000,000." The interface may also expose enriched metadata—such as entity resolution confidence scores, validation status flags, and normalized currency values—depending on the query configuration. For example, a portfolio analyst may initiate a query from a user device 155 to retrieve all contributions reported across a group of private equity funds over the last four quarters. The query is submitted via user device(s) query interface 344, which resolves the fund aliases, maps field label variants to the canonical "Capital Contributions" field, applies the reporting date filters, and returns a tabular response including source document links, normalized values, and entity identifiers.

Third-party data sources interface 346 is operable to retrieve supplemental or reference data from external systems to support classification, extraction, normalization, or validation processes across the parsing pipeline. In various embodiments, third-party data sources interface 346 provides programmatic connectivity to external APIs, regulatory databases, currency conversion services, fund registries, or other data providers. More specifically, third-party data sources interface 346 operates in response to blueprint-defined enrichment triggers or processing rule conditions that require external data augmentation. For example, if a parsed field includes a contribution commitment in a non-USD currency, and the normalization schema requires USD-denominated values, third-party data sources interface 346 queries a historical FX rate service using the transaction date as a parameter. The retrieved rate is then used by data normalization module 316 to convert the value and annotate the transformation with source and timestamp metadata.

In certain embodiments, third-party data sources interface 346 supports both synchronous API calls and asynchronous batch queries. Retrieved data is tagged with response confidence levels, retrieval metadata, and source-specific trust weights, which may be used by downstream components to adjust validation tolerances or log enrichment provenance. The interface may include rate limiting, credential management, and retry logic to ensure resilient integration with regulated or throttled third-party services. For example, during entity resolution, when parsing and text extraction engine 312 encounters an unfamiliar fund name, third-party data sources interface 346 may query a jurisdictional registry—such as the SEC's Investment Adviser Public Disclosure (IAPD) database or Companies House UK—to retrieve metadata associated with the name. This metadata may include formation dates, legal status, affiliated entities, normalized entity names used in regulatory filings, and registered addresses, which are appended to the candidate entity and used by entity resolution engine 314 to inform confidence scoring and resolution path selection.

Figure 4:
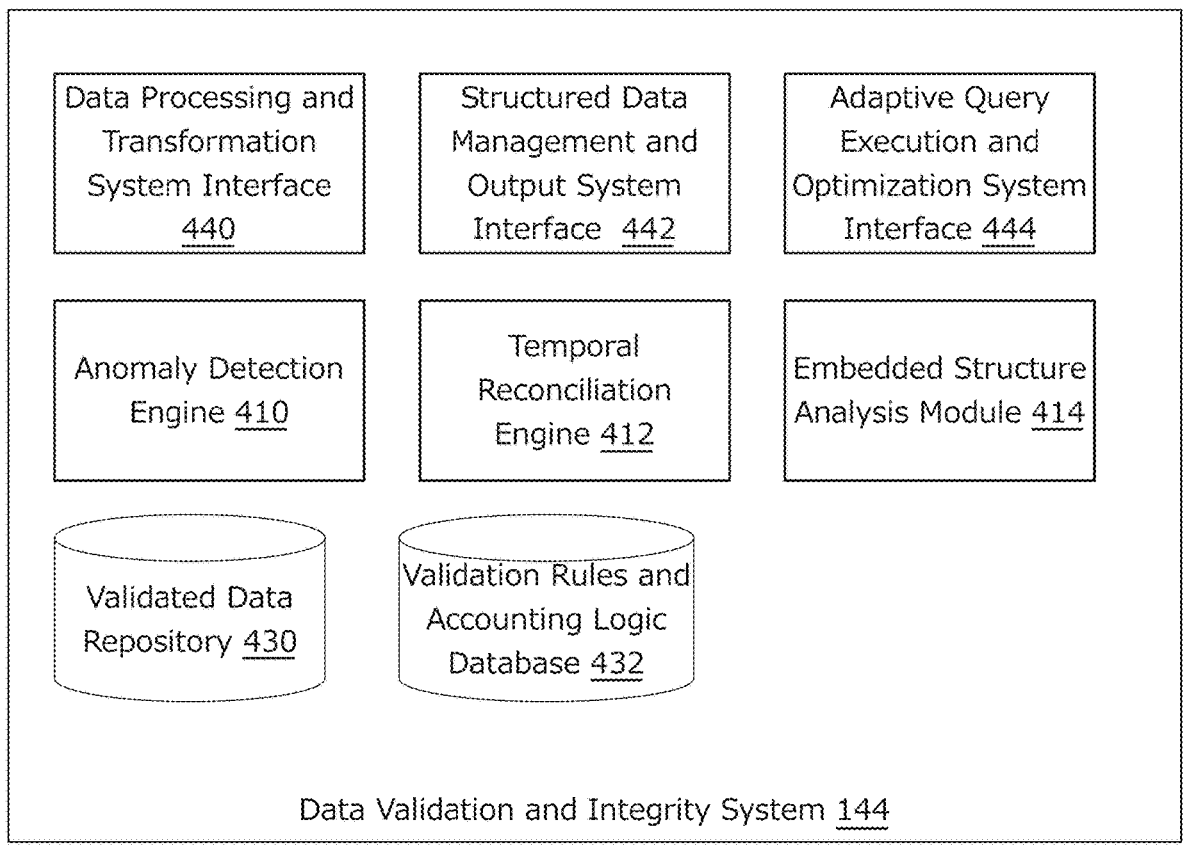
FIG. 4 illustrates a data validation and integrity system, in accordance with various embodiments.

FIG. 4 illustrates an example validation and reconciliation architecture associated with data validation and integrity system 144 in accordance with various embodiments. As shown, data validation and integrity system 144 includes data processing and transformation system interface 440, validated data repository 430, validation rules and accounting logic database 432, anomaly detection engine 410, temporal reconciliation engine 412, and embedded structure analysis module 414. FIG. 4 also depicts structured data management and output system interface 442 and adaptive query execution and optimization system interface 444, which enable downstream data exchange and integration with external querying components. In accordance with various embodiments, by operating upon the unified, temporally-aligned dataset—programmatically constructed by the preceding data processing and transformation system 142 from diverse source documents—data validation and integrity system 144 enables comprehensive consistency checks, balance rollforward calculations, and anomaly detection across multiple reporting periods in an automated, scalable manner. This level of multi-period validation and reconciliation, performed at high volume and with rich accounting logic, proves impracticable or otherwise infeasible when relying solely on conventional template- or bounding box-based solutions, or hybrid methods dependent on manual review. By contrast, system 144's automation framework enables granular cross-document and cross-period validations that significantly reduce human error and offer a degree of accuracy heretofore unattainable through non-automated processes.

Data processing and transformation system interface 440 is operable to receive normalized structured data, classification metadata, and transformation history from data processing and transformation system 142. In various embodiments, data processing and transformation system interface 440 functions as the input conduit to data validation and integrity system 144, enabling downstream application of validation, anomaly detection, and reconciliation workflows. More specifically, data processing and transformation system interface 440 accepts data packages that include canonical field representations (e.g., "Capital Contribution," "Ending Balance"), temporal tags (e.g., effective period, reporting interval), and blueprint identifiers associated with prior extraction and normalization logic. Each incoming record may also include metadata such as extraction confidence scores, resolution history, and audit trail identifiers. The interface parses and queues these data artifacts for further processing by internal validation modules, including anomaly detection engine 410 and temporal reconciliation engine 412.

In certain embodiments, data processing and transformation system interface 440 performs pre-validation schema checks to confirm that incoming records adhere to expected structural and field-level formats required by validation rules and accounting logic database 432. These checks may include field presence verification, type enforcement (e.g., numeric, date, string), and resolution of blueprint-to-schema mappings. The results of these pre-checks are recorded and associated with the incoming document lineage. For example, when a structured record representing a Q4 capital account statement is transmitted from structured data repository 330, data processing and transformation system interface 440 verifies that the record includes expected fields (e.g., "Beginning Capital," "Net Income," "Distributions," "Ending Capital") and that the reporting interval aligns with the fund's calendar. The validated payload is then dispatched to anomaly detection engine 410 and temporal reconciliation engine 412 for rule-based and sequence-aware validation processing.

Validation rules and accounting logic database 432 is operable to store and serve modular validation directives, data reconciliation constraints, and schema-based integrity logic used by downstream components of data validation and integrity system 144. In various embodiments, validation rules and accounting logic database 432 functions as the authoritative repository for policy-driven validation routines, structured data integrity checks, and inter-record consistency models applied to system-generated structured records across varying document classes and processing intervals. More specifically, validation rules and accounting logic database 432 includes machine-readable definitions that describe how extracted field values should be reconciled with prior entries, system expectations, or inferred cross-period relationships. These rule definitions may express logic such as temporal sequence enforcement, conditional field population requirements, inter-field dependencies, and derived value computations. The rules are populated during system initialization and may be programmatically updated via administrative interface or linked policy engine.

In certain embodiments, validation rules and accounting logic database 432 includes schema-specific or blueprint-linked rule variants that support context-sensitive validation tailored to document type, processing profile, or regulatory format. Each rule entry may include version metadata, timestamps, applicable classification tags, and override conditions. These features enable the system to dynamically adjust rule enforcement behavior based on metadata extracted from the incoming structured record or linked processing blueprint.

Components such as anomaly detection engine 410 and temporal reconciliation engine 412 interact with validation rules and accounting logic database 432 via a structured retrieval interface that supports rule resolution, dependency graph traversal, and parameter injection. These components may issue rule queries using identifiers such as schema version, classification label, or temporal boundary, enabling precise rule selection for validation execution. For example, when temporal reconciliation engine 412 processes a structured record associated with schema ID "S-FND-QTRLY-002," validation rules and accounting logic database 432 returns a sequence of validation directives—such as field rollforward calculations, required field completeness checks, and permissible tolerance thresholds. The reconciliation engine applies the retrieved logic in order, flagging any mismatches between current record values and computed expectations, and annotating structured records with exception metadata as needed.

Validated data repository 430 is operable to store structured data records that have completed validation and reconciliation processing within data validation and integrity system 144. In various embodiments, validated data repository 430 receives schema-conforming outputs from anomaly detection engine 410, temporal reconciliation engine 412, and embedded structure analysis module 414 through an internal data pipeline coordinated by validation control logic (not shown). These outputs may include normalized field values, validation status flags, reconciliation outcomes, and associated metadata reflecting the validation and transformation lineage of the record. More specifically, validated data repository 430 is configured to persist both the structured data entries and the corresponding validation context, including rule application identifiers, exception triggers, anomaly confidence scores, and any blueprint-linked processing tags. Each stored record is indexed by upstream classification identifiers, source document metadata, and associated blueprint mappings received from data processing and transformation system 142.

In certain embodiments, validated data repository 430 supports versioned persistence, enabling storage of both pre-validation and post-validation states of each structured record. This versioning facilitates system-level audit logging, rollback functionality, and comparative diagnostics during revalidation or dispute resolution. Structured records are indexed across multiple dimensions, including schema identifiers, reporting interval, data field keys, validation outcomes, and exception annotations. These records are accessible by downstream components, such as structured data management and output system 146 and adaptive query execution and optimization system 148, for further processing, reporting, or integration. For example, when a structured data record is generated from a document classified under a blueprint associated with a composite field, and that record is parsed and disaggregated into multiple structured components by embedded structure analysis module 414, the resulting normalized data—along with its full validation lineage, source document reference, and triggered rule set—is committed to validated data repository 430 with metadata indicating schema compliance and transformation traceability.

Anomaly detection engine 410 is operable to identify potential data quality issues, structural inconsistencies, or values deviating from configurable expectations (e.g., based on domain-specific tolerances or materiality thresholds) within structured financial data received from data processing and transformation system 142. In various embodiments, anomaly detection engine 410 applies context-aware evaluation routines, including comparisons against dynamically-determined thresholds and schema requirements retrieved from validation rules and accounting logic database 432, to detect conditions potentially warranting further review. More specifically, anomaly detection engine 410 receives structured field-level records, reconciliation results (such as computed variances from temporal reconciliation engine 412), and associated context identifiers (e.g., blueprint identifiers via data processing and transformation system interface 440, fund ID). It then executes configured detection routines, applying thresholds and rules that may be adapted based on entity type, historical system performance metrics, or user-defined parameters stored in validation rules and accounting logic database 432. These routines primarily include threshold-based flagging (e.g., "variance between reported NAV and expected NAV exceeding allowable configured tolerance) or reconciliation overrides (e.g., the presence of a reconciled flag on a given data point or dataset), and checks for adherence to blueprint-defined structural rules.

For example, in certain embodiments, anomaly detection engine 410 receives a structured capital account statement for a particular fund entity along with a computed variance from temporal reconciliation engine 412. A nomaly detection engine 410 compares this variance against an applicable tolerance threshold retrieved from validation rules and accounting logic database 432. This threshold may be a system default value, or it may be specifically configured for the relevant fund or entity, potentially incorporating user-defined adjustments for factors such as acceptable reporting period tolerances (e.g., allowing plus or minus 7 days for period matching to accommodate real world administration delays) or materiality levels (e.g., aligning with domain specific rules or norms such as fund accounting audit standards promulgated under certain PCAOB guidance or internally-defined service level standards). If the variance exceeds the operative threshold, anomaly detection engine 410 triggers an anomaly flag. Similarly, blueprint-driven structural compliance checks are performed. A nomaly detection engine 410 associates relevant anomaly metadata (e.g., rule identifier, variance amount, threshold applied, configuration source) with the record, persisting it to validated data repository 430. The system enables transparent, programmatic organization of anomaly events, enabling downstream review or automated remediation workflows.

In certain embodiments, detected anomalies identified through threshold breaches related to reconciliation calculations or violations of configurable schema and structural rules are systematically logged by anomaly detection engine 410 into validated data repository 430. Each logged event includes triggering conditions, rule identifiers, and severity indicators. These system-generated flags serve as inputs to downstream review and remediation workflows, often presented via user interfaces (such as reconciliation review modals or anomaly investigation workflows) where users can investigate the context, determine the appropriate root cause, manually clear or confirm flags, and refine the underlying thresholds or rules in database 432 based on their domain expertise, thereby influencing future anomaly detection behavior. For example, when evaluating a Q2 2023 capital account statement, anomaly detection engine 410 identifies that the "Quarter-To-Date Distributions" field is reported as $500,000 for Fund Z and concurrently, queries validated data repository 430 to substantiate the reported figure against corresponding distribution documents associated with Fund Z occurring within the reporting period. In this example, no corresponding distribution data exists to substantiate the $500,000 reported figure; accordingly, anomaly detection engine 410 determines that it cannot identify corresponding distributions that reconcile with the reported distribution value for the quarterly period within configured tolerance levels (e.g., 0.1% or $500). Consequently, the engine flags this inconsistency as an anomaly requiring review, associating appropriate metadata with the record. In certain embodiments, anomaly detection engine 410 is operable to detect omissions of structured field values where continuity across reporting periods is expected. This includes evaluating whether a field previously extracted and validated for a given entity appears to be unintentionally absent from a subsequent record, despite a lack of intervening activity or transactional changes that would otherwise reset or invalidate the prior value. For example, if an inception-to-date field such as "Cumulative Distributions" was present in a prior reporting period but is missing from the current structured record, and no new contributions, distributions, or reclassifications are detected, anomaly detection engine 410 may flag the absence as an anomaly—indicating a missed carry-forward inference or blueprint execution edge case. The associated anomaly metadata may include field lineage references, expected source continuity, and candidate corrective actions, such as re-evaluating the structured inference instructions or reprocessing with adjusted blueprint parameters.

Temporal reconciliation engine 412 is operable to evaluate structured financial records for consistency across multiple reporting periods by applying cross-period validation logic, balance rollforward calculations, and inferred period analysis. In various embodiments, temporal reconciliation engine 412 receives structured records, including field values, reporting intervals, and blueprint identifiers, via data processing and transformation system interface 440. Leveraging the temporally-aligned dataset, the engine applies time-aware validation routines to detect temporal anomalies, fill inferred gaps, and validate intra-period consistency in accordance with rule definitions retrieved from validation rules and accounting logic database 432. More specifically, temporal reconciliation engine 412 performs field-level rollforward calculations based on defined accounting schemas.

These schemas may specify, for a given document type and fund class, how current-period values should be derived from prior-period balances and transactional activity. For example, a rollforward rule may require that a current-period "Ending Capital Balance" equal the prior-period "Ending Capital Balance," plus new "Contributions," minus "Distributions," plus "Net Income." The engine retrieves the necessary historical values from validated data repository 430, aligns them using document timestamps or fund-specific reporting calendars, and computes the expected result. Deviations from expected rollforward outputs are flagged and appended to the current record.

For example, when processing a Q3 2023 capital account statement for Fund L, temporal reconciliation engine 412 retrieves the validated Q2 2023 record from validated data repository 430. The prior-period record includes an "Ending Capital Balance" of $12,500,000. The Q3 record under evaluation contains the following field values: "Contributions" of $1,000,000, "Distributions" of $500,000, and "Net Income" of $150,000. Based on the accounting schema associated with the blueprint ID for the Q3 document, temporal reconciliation engine 412 applies the defined rollforward rule:

Ending Capital Balance ($Q3$)=Ending Capital Balance ($Q2$)+Contributions−Distributions+Net Income.

Substituting values, the expected Q3 ending balance is computed as:

$12,500,000+$1,000,000−$500,000+$150,000=$13,150,000.

However, the actual "Ending Capital Balance" reported in the Q3 document is $13,250,000. The engine calculates the variance of $100,000, compares it against a tolerance threshold defined in validation rules and accounting logic database 432, and determines that the deviation exceeds the allowed margin. A reconciliation exception is triggered, and anomaly metadata is appended to the structured record, including the deviation value, source field lineage, and triggered rule ID.

In certain embodiments, temporal reconciliation engine 412 is further operable to detect missing or skipped periods by evaluating gaps in reporting frequency or misalignment in period labels. For example, if a fund's reporting cadence is quarterly and the available statements include Q1 and Q3 but not Q2, the engine identifies this as a missing interval. It may further apply inferential validation using inception-to-date (ITD) and year-to-date (YTD) values to infer what would have appeared in the missing statement. These inferred balances may be logged as derived records and associated with metadata indicating their inferred status.

In certain embodiments, temporal reconciliation engine 412 is operable to apply carry-forward logic to structured records containing inception-to-date values when such fields are absent from a document but were present in a prior period. For example, when a field such as "Cumulative Distributions" or "Capital Commitments" is not reported in a current-period document, temporal reconciliation engine 412 evaluates the omission in light of the document's classification, prior values, and surrounding transactional context. If the engine determines that no intervening transactions have occurred—based on contributions, distributions, or related event records—it can infer that the prior-period value remains valid. In such cases, the system may generate a carry-forward value by replicating the most recent validated field value from validated data repository 430 and annotating the record with metadata indicating the inferred status and temporal linkage to the source period.

This process differs from roll-forward logic, which computes expected values based on accounting rules and transaction deltas; carry-forward logic preserves continuity of known balances when documents omit unchanged data fields. The resulting carry-forward assertion supports consistency across reporting periods in situations where data sparsity or formatting variability would otherwise introduce artificial gaps in longitudinal datasets.

Temporal reconciliation engine 412 may also perform sequence validation across statements using blueprint-linked expectations. For instance, certain fund types may require that "Capital Called" amounts in consecutive capital call notices follow a non-decreasing sequence, or that performance allocations be reconciled quarterly. These expectations are resolved from blueprint IDs and schema definitions, and may be enforced by applying either strict equality checks or tolerance-based comparison logic. For example, when processing a Q4 capital account statement for Fund M, temporal reconciliation engine 412 retrieves the corresponding Q3 statement and verifies that the "Ending Capital Balance" from Q3 matches the "Beginning Capital Balance" of Q4. It then applies a rollforward rule using Q4 contributions, distributions, and income to compute an expected Q4 ending balance. If the computed value deviates from the reported value by more than a configured threshold (e.g., $100), the engine logs a reconciliation exception, appends metadata to the current record, and flags the record in validated data repository 430.

Embedded structure analysis module 414 is operable to detect, interpret, and resolve complex financial reporting structures in which multiple transaction types are embedded within a single field or distributed across overlapping field entries. In various embodiments, embedded structure analysis module 414 receives structured records that have been processed by anomaly detection engine 410 and temporal reconciliation engine 412. Embedded structure analysis module 414 analyzes structured field values derived from the unified dataset, extracted contextual indicators, and blueprint-linked parsing metadata to identify and reconstruct nested financial activity, including but not limited to embedded distributions within capital calls, netted transaction pairs, and formatting-obscured reversals.

More specifically, embedded structure analysis module 414 applies a rule-based disaggregation framework and blueprint-specific semantic anchors to determine whether a structured field value reflects more than one financial concept. Nested parsing rules, retrieved from validation rules and accounting logic database 432, may define contextual cues (e.g., "net of concurrent distribution"), field interdependencies, or sequence-based triggers to identify composite field behavior. In certain embodiments, embedded structure analysis module 414 applies pattern recognition logic or model-based inference to detect candidate field values or free-text entries containing embedded logic, such as numerical values preceded or followed by indicators of recallable, offset, or reclassified amounts.

Embedded structure analysis module 414 is operable to identify and disaggregate encoded multi-transaction representations within structured records that originate from ambiguous or overloaded document formats. In various embodiments, embedded structure analysis module 414 receives structured field values and contextual metadata that have been processed by anomaly detection engine 410 and temporal reconciliation engine 412. Embedded structure analysis module 414 applies blueprint-governed disaggregation routines to detect instances where multiple data events—such as overlapping updates, masked corrections, or reversed entries—are combined into a single extracted value. The resulting disaggregated outputs support generation of schema-compliant, component-resolved structured records for downstream processing, storage, and query execution.

More specifically, embedded structure analysis module 414 applies rule-based parsing logic and field segmentation routines using blueprint-defined semantic anchors. These anchors may include key phrases, numeric patterns, or structural tokens that indicate encoding of multiple distinct operations within a single reported field. Parsing rules are retrieved from validation rules and accounting logic database 432 and may define how overlapping tokens, inline modifiers, or formatting anomalies should be interpreted. In certain embodiments, embedded structure analysis module 414 applies pattern recognition models or model-based inference to evaluate whether an extracted value reflects one or more logical subcomponents that should be individually processed and recorded.

For example, embedded structure analysis module 414 may receive or operate upon an extracted field associated with the phrase: "1,000,000 net of 200,000 tax withheld pursuant to LPA Section 5.4." Based on blueprint-linked parsing logic and semantic interpretation of terms like "net of," the module determines that the phrase represents multiple distinct financial values. The module generates and stores three discrete structured entries for each component: the explicitly stated net amount (1,000,000), the deducted amount identified as tax withheld (200,000), and the calculated gross amount (1,200,000) implied by the relationship. These component records are tagged with source reference metadata and semantic role identifiers (e.g., "net distribution", "tax withheld", "gross distribution"). These records are then stored in validated data repository 430 and linked to the original document, enabling auditability, calculation validation (triangulation), and downstream integration.

In certain embodiments, embedded structure analysis module 414 further performs cross-record validation to verify that reconstructed entries do not conflict with previously stored structured data. For example, when a prior adjustment is detected, the module queries validated data repository 430 (containing the unified historical dataset) to confirm that the corresponding event is present and reconciles appropriately with historical values. If the reconstructed entry introduces inconsistency or violates temporal alignment rules, the module appends an exception tag and classifies the entry for downstream review.

Structured data management and output system interface 442 is operable to transmit validated, schema-conformant data records from data validation and integrity system 144 to structured data management and output system 146. In various embodiments, structured data management and output system interface 442 serves as the output conduit for structured records that have completed entity resolution, normalization, validation, and reconciliation workflows. The interface supports bidirectional data transfer in some configurations, enabling downstream components to request historical records, submit data enrichment feedback, or initiate revalidation processes based on usage context. More specifically, structured data management and output system interface 442 packages structured records—along with associated metadata such as validation flags, blueprint IDs, version identifiers, and reconciliation results—into transport payloads conforming to the interface schema expected by structured data management and output system 146. In certain embodiments, the interface performs final data formatting, mapping internal schema fields to output-ready field structures that align with reporting, visualization, or integration targets.

For example, when a normalized and validated record corresponding to a capital account summary is transferred via structured data management and output system interface 442, the interface bundles field entries such as "NAV," "Contributions," and "Distributions" with metadata tags indicating validation status, applied normalization rules, reconciliation outcomes, and any associated anomaly detection flags. These payloads are transmitted using schema-bound protocols, such as JSON-over-HTTPS or binary message formats over an internal messaging bus, depending on deployment configuration.

In certain embodiments, structured data management and output system interface 442 also supports query parameterization or streaming integration requests. For instance, downstream components may issue a query request specifying a particular fund, reporting interval, or field tag. The interface processes the request, retrieves the corresponding record from validated data repository 430, and transmits the result in accordance with system-specific performance and formatting constraints.

In accordance with various embodiments, structured data management and output system interface 442 ensures that validated records exit data validation and integrity system 144 in a format that maintains schema integrity, preserves audit context, and is ready for downstream usage, including report generation, data export, or external integration via structured APIs.

Adaptive query execution and optimization system interface 444 is operable to transmit validated, structured records and associated metadata from data validation and integrity system 144 to adaptive query execution and optimization system 148. In various embodiments, adaptive query execution and optimization system interface 444 supports data exchange workflows in which structured financial records, reconciliation status indicators, or validation-derived context are consumed for the purpose of executing parameterized queries, generating computed aggregates, or fulfilling downstream inference requests. More specifically, adaptive query execution and optimization system interface 444 acts as a transport and normalization bridge, enabling cross-system compatibility between schema definitions produced by validation pipelines and data selection models configured within adaptive query execution and optimization system 148. The interface may expose structured query endpoints, event-driven triggers, or direct schema-anchored data streams, depending on system deployment. In certain embodiments, the interface supports transmission of query-execution guidance metadata—such as available field keys, historical record boundaries, and validation lineage—used by the downstream system to optimize query path selection.

For example, when a query request is issued for "Ending Capital Balance" values across a reporting interval for a specific investor or fund, adaptive query execution and optimization system interface 444 transmits the filtered records from validated data repository 430, ensuring that each returned record includes schema identifiers, applicable blueprint ID, anomaly flags, and validation outcome annotations. If the downstream system applies structured inference instructions to project missing values or derive temporal aggregates, the metadata transmitted via the interface supports informed path selection and data disambiguation.

In certain embodiments, adaptive query execution and optimization system interface 444 enables latency-aware or data-size-aware routing decisions. For instance, when large batches of reconciled records are required by adaptive query execution and optimization system 148, the interface may prioritize schema-cached data views or initiate batch transfers during preconfigured synchronization windows. In other configurations, streaming record delivery may be triggered upon the completion of validation for each document, supporting near-real-time availability of structured data for high-frequency query environments.

In accordance with various embodiments, adaptive query execution and optimization system interface 444 provides the connective infrastructure between validated document data and dynamic query frameworks, ensuring that structured records are transmitted with full semantic, temporal, and reconciliation context—thereby supporting intelligent query planning, traceable inference operations, and system-wide data consistency.

Figure 5:
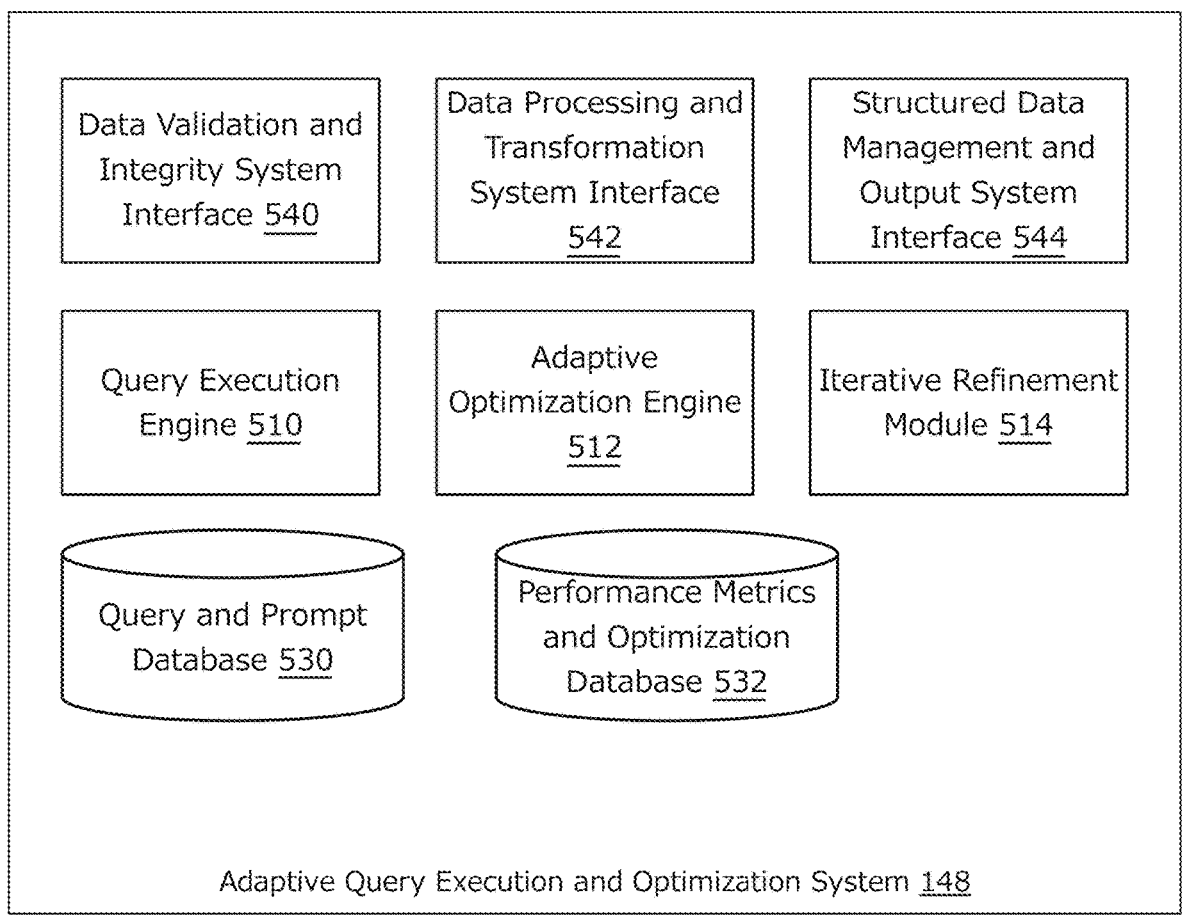
FIG. 5 illustrates an adaptive query execution and optimization system, in accordance with various embodiments.

FIG. 5 illustrates an example adaptive query execution and optimization system 148 in accordance with various embodiments. As shown, adaptive query execution and optimization system 148 includes query execution engine 510, adaptive optimization engine 512, and iterative refinement module 514. The system interfaces with query and prompt database 530 and performance metrics and optimization database 532. FIG. 5 also depicts external system interfaces, including data validation and integrity system interface 540, data processing and transformation system interface 542, and structured data management and output system interface 544, each operable to exchange structured data, metadata, and optimization feedback across connected system components.

Data validation and integrity system interface 540 is operable to receive validated, schema-conformant records and associated metadata from data validation and integrity system 144 for use in query execution, optimization, and refinement operations within adaptive query execution and optimization system 148. In various embodiments, data validation and integrity system interface 540 provides structured access to field-level entries, validation lineage, anomaly flags, and reconciliation metadata—transmitting these artifacts in a format suitable for dynamic query interpretation and response assembly.

More specifically, data validation and integrity system interface 540 implements a schema-bound transport mechanism configured to expose document-derived structured records, complete with temporal identifiers, fund-specific blueprint mappings, and validation context tags. For example, when a downstream query references "Ending Capital Balance" values across a reporting interval, data validation and integrity system interface 540 retrieves the relevant record set from validated data repository 430, formats the response with the appropriate schema tags and version metadata, and transmits the result to query execution engine 510.

In certain embodiments, data validation and integrity system interface 540 supports conditional field delivery based on requestor profile or optimization state. For instance, if adaptive optimization engine 512 has identified that certain fields (e.g., "Management Fee Offset") consistently fall below query relevance thresholds, the interface may delay or exclude these fields unless explicitly requested—thereby reducing transfer latency and supporting a resource-aware execution path.

In accordance with various embodiments, data validation and integrity system interface 540 enables context-rich ingestion of validated records into adaptive query execution and optimization system 148, ensuring that downstream query logic operates on reconciled, audited data while retaining full visibility into upstream transformations, anomaly annotations, and rule-based reconciliation outcomes.

Data processing and transformation system interface 542 is operable to access structured document data, transformation outputs, and intermediate extraction artifacts originating from data processing and transformation system 142. In various embodiments, data processing and transformation system interface 542 enables adaptive query execution and optimization system 148 to retrieve original extracted fields, blueprint-applied field mappings, and transformation lineage necessary for executing context-aware query logic or performing cross-stage data reconciliation.

More specifically, data processing and transformation system interface 542 allows the adaptive query execution and optimization system 148 to retrieve pre-validation or partially normalized data fields when required for diagnostic refinement or probabilistic inference. For example, if a query issued to query execution engine 510 involves ambiguous or sparsely populated fields—such as "Management Fee Offset" or "Recallable Capital"—data processing and transformation system interface 542 can retrieve blueprint-specific field anchors, token span candidates, or unresolved entity references from data normalization module 316 and parsing and text extraction engine 312 to support iterative query refinement.

In certain embodiments, data processing and transformation system interface 542 supports blueprint-aware data access, enabling the downstream query system to apply extraction context during query evaluation. For instance, if a query references a capital call amount field extracted under blueprint ID BP-PE-CALL-V4, the interface returns not only the extracted field value but also the semantic trigger phrase used during extraction (e.g., "Capital Due"), associated layout coordinates, and any override conditions applied during transformation.

In accordance with various embodiments, data processing and transformation system interface 542 provides deep linkage to the earlier transformation stages of the system architecture, allowing adaptive query execution and optimization system 148 to conduct robust query resolution workflows anchored in semantic, contextual, and field-level traceability.

Structured data management and output system interface 544 is operable to receive structured query results, schema-aligned records, and refinement feedback from adaptive query execution and optimization system 148 and deliver those outputs to structured data management and output system 146 for downstream reporting, integration, or presentation. In various embodiments, structured data management and output system interface 544 serves as the final interface between adaptive query execution workflows and data distribution layers, supporting the delivery of both raw query results and enriched, post-optimization datasets.

More specifically, structured data management and output system interface 544 transmits field-level values and associated metadata—such as confidence scores, provenance tags, and refinement logs—into structured data pipelines that feed report generation modules, portfolio dashboards, or external data services. For example, when a user query requests quarterly capital account summaries across multiple funds, the interface transfers the filtered record set along with fund identifiers, reporting period timestamps, and blueprint lineage tags, enabling structured data management and output system 146 to generate export-ready representations or live visualizations.

In certain embodiments, structured data management and output system interface 544 may support streaming record delivery, batch transfer, or on-demand API response formats, depending on deployment configuration. The interface may also encode field-level annotations such as anomaly flags, inferred values, or blueprint-specific resolution context for full traceability. Where applicable, the interface ensures schema consistency by resolving field naming conventions and formatting rules based on a shared registry or normalization profile linked to structured data repository 330.

In accordance with various embodiments, structured data management and output system interface 544 ensures the delivery of enriched, validated, and query-optimized records from adaptive query execution and optimization system 148 to structured data management and output system 146, supporting downstream analytics, visualization, and system integration with full auditability and semantic continuity.

Query execution engine 510 is operable to interpret, process, and resolve structured queries issued against normalized data records within adaptive query execution and optimization system 148. In various embodiments, query execution engine 510 receives query inputs originating from user device(s) 155, external systems, or internal scheduled tasks, and executes those queries against validated data repository 430 and other data sources accessible via system interfaces 540-544.

More specifically, query execution engine 510 parses incoming query instructions—represented as structured inference instructions, blueprint-constrained field lookups, or composite filter expressions—and generates executable plans for retrieving the appropriate records, attributes, or derived values. These plans may include conditional filtering, aggregation, field-level expansion, or logical joins across multiple document records and reporting intervals. For example, if a query requests "all capital call notices with requested amounts exceeding $1M within the past two quarters," query execution engine 510 formulates an execution plan that filters structured records by document type, applies numerical threshold conditions to the "Capital Requested" field, and constrains results using the reporting date metadata.

In certain embodiments, query execution engine 510 maintains a query abstraction layer that translates human-readable query inputs into schema-conformant execution logic. This abstraction may support synonyms (e.g., "NAV"≈"Account Value"), temporal phrases (e.g., "last quarter"), or entity references (e.g., "Fund X") by resolving them through lookup tables and blueprint-specific context stored in structured data repository 330 and query and prompt database 530. The engine may also incorporate blueprint-informed logic to disambiguate field references, infer relevant filter conditions, or resolve multi-field dependencies.

In accordance with various embodiments, query execution engine 510 supports both one-time query evaluation and continuous evaluation modes, the latter of which monitor for changes in underlying data (e.g., new validated documents or updated reconciliation results) that would affect query outputs. Results are returned with embedded metadata indicating rule lineage, query match criteria, and optimization status, which may be further processed by adaptive optimization engine 512 or iterative refinement module 514.

Adaptive optimization engine 512 is operable to evaluate the performance, accuracy, and efficiency of query execution workflows and to apply dynamic adjustments that improve query interpretation, execution latency, and result fidelity over time. In various embodiments, adaptive optimization engine 512 monitors execution traces, field access patterns, anomaly flags, and refinement metrics to identify opportunities for query plan tuning, field substitution, or blueprint parameter adjustment.

More specifically, adaptive optimization engine 512 analyzes metadata associated with prior queries—such as field-level confidence scores, rule-match history, and blueprint resolution paths—to identify areas where extraction or classification ambiguity has impacted result quality. When detected, the engine may inject structured optimization hints into the query execution engine 510 pipeline. These hints may modify filter thresholds, expand synonym lookups, or re-rank ambiguous field candidates using weighted scoring derived from prior result sets. For example, if repeated queries for "Account Value" yield inconsistent matches across funds, the engine may elevate "Ending NAV" or "Ending Capital Balance" as preferred anchors for that field in subsequent plans.

In certain embodiments, adaptive optimization engine 512 references performance metrics and optimization database 532 to retrieve historical response times, field-level error rates, and result acceptance scores submitted via system feedback channels. The engine applies a rule-based or model-based adjustment layer that refines field resolution logic, adjusts blueprint selector weights, or recommends alternative inference instructions. For instance, if structured inference instructions targeting the "Capital Call Amount" field repeatedly yield low-confidence values, the engine may recommend switching to a prompt that anchors on "Contribution Amount" based on semantic parsing model instructions set forth in the blueprint.

Adaptive optimization engine 512 may also track blueprint-specific failure patterns, such as repeated misclassification of tabular versus narrative layouts, and flag those configurations for model retraining or rule revision. Optimization outcomes are written back to performance metrics and optimization database 532 and may trigger deferred updates to query and prompt database 530 for long-term refinement.

In accordance with various embodiments, adaptive optimization engine 512 enables a closed-loop refinement cycle that uses system-level performance telemetry to enhance query accuracy, increase system responsiveness, and ensure alignment between user expectations and blueprint-driven data interpretation workflows.

Iterative refinement module 514 is operable to perform multi-pass refinement of partially resolved query outputs by reapplying structured inference instructions, adjusting query parameters, or invoking alternate blueprint paths based on intermediate results. In various embodiments, iterative refinement module 514 receives initial query results from query execution engine 510 and uses field-level metadata—including confidence scores, anomaly tags, and blueprint indicators—to identify result elements requiring reevaluation.

More specifically, iterative refinement module 514 applies a staged execution framework in which each pass reuses prior resolution artifacts while introducing controlled variation to the query scope, filter logic, or field interpretation instructions. For example, if a field value is returned with a confidence score below a defined threshold and is marked with an anomaly flag, the module may trigger a second pass using a fallback extraction strategy, such as switching from blueprint-guided resolution to direct token-level inference or expanding the semantic trigger window for candidate value selection.

In certain embodiments, iterative refinement module 514 references query and prompt database 530 to retrieve alternate structured inference instructions linked to the same query intent but mapped to different blueprint configurations. The module may then evaluate the performance of these alternatives using prior optimization metrics, such as field validation scores or user feedback acceptance rates, and select the most promising configuration for re-execution. For instance, when refining a query for "Distributions in Q2," the module may discover that the originally assigned blueprint suppresses nested transaction references; a secondary pass may apply a modified blueprint that includes footnote extraction and cross-field dependency analysis.

Iterative refinement module 514 can also coordinate with adaptive optimization engine 512 to track field-level deltas across refinement passes. These deltas may be used to compute refinement convergence metrics, detect overfitting to specific blueprint parameters, or flag ambiguous resolution paths for downstream human-in-the-loop escalation if necessary.

In accordance with various embodiments, iterative refinement module 514 implements a recursive data resolution architecture that enhances query result accuracy through controlled reapplication of field extraction logic and structured inference instructions, ensuring robust handling of edge cases, ambiguous values, and partially structured document artifacts.

Query and prompt database 530 is operable to store structured inference instructions, field-specific query templates, and blueprint-linked prompt variations that guide execution within adaptive query execution and optimization system 148. In various embodiments, query and prompt database 530 serves as the central repository for storing machine-readable representations of field extraction logic, blueprint mappings, fallback instructions, and refinement alternatives used by query execution engine 510, adaptive optimization engine 512, and iterative refinement module 514.

More specifically, query and prompt database 530 maintains a versioned index of structured inference instructions aligned with specific document classes, blueprint identifiers, and target schema fields. Each entry may encode semantic anchor phrases, token context windows, field-level disambiguation logic, and conditional modifiers tailored to extraction conditions. For example, an instruction for retrieving "Capital Called" values in a private equity capital call notice may include context cues such as "Please remit" or "Contribution Due," as well as fallback patterns like "Amount Due" in alternative layouts. These entries may be authored manually, generated by prompt tuning engines, or learned through optimization feedback from adaptive optimization engine 512.

In certain embodiments, query and prompt database 530 supports dynamic prompt generation based on real-time query context. For instance, if a user submits a multi-fund query for "Ending NAV across Q2 and Q3," the system may retrieve a generic NAV prompt, then apply fund-specific variations that align with each fund's blueprint structure and known field synonyms. The result is a set of query-specific inference instructions that preserve semantic fidelity across heterogeneous document layouts.

Query and prompt database 530 is updated as new blueprints are added, prior query executions are evaluated, and iterative refinement paths yield improved extraction outcomes. The database may also support tagging instructions with metadata such as confidence score thresholds, anomaly response logic, or usage frequency indicators, enabling optimization-aware prioritization during runtime.

In accordance with various embodiments, query and prompt database 530 provides the structured, blueprint-aware instruction set that governs model-based inference, fallback resolution, and adaptive refinement workflows across the query processing architecture, supporting accurate, consistent, and context-sensitive extraction of data from diverse and semi-structured inputs.

Performance metrics and optimization database 532 is operable to store telemetry data, execution diagnostics, refinement logs, and optimization metadata used to support closed-loop performance monitoring and dynamic system tuning within adaptive query execution and optimization system 148. In various embodiments, performance metrics and optimization database 532 maintains historical records of query resolution outcomes, model selection results, execution time statistics, anomaly detection rates, and blueprint-specific extraction efficacy.

More specifically, performance metrics and optimization database 532 captures structured records corresponding to each stage of the query execution pipeline. These records include: field-level resolution confidence scores, validation rule match outcomes, refinement iteration counts, fallback prompt effectiveness, and blueprint usage frequency. Metrics are timestamped and associated with the originating query ID, document class, fund schema, and target data fields, enabling longitudinal tracking of extraction accuracy, latency trends, and failure modes.

In certain embodiments, performance metrics and optimization database 532 is continuously updated by components such as adaptive optimization engine 512 and iterative refinement module 514. For example, if an optimized prompt variant for extracting "Requested Contribution Amount" from capital call notices demonstrates higher confidence scores and fewer downstream validation flags across ten consecutive queries, this outcome is recorded with a performance delta and tagged as a candidate for default inference instruction replacement in query and prompt database 530.

Performance metrics and optimization database 532 may also store derived metrics such as blueprint-level extraction precision, recall, and error rates, computed over batched executions or user feedback data streams. These aggregated indicators are used to recommend blueprint updates, prompt retraining, or model selection adjustments for low-performing configurations. For example, a blueprint associated with subscription agreements may show increased misclassification rates when used across funds with modified formatting conventions; the corresponding performance data may trigger a blueprint split recommendation or blueprint-specific extraction override.

In accordance with various embodiments, performance metrics and optimization database 532 enables adaptive query execution and optimization system 148 to function as a self-improving architecture, leveraging operational telemetry and result evaluation feedback to enhance blueprint selection, structured inference accuracy, and runtime decision-making in a technically grounded and resource-aware manner.

Figure 6:
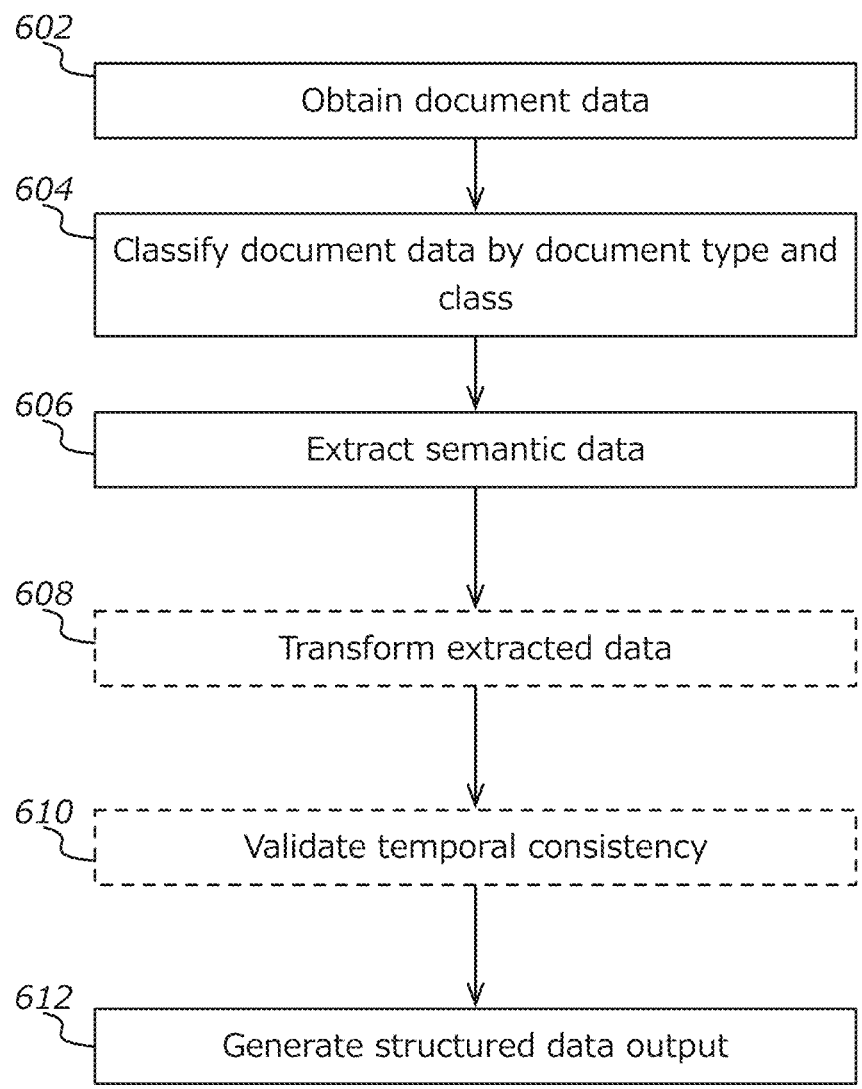
FIG. 6 illustrates an exemplary process flow for adaptive semantic parsing and structured data transformation, in accordance with various embodiments.

FIG. 6 illustrates an exemplary process flow for adaptive semantic parsing and structured data transformation, in accordance with various embodiments. The steps shown represent operations performed by one or more components of the system, including document ingestion and preprocessing system 140, data processing and transformation system 142, and data validation and integrity system 144, as described in FIG. 1B, FIG. 2, FIG. 3, and FIG. 4. The process may include additional steps, fewer steps, or steps executed in a different order without departing from the scope of the invention, as would be apparent to one of ordinary skill in the art.

At step 602, the system obtains document data. In an embodiment, document data includes, e.g., financial agreements, fund notices, investor statements, scanned images, layered or compressed PDFs, and OCR-processed text files. These documents may contain tabular and narrative content representing structured financial concepts such as fund names, entity identifiers, contribution amounts, capital call notices, net asset value (NAV), management fees, distribution summaries, or period-end capital balances. The document data can be obtained from, e.g., user device(s) 155, third-party data sources 158, or document repositories internal to the system. Documents may be uploaded manually through a user interface, received via secure API from fund administrator platforms, or synchronized from external file servers on a scheduled or event-driven basis.

In certain embodiments, document ingestion controller 210 within document ingestion and preprocessing system 140 is operable to receive, route, and register new documents upon arrival. Document ingestion controller 210 may compute a document hash to support deduplication, associate received files with their corresponding source metadata, and enqueue the document for preprocessing. For example, when a layered PDF containing a capital call notice is received via third-party data source 158 over network 104, document ingestion controller 210 stores the document in raw document storage database 230 along with metadata such as upload timestamp, source ID, and potential fund label derived from the ingestion pathway.

In some cases, the ingestion pipeline also inspects the structural characteristics of each file—such as the presence of multiple text layers, embedded image objects, or visible watermark overlays—and tags them for preprocessing engine 214. These tags may influence how the system handles flattening, artifact remediation, or OCR pass-through behavior in subsequent steps. Once received, the document and associated metadata are routed to metadata extraction engine 212 for field-level structure parsing and preparation for classification at step 604.

At step 604, the system is operable to classify each standardized document according to document type and document class using vector-based semantic modeling and structural feature analysis. In an embodiment, document type may include, without limitation, capital account statements, capital call notices, subscription agreements, limited partnership agreements (LPAs), quarterly fund reports, and other documents containing structured, semi-structured, or unstructured financial and investment-related content. Document class may include hedge fund, private equity, venture capital, real estate, fund-of-funds, or other financial domain designations. Document classification engine 310 tokenizes the input and encodes the document text into a latent vector space using a transformer-based encoder trained on financial and legal corpora. The encoded vectors are compared against a labeled vector index representing predefined document type-class pairs using a similarity metric, such as cosine similarity, to identify the closest matching classification.

In one example, a scanned subscription agreement containing lexical indicators such as "Investor Commitment Schedule," "Subscription A mount," and "Fund Transfer Instructions" is tokenized and encoded by document classification engine 310. The resulting vector embedding is compared to labeled reference embeddings in the vector index, yielding a similarity score of 0.91 to the class "Subscription Agreement—Venture Capital." Based on this result, the system assigns the corresponding document type and class. To increase classification fidelity, the system may apply secondary feature extraction, such as identifying section headers, layout patterns, and term frequencies, including the presence of tabular contribution schedules or jurisdictional disclosure footers. These structural features are integrated with the vector-based similarity score to refine classification decisions. In certain embodiments, structural layout features include token frequency distributions, visual section headers, and indicators of tabular organization, which may be explicitly parsed and encoded as classification inputs.

Determining the correct document type and class is operable to support the technical configuration of downstream blueprint selection in step 606. Blueprint selection module 311 utilizes these classification labels to retrieve a document-specific extraction configuration that accounts for fund-specific terminology, reporting structures, and semantic field expectations. Without accurate classification, subsequent field extraction may fail to interpret key financial data correctly or apply improper normalization logic, resulting in loss of fidelity or data misalignment across fund types. As such, the classification process provides a technical basis for schema-conformant processing and blueprint-guided parsing.

Following classification, document classification engine 310 transmits the assigned type and class, confidence metrics, and extracted structural cues to parsing and text extraction engine 312. These values form the inputs used by blueprint selection module 311 in step 606 to determine and apply the appropriate blueprint configuration.

At step 606, the system extracts semantic data from the document. In an embodiment, extracting semantic data includes using a blueprint-guided parsing process. For example, the system selects a blueprint configuration for the classified document. In various embodiments, the blueprint selection is performed by document classification engine 310 based on the resolved document type and document class from step 604. A blueprint configuration refers to a structured extraction template that encodes semantic anchors, field expectations, and parsing logic tailored to the specific characteristics of the document type and financial domain. In certain embodiments, the extraction configuration includes semantic anchors that specify contextual triggers or token patterns used by the system to delimit candidate field regions during the document parsing process. In various embodiments, the extraction configuration further comprises field-specific parsing directives that instruct the system on token scope, pattern recognition constraints, or expected value types for individual target fields. These blueprint configurations are referenced during downstream parsing to ensure the extraction logic is appropriately aligned with the document's layout, terminology, and reporting style. The extraction configuration may also include layout alignment parameters that define spatial regions, positional hierarchies, or document segment boundaries used by the system to locate fields within tabular or mixed-content formats.

In accordance with various embodiments, extracting semantic data includes interpreting the semantic context of the document to identify and isolate field values consistent with schema expectations. As used herein, semantic context refers to machine-interpretable information derived from the surrounding structure and content of the document that indicates the likely meaning, classification, or function of individual fields or tokens. This includes analysis of spatial relationships (e.g., token proximity to labels), section boundaries, columnar structures, heading hierarchies, and other layout features. For instance, when a token appears beneath a heading such as "Capital Activity Summary" and is adjacent to a label "Ending Capital Balance," the system associates the token with a semantic role consistent with prior field mappings and blueprint-defined expectations. Semantic context may also incorporate document type-specific parsing logic, co-occurrence patterns, and metadata such as field lineage or section identifiers. Parsing and text extraction engine 312 applies this semantic context to guide structured inference and to disambiguate extracted values, ensuring the resulting semantic data conforms to the required schema.

In certain embodiments, blueprint selection involves querying a registry of blueprint identifiers indexed by document class and type. For example, a document classified as a "capital call notice" in the "private equity" domain may be mapped to blueprint ID BP-PE-CALL-V4. This blueprint includes extraction directives specifying trigger phrases (e.g., "capital requested," "please remit"), positional relationships (e.g., values located below headers), and structural segmentation rules (e.g., contributions block appears after introductory paragraph and before signature line). The selection may be further refined using metadata cues extracted during preprocessing, such as detected administrator names or formatting patterns. In certain embodiments, the blueprint further encodes field-specific parsing directives, which define tailored extraction logic for individual fields based on their expected formatting, positional context, and semantic characteristics within the document layout. The blueprint may also include layout alignment parameters that describe how visual and structural features—such as indentation patterns, bounding boxes, horizontal alignment zones, or columnar layouts—should be interpreted to align extracted fields with their corresponding labels or context anchors.

More specifically, blueprint selection may employ a hybrid resolution strategy that includes: (i) a rules-based lookup keyed by document classification; (ii) a machine learning model trained on historical blueprint selection outcomes; and (iii) confidence-scoring mechanisms that resolve among candidate blueprints based on token distribution and layout similarity. In some implementations, the system applies fallback logic to identify generalized blueprints when no high-confidence match is available for a newly encountered document structure. The selected blueprint ID is then propagated downstream to parsing and text extraction engine 312 to inform semantic anchoring and field segmentation logic. For example, if a document is classified as a "quarterly capital account statement" for a hedge fund, the system queries the blueprint registry using the labels "capital account statement" and "hedge fund." The returned blueprint, BP-HF-CAP-STMT-QTR-V2, defines extraction patterns such as associating "NAV" with "Ending Capital Balance" and resolving performance attribution from tabular sections labeled "Gain/Loss" or "Appreciation." The blueprint also specifies temporal anchoring rules based on quarter-end references, ensuring extracted fields are tagged with the correct reporting period. The extracted field values produced through this process are transformed into schema-conformant structured outputs, wherein each field is encoded according to the system's schema definitions, including required field types, relational structure, and validation constraints, as stored in structured data repository 330.

At step 608, the system transforms extracted data into structured, schema-aligned field outputs. In an embodiment, the transformation is performed using blueprint-guided logic applied to field candidates extracted in step 606. In various embodiments, parsing and text extraction engine 312 receives the document, its assigned classification, and the selected blueprint configuration, and executes a segmented parsing routine designed to convert unstructured or semi-structured content into structured field-level representations. These representations may include financial amounts, contributor details, performance metrics, transaction timestamps, and investor-specific allocations. In certain embodiments, parsing and text extraction engine 312 applies context-aware disambiguation to resolve ambiguous or partially overlapping field candidates by analyzing nearby token sequences, label proximity, and structural cues from the document layout. This includes handling ambiguous or overlapping values in which multiple tokens may satisfy partial match criteria for a target field, requiring additional disambiguation logic or confidence scoring to isolate the correct value.

More specifically, parsing and text extraction engine 312 applies a multi-pass extraction sequence that incorporates blueprint-informed anchors (e.g., keyword proximity rules, document purpose, key data dimensions, trigger phrases) and structured inference instructions. These instructions may encode token-label mappings, context window constraints, and value-type expectations for each field. The engine isolates candidate regions using segmentation heuristics—such as detecting table boundaries or heading blocks—and applies either rule-based or model-based inference to extract relevant field values from within those regions. In certain embodiments, the system applies semantic anchors to guide extraction routines toward likely field locations based on recurring lexical patterns, section context, or embedded indicator phrases.

For example, in a capital call notice containing a section labeled "Capital Activity Summary," the engine identifies the region using blueprint-defined headers and segment boundaries. Within this region, it applies token sequence labeling to extract field-value pairs such as "Capital Called," "Due Date," and "Wire Instructions." When ambiguity exists—e.g., multiple monetary values following a trigger phrase—the engine uses disambiguation logic encoded in the blueprint to select the most contextually relevant value, such as preferring centered bolded values over smaller-font footnotes. This selection process reflects a context-aware disambiguation approach, wherein the system evaluates visual, positional, and semantic context to resolve between multiple field candidates.

In certain embodiments, parsing and text extraction engine 312 applies post-processing steps to validate extracted values against expected formats, field types, or inter-field relationships. For instance, if the "Requested Capital" amount is expected to appear in U.S. Dollars, the engine confirms currency format; if multiple candidates are detected, the engine applies layout-based prioritization and context filtering as defined by the blueprint configuration. Extracted outputs are then structured into schema-aligned data objects and passed forward for reconciliation and validation in downstream components. These schema-aligned data objects include field representations that conform to the expected structure, datatype, and semantics defined by the active schema, ensuring compatibility with downstream validation, reconciliation, and presentation modules.

At step 610, the system validates temporal consistency. For example, the system applies validation rules to the extracted structured data to ensure that reporting periods, calculated balances, and related timestamps align with expected accounting behaviors. In an embodiment, the structured data includes field-level values derived from the source document using the assigned extraction blueprint, together with associated metadata such as document classification, fund identifiers, timestamp information, and confidence scores from the extraction models. These values are passed into a rule evaluation pipeline that is operable to verify logical, temporal, and domain-specific consistency based on a validation schema retrieved from validation rules and accounting logic database 432.

More specifically, the system retrieves a set of validation rules based on the document class, blueprint ID, and reporting period associated with the structured data. These rules may include arithmetic constraints (e.g., "Ending Capital=Beginning Capital+Contributions−Distributions+ Income"), balance integrity checks (e.g., NAV must not be negative), reporting frequency alignment (e.g., quarterly documents must reflect three months of activity), and inter-field consistency logic (e.g., "Contributions" and "Capital Called" must reconcile if present in the same reporting window). The rules are version-controlled and may be customized per fund schema or administrator convention.

In various embodiments, the system is further operable to generate visualizations of the validated structured data output. These visualizations may include field-level reconciliation summaries, validation status indicators showing pass or fail results for each validation rule, and anomaly flags highlighting extracted fields that triggered exceptions, inconsistencies, or disambiguation warnings. Such visual cues enable efficient downstream review, user interaction, and audit traceability.

For example, if a capital account statement extracted from a private equity document lists a beginning capital balance of $5,000,000 and records $1,000,000 in contributions and $500,000 in distributions, the validation rule engine computes the expected ending capital balance as $5,500,000. If the extracted value for ending capital balance is $5,700,000, the system flags a validation exception and annotates the record with a "variance detected" flag. The system may also include rule tracing metadata such as the specific rule ID triggered, the computed delta, and the associated field lineage. In certain embodiments, the validated structured output further includes extraction configuration traceability information, identifying the extraction configuration used to extract each field, including blueprint version, document classification context, and parsing directives applied.

In certain embodiments, the system supports conditional and exception-aware rule execution. For instance, if a blueprint specifies that clawbacks or recallable distributions are common in a given fund structure, the validation engine can load override logic that adjusts reconciliation expectations accordingly. These exception rules are injected dynamically into the rule chain execution based on blueprint metadata, temporal context, or document type.

In accordance with various embodiments, the application of validation rules is performed within a structured validation module that logs rule applications, failure conditions, and confidence thresholds, and stores the output in validated data repository 430. This enables downstream systems— such as anomaly detection engine 410 or temporal reconciliation engine 412—to leverage pre-validated and contextually annotated data records for additional consistency analysis or historical reconciliation.

At step 612, the system generates structured data output. In various embodiments, the structured data output includes a schema-conformant representation of the validated document content, produced by applying blueprint-specific data mappings, normalization logic, and field-level annotations derived from previous processing steps. The output may include canonical field names, standardized values, currency conversions, temporal tags, and reconciliation metadata, each organized according to the target schema associated with the corresponding fund type or document class.

More specifically, the system transforms intermediate field values-previously extracted and validated—into a machine-readable format, such as a structured JSON or SQL-compatible object, consistent with schema definitions stored in structured data repository 330. For example, a field originally extracted as "NAV: $1.5M" is normalized to "nav": 1500000.00 with an appended "currency": "USD" and "as_of_date": "2023 Dec. 31" field, based on blueprint rules and document metadata. In certain embodiments, the structured output includes a "blueprint_id" and "blueprint_version" field, which provide traceable context linking each extracted field to the configuration and logic used during extraction. This linkage ensures interpretability and alignment with the specific parsing expectations applied during earlier stages.

In accordance with various embodiments, the structured data output may be routed to validated data repository 430, made available to downstream systems via structured data management and output system interface 442, or transmitted to external systems via API endpoints. This output enables programmatic access to the cleaned, validated, and semantically aligned data, supporting downstream workflows such as portfolio analysis, fund reconciliation, audit reporting, and query execution.

Figure 7:
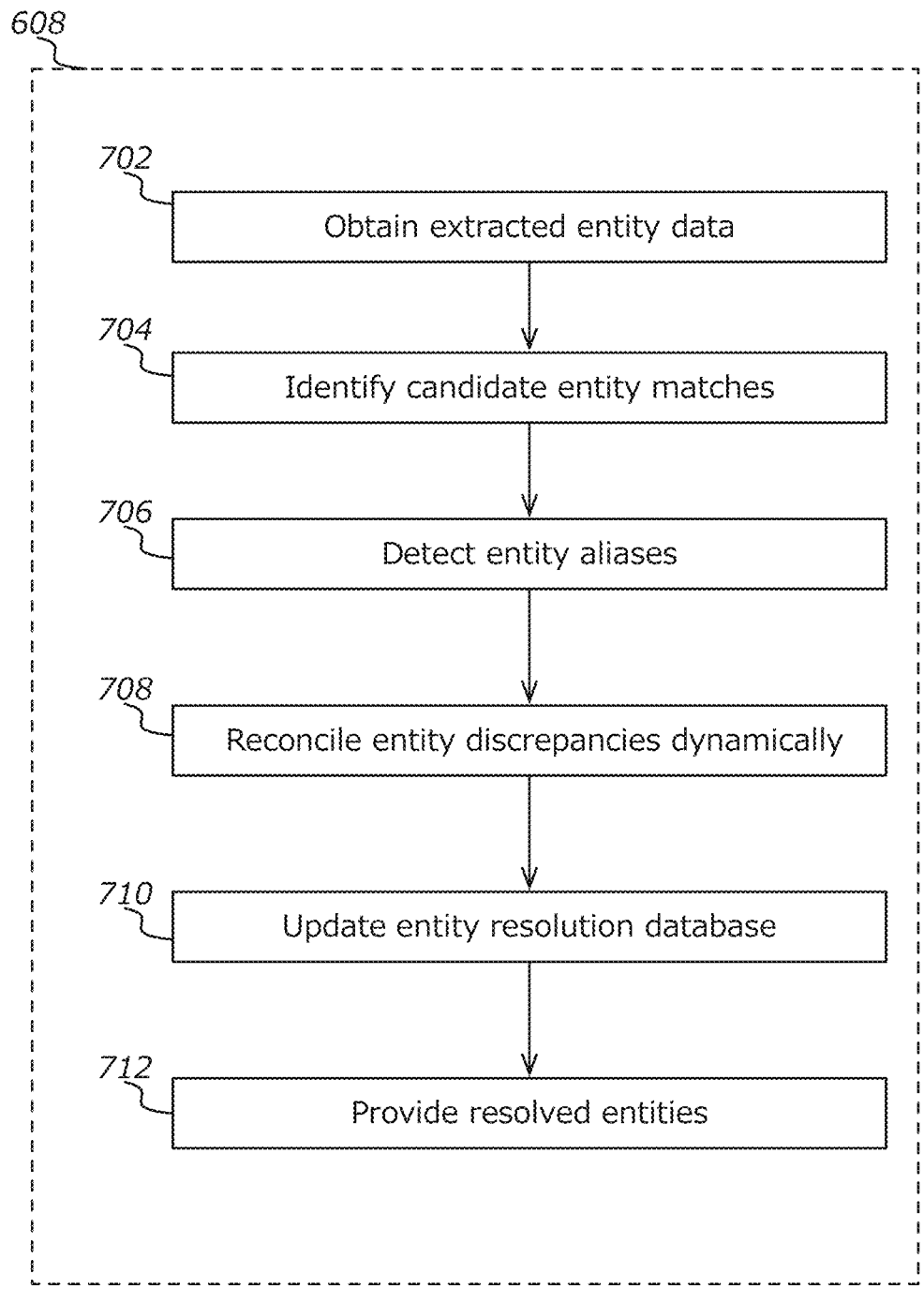
FIG. 7 illustrates a dynamic entity resolution process for detecting aliases and reconciling discrepancies, in accordance with various embodiments.

FIG. 7 illustrates an exemplary process for entity resolution and canonicalization based on extracted document content, in accordance with various embodiments. The steps represent operations performed by one or more components within data processing and transformation system 142, including parsing and text extraction engine 312, entity resolution engine 314, and associated components such as entity resolution database 332. In certain embodiments, the entity resolution process is invoked as part of the structured data transformation workflow described in FIG. 6—e.g., during or following the semantic data extraction and transformation stages at step 608—where extracted named entities are further processed to ensure standardized, disambiguated representations. The process may include additional steps, fewer steps, or steps executed in a different order without departing from the scope of the invention, as would be apparent to one of ordinary skill in the art.

At step 702, the system obtains extracted entity data. In various embodiments, the extracted entity data includes references to fund names, investor accounts, legal entities, custodians, and other named actors present in the source document. These entities are typically parsed during semantic extraction in FIG. 6, such as at step 606, and include metadata tags derived from parsing and text extraction engine 312 and entity resolution engine 314. Each entity reference may be associated with contextual information such as field label, document type, fund class, token confidence score, bounding box coordinates (for scanned inputs), or blueprint-defined semantic role.

The extracted entity data is transmitted into the resolution pipeline via an internal system message or schema-conformant data payload. For example, when parsing a capital call notice, parsing and text extraction engine 312 may extract the fund name "Crescendo Capital LP" from the document header, associate it with the field label "Fund Entity," and assign a token confidence score of 0.94 based on model prediction. This structured reference is passed downstream as part of the document's semantic output bundle.

In certain embodiments, extracted entity data also includes historical context and provenance metadata that influence downstream resolution decisions. For instance, if the extracted reference appears in a section labeled "On behalf of the General Partner," and prior documents have shown that this section correlates with administrative fund signatures, the system tags the entity with a semantic role of "Signer" or "Fund Admin," which may shape alias detection and reconciliation logic in steps 704 through 708.

At step 704, the system identifies candidate entity matches for each extracted reference. In various embodiments, entity resolution engine 314 receives the extracted entity reference from step 702 and initiates a dynamic, context-aware resolution strategy to locate possible canonical matches stored in entity resolution database 332. E ach candidate match is associated with a resolution score, metadata lineage, and contextual cues retrieved from historical records or previously validated documents. The resolution strategy may include string normalization, fuzzy matching, alias mapping, and embedding-based similarity scoring, each weighted by contextual alignment metrics and prior co-occurrence frequencies.

For example, when processing a capital call notice that includes the extracted entity reference "Crescendo Capital LP," entity resolution engine 314 first applies normalization to strip formatting variations, producing a canonicalized input string. It then executes a fuzzy matching algorithm using Levenshtein distance and identifies several partial matches in entity resolution database 332, including "Crescendo Capital, L.P." and "Crescendo Cap Mgmt LLC." A subsequent embedding similarity analysis compares vector representations of the input entity and each candidate, incorporating surrounding token context and blueprint-defined field role. The system retrieves a similarity score of 0.94 for "Crescendo Capital, L.P." and 0.68 for the second candidate. Based on confidence thresholds and metadata overlap—such as matching fund administrator tags and historical co-occurrence with the same mailing address—the first candidate is promoted for downstream scoring in step 706.

The system applies a sequence of matching techniques to identify viable candidates. These techniques include direct string matching against known canonical entity names, fuzzy matching using algorithms such as Levenshtein or Jaro-Winkler distance, and semantic similarity comparison using pre-trained embedding vectors derived from a fund— and finance-specific corpus. In certain embodiments, token embeddings are generated using domain-tuned transformer models that encode the extracted entity reference and compare it to a library of canonical entity embeddings using cosine similarity.

For example, if the extracted reference is "Crescendo Capital LP," the system first searches for an exact string match in entity resolution database 332. If no match is found, fuzzy matching algorithms are used to detect close variants, such as "Crescendo Capital, L.P." or "Crescendo Cap LP." In parallel, the engine generates an embedding vector for the extracted string and compares it against stored embeddings for entities previously resolved in the same fund class. If the top candidate exceeds a configured similarity threshold (e.g., 0.87 cosine similarity), it is included as a candidate match and annotated with a similarity score and matching rationale.

In certain embodiments, candidate entity matches are also retrieved based on contextual filters. For instance, if the source document was classified as a private equity capital call notice, and the document metadata indicates the administrator is "Fund Services Group," the system may restrict candidate matches to entities historically associated with that administrator or document type. These filters narrow the candidate set and improve resolution accuracy in the subsequent selection step.

At step 706, the system detects potential alias relationships among the candidate entity matches identified in step 704. In various embodiments, entity resolution engine 314 is operable to compare the candidate entities against previously recorded alias graphs and alias resolution history stored in entity resolution database 332. Alias detection includes identifying syntactic variations, naming conventions across reporting periods, jurisdictional suffix changes, and contextual co-occurrences that indicate semantically equivalent but syntactically distinct references.

More specifically, entity resolution engine 314 applies a temporal alias detection algorithm that traverses a versioned alias graph constructed from previously validated entity mappings. Each node in the graph represents a canonical entity, and edges encode observed alias relationships, annotated with timestamps, document classifications, and resolution confidence levels. When a newly extracted reference aligns with multiple alias-linked entities in the graph, the system evaluates temporal alignment, naming evolution patterns, and document context to determine whether the reference should be resolved to an existing alias group or form a new node.

For example, if the system identifies a candidate match for "Alpha Growth Fund LP" and detects prior resolutions linking "Alpha Growth Fund, L.P." and "Alpha Growth Fund Management Holdings" in Q1 and Q2 respectively, it traverses the alias graph and evaluates structural similarity, overlapping metadata, and temporal proximity. If the current document is dated Q3 and contains similar account IDs and administrator metadata as prior versions, the system classifies the new reference as a continuation of the existing alias group. This ensures consistency in downstream data normalization and avoids redundant entity proliferation in reporting systems.

At step 710, the system updates entity resolution database 332 based on the reconciliation outcome. In various embodiments, entity resolution engine 314 is operable to persist canonical mappings, alias relationships, confidence scores, and resolution metadata resulting from the dynamic reconciliation process described in step 708. This update ensures that future entity resolution attempts benefit from historical outcomes, improved confidence thresholds, and expanded alias coverage. More specifically, when an entity reference—such as "Helix Fund III LP"—is reconciled to the canonical entity "Helix Growth Fund III, L.P." with an ensemble confidence score above the configured threshold, entity resolution engine 314 records this association in entity resolution database 332. The update includes the matched alias string, match confidence score, timestamp of resolution, and any contributing contextual metadata, such as related document type, fund class, or co-occurring entity references. If the resolution involved disambiguation across similar candidates, the system logs the disqualified alternatives along with scoring rationale, supporting traceability and explainability.

In certain embodiments, entity resolution engine 314 supports incremental alias learning, where frequently encountered unrecognized aliases—once resolved—are automatically appended to the canonical entity's alias list. For example, if "Helix G.F. III" appears in multiple subscription agreements and is consistently mapped to "Helix Growth Fund III, L.P.," the system updates the alias graph to include this shorthand representation, adjusting resolution heuristics accordingly. These updates are versioned and tagged by source, enabling rollback, audit inspection, or administrator override via internal tools.

Entity resolution database 332 may also expose an internal schema validation interface that validates the updated entity structure for integrity, including graph cycle detection, cross-fund conflict checks, and temporal alias validity windows. This interface ensures that updates do not introduce conflicting relationships or violate fund-specific alias constraints. For example, when an updated alias mapping links "Helix G.F. III" to both "Helix Growth Fund III, L.P." and "Helix Partners III, L.P." in different documents, entity resolution database 332 invokes a graph integrity check. The internal schema validation interface traverses the alias graph to detect a cycle or cross-fund ambiguity, identifies the conflicting mappings, and flags the resolution entry for administrative review. The system may also suppress propagation of the new alias if the confidence score for one branch falls below a configured threshold or if the entities belong to mutually exclusive fund schemas. In certain implementations, the system records a conflict resolution log, annotating each decision path and scoring outcome to preserve explainability and support subsequent override workflows.

At step 712, the system provides resolved entities for downstream processing and future reuse. In various embodiments, entity resolution engine 314 outputs the canonical entity mappings—along with supporting metadata such as confidence scores, alias history, and resolution path identifiers—to other components within the data processing and transformation system 142. These outputs may be structured as schema-conformant records that include canonical entity names, associated aliases, fund identifiers, and document lineage references.

The resolved entities are stored in validated data repository 430 and made available to downstream systems such as data normalization module 316, temporal reconciliation engine 412, and query execution engine 510. This enables subsequent components to align field-level values to unified entity references, enforce consistency across reporting periods, and generate audit-traceable outputs. For example, when the same investor entity is referenced in multiple documents using variant names, the resolved canonical name is used to merge data streams and apply fund-level rollforward logic without duplication or fragmentation.

In certain embodiments, the system appends metadata fields such as entity_id, resolution_confidence, alias_trace, and resolution_timestamp to each structured record. These annotations enable downstream query execution and analytics systems to filter, trace, or override entity references based on policy criteria or user-defined parameters. Resolved entities and their resolution metadata may also be stored in entity resolution database 332 for reuse in future document processing. The system may also trigger notification events if the resolution result affects high-priority workflows, such as fund audit preparation or investor capital reporting.

Figure 8:
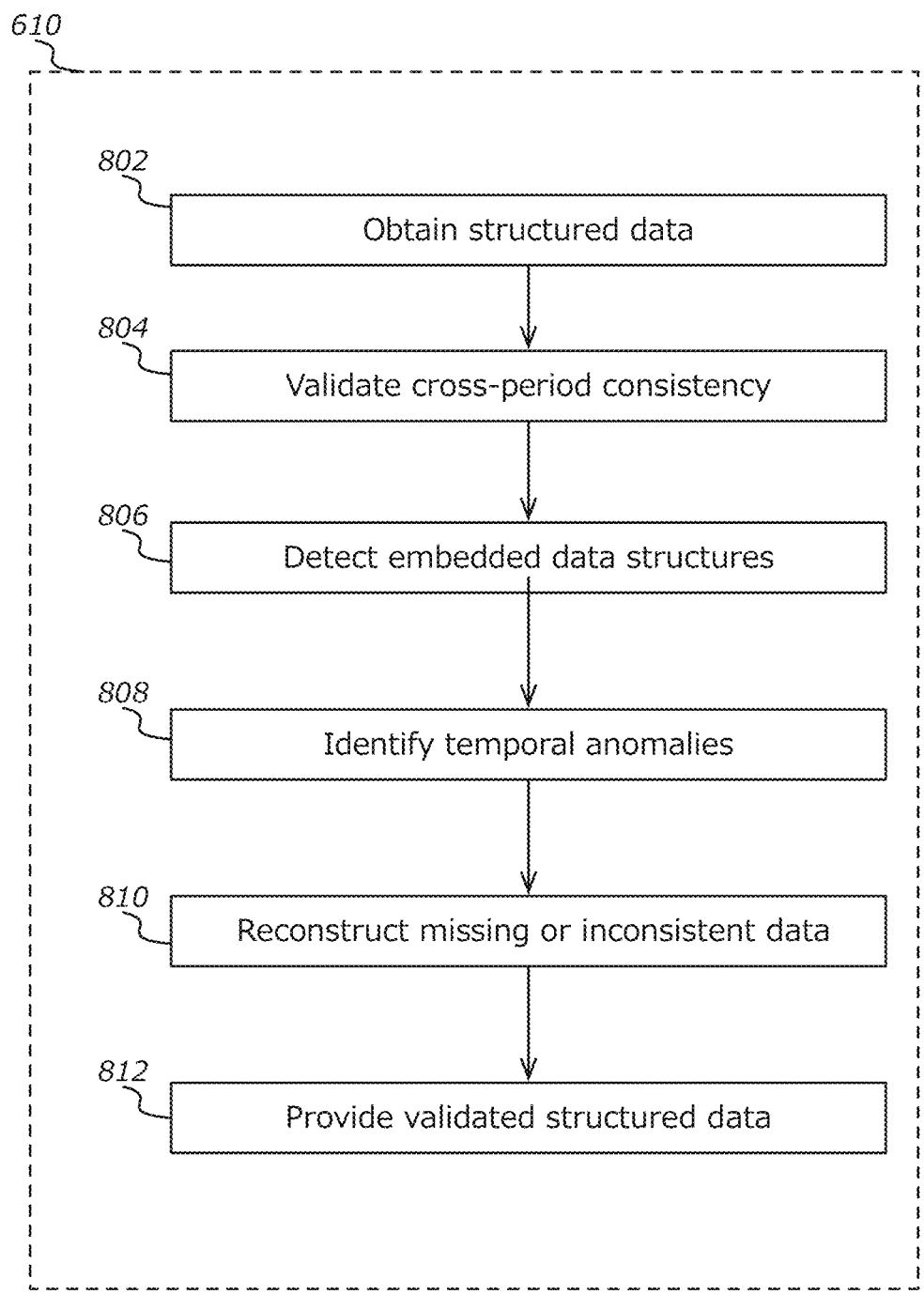
FIG. 8 illustrates a multi-interval data validation process, in accordance with various embodiments.

FIG. 8 illustrates an exemplary process for temporal reconciliation and nested transaction analysis applied to structured financial data, in accordance with various embodiments. The steps represent operations performed by one or more components of data validation and integrity system 144, including temporal reconciliation engine 412, embedded structure analysis module 414, and validation rules and accounting logic database 432, as described with reference to FIG. 4. The process may include additional steps, fewer steps, or steps executed in a different order without departing from the scope of the invention, as would be apparent to one of ordinary skill in the art. In an embodiment, the operations described in FIG. 8 may be executed as a subprocess of step 610 of FIG. 6, where reconciliation logic and nested transaction analysis are applied to verify and refine temporal consistency across reporting periods.

At step 802, the system obtains structured data. In an embodiment, structured data includes field-level values and associated metadata that have been previously extracted, validated, and normalized by components such as parsing and text extraction engine 312, entity resolution engine 314, and data normalization module 316. The structured data may represent key-value pairs such as "Beginning Capital Balance," "Capital Contributions," "Distributions," and "Ending NAV," each tagged with associated document identifiers, reporting periods, blueprint IDs, and extraction confidence scores.

The structured data may be obtained from validated data repository 430 or received as an inline stream from upstream processing pipelines operating within data processing and transformation system 142. In certain embodiments, temporal reconciliation engine 412 retrieves a collection of structured records for a given investor-fund pairing across multiple reporting periods. Each record includes data elements extracted from a distinct document, such as a quarterly capital account statement or an annual performance summary, along with metadata fields indicating the source document classification, timestamp, fund identifier, and extraction blueprint version. These records are assembled to support inter-period consistency analysis as described in the following steps.

At step 804, the system validates cross-period consistency of structured financial data by executing schema-conformant rollforward logic within temporal reconciliation engine 412. This logic is dynamically retrieved from validation rules and accounting logic database 432, and includes machine-executable constraints that align document-level field values across sequential periods using structured reconciliation models. These models define temporal dependencies, inter-field calculations, and exception-handling parameters that are executed by the system—not performed mentally or manually—and ensure that the data adheres to system-enforced temporal coherence rules.

In an embodiment, validating cross-period consistency includes comparing current-period field values—such as ending capital balance, net asset value (NAV), or contribution totals—against historical values retrieved from validated data repository 430. The system retrieves prior structured records based on fund identifier, investor ID, and reporting period, and applies rule-based logic to compute expected changes using rollforward formulas, distribution schedules, and contribution timelines. Discrepancies are flagged for further analysis. For example, when validating a Q4 capital account statement for "Fund A," the system identifies that the reported "Ending Capital Balance" is $12,500,000. It retrieves the Q3 "Ending Capital Balance" of $10,000,000 and verifies that interim contributions and distributions—extracted from transaction records and structured data fields—sum to $2,500,000. If the delta matches the expected balance shift, the record passes validation. If instead the net change is inconsistent with known transactional activity, the engine flags the anomaly and appends a cross-period validation error tag to the record. For example, if a private equity fund reports an unusually large distribution in Q4 that deviates from the expected contribution-distribution pattern established in prior periods, temporal reconciliation engine 412 applies a fund-specific override rule retrieved from validation rules and accounting logic database 432. This rule adjusts the rollforward equation by accounting for a scheduled year-end distribution, allowing the system to reconcile the ending capital balance without triggering a false anomaly. The engine applies a ±0.10% tolerance window during the check, as defined by blueprint metadata for the corresponding fund class and reporting schema.

At step 806, the system detects embedded data structures within the structured dataset. In various embodiments, embedded data structures refer to composite or interrelated value groupings that are represented as singular data fields but encode multiple subcomponents requiring separate treatment for downstream reconciliation and processing. These embedded structures may include, for example, capital contribution values that include recallable distributions, redemption totals that net against reinvestments, or management fees that are internally deducted from gross payout figures. The detection process is driven by blueprint-defined semantic relationships and dependency patterns that were applied during earlier parsing and normalization operations.

In an embodiment, embedded structure analysis module 414 is operable to receive schema-conformant structured data—previously validated through rule evaluation—and apply pattern recognition routines configured to detect composite field structures. These routines are guided by extraction blueprints and accounting logic rules retrieved from validation rules and accounting logic database 432. The system evaluates numerical patterns, co-occurring field labels, and inline annotations to determine whether a reported value should be decomposed into discrete components. For instance, if a "Capital Contribution" field contains a value of $1,000,000 and a nearby footnote states "includes $250,000 in management fees," embedded structure analysis module 414 segments the total into a $750,000 net contribution and a $250,000 management fee entry. Each segment is annotated and mapped to a defined field type based on transaction ontology schemas stored in structured data repository 330.

More specifically, embedded structure analysis module 414 applies dependency resolution logic that determines whether reported values contain multiple field identities. In certain embodiments, this logic incorporates heuristics based on fund-specific conventions, historical disaggregation behavior, and blueprint-based metadata. For example, if a hedge fund statement includes a line item labeled "Net Redemption: $800,000," the system checks historical records and administrator-defined schemas to determine whether this value likely includes reinvested amounts. If confirmed, the module isolates the reinvested component and reclassifies the remainder as a net cash outflow. Both components are annotated with classification tags, source document references, and field lineage metadata.

In accordance with various embodiments, embedded structure analysis module 414 transforms embedded structures into disaggregated outputs using machine-executed segmentation and classification operations. Each resulting field is structured according to schema definitions retrieved from structured data repository 330 and is encoded with metadata indicating the original composite field, semantic subtype, blueprint identifier, and any explanatory annotations. The resulting disaggregated fields are stored in validated data repository 430 for downstream consumption by reconciliation and reporting systems.

At step 808, the system identifies temporal anomalies in the validated financial data. In various embodiments, anomaly detection engine 410 is operable to analyze time-series data across multiple reporting periods and flag unexpected deviations in structured field values, based on configured validation rules, blueprint metadata, and historical record trends. These anomalies may relate to inconsistent contribution patterns, abnormal NAV fluctuations, missing expected distributions, or out-of-sequence reporting intervals. The detection routines are applied within the system and executed using algorithmic comparisons—not manual inspection or subjective interpretation.

In an embodiment, the system retrieves previously validated field-level records from validated data repository 430 and applies statistical and rule-based validation logic to each data series. This may include threshold-based comparisons (e.g., defined based on user configuration or industry norms), trend discontinuity detection, or time-gap verification using reporting calendar definitions from validation rules and accounting logic database 432. For instance, if a private equity fund reports an increase in inception-to-date Distributions of $100,000, but distribution transactions exist only accounting for $50,000 of distributions occurring within the corresponding reporting period for such fund—resulting in variance that exceeds the configured acceptable variance threshold—the engine labels the Distributions value with a "Variance Detected" flag for further review. This is accompanied by a structured anomaly tag, rule ID, and associated metadata trace.

In certain embodiments, the system also applies fund-specific anomaly profiles based on prior patterns or configured tolerances. For example, if a private equity fund exhibits irregular but recurring spikes in capital contributions at year-end, these patterns are modeled into the anomaly detection logic to reduce false positives. When a temporal anomaly is detected, the structured record is annotated with anomaly metadata, and a validation exception is appended for further review.

In certain embodiments, anomaly detection engine 410 assigns anomaly flags based on computed deviation metrics, schema-defined thresholds, and reconciliation failure indicators. Each anomaly flag is stored together with its associated triggering condition, field identifier, reporting period, and blueprint reference. This data is written to validated data repository 430 using schema-conformant record structures. A nomaly detection engine 410 may expose these records via structured data management and output system interface 442 for downstream access by query execution system 148, audit modules, or administrative review components.

At step 810, the system reconstructs missing or inconsistent structured data fields using schema-conformant inference logic and historical pattern alignment. In various embodiments, anomaly detection engine 410 or temporal reconciliation engine 412 is operable to identify incomplete, corrupted, or inconsistent field entries during prior validation steps. The system applies machine-executable reconstruction rules, defined in validation rules and accounting logic database 432, to infer corrected values or fill gaps in the structured dataset.

In an embodiment, the reconstruction process includes referencing historical validated records from validated data repository 430 and comparing field values across equivalent fund, investor, and reporting period contexts. The system may apply time-series interpolation, delta-based reconstruction, or rule-based value estimation based on predefined patterns. For instance, if a capital account statement is missing a "Beginning Capital" value for Q3, but includes the "Ending Capital" value for Q2 and valid Q3 contributions and distributions, the system computes the missing field by executing the reverse rollforward formula retrieved from validation rules and accounting logic database 432. More specifically, the system identifies that "Ending Capital (Q2) =$4,500,000," "Contributions (Q3)=$1,000,000," and "Distributions (Q3)=$200,000," and uses these values to reconstruct "Beginning Capital (Q3)" as $4,500,000 and "Ending Capital (Q3)" as $5,300,000. The reconstructed value is annotated with its computation lineage, including source fields used, applied rule ID, and reconstruction confidence score. This value is written to validated data repository 430 with metadata flags indicating inferred origin and downstream audit visibility.

In certain embodiments, reconstruction logic may also address format inconsistencies or unaligned value types by transforming outlier entries into schema-conformant representations. For example, if a field contains a contribution amount expressed as "EUR 750K" while the schema requires USD-normalized values, the system queries historical FX rates via third-party data sources interface 346 and reconstructs the field in USD, preserving the original currency and conversion metadata.

At step 812, the system provides validated structured data for downstream use by internal or external components. In various embodiments, the validated structured data includes schema-conformant representations of document-derived information that has been extracted, classified, reconciled, validated, and, where applicable, reconstructed. The output is assembled into structured payloads—such as JSON, XML, or protocol buffer formats-that conform to predefined data schemas stored in structured data repository 330.

The structured data may include normalized values, timestamp annotations, entity identifiers, validation rule outcomes, anomaly tags, reconstruction lineage, and associated metadata. Each field is mapped to its originating blueprint ID and classification context, ensuring traceability and semantic alignment with the document source. In certain embodiments, the validated data output is indexed for access by query execution system 148 or routed to structured data management and output system interface 442 for integration with external analytics platforms, audit systems, or reporting tools. For example, when processing a validated capital account statement, the system produces a structured output that includes canonical fields such as "nav": 12500000.00, "currency": "USD", "reporting_period": "2023-Q4", and "fund_entity_id": "FND-1023-PE". Each field is tagged with validation status, applied rule identifiers, and any reconstruction metadata. The resulting payload is stored in validated data repository 430 for future retrieval and analysis and may also be transmitted via internal APIs or external interfaces to enable integration with downstream systems, including query execution system 148, audit services, or structured reporting pipelines.

In certain embodiments, the system identifies patterns of anomaly recurrence across extracted documents by analyzing historical validation outcomes. For example, if a specific field frequently triggers a balance rollforward failure across similar document types, the system logs the anomaly occurrence and associates it with the corresponding document classification or extraction configuration. These recurrence patterns are used to inform refinement of structured inference instructions and to prioritize review of high-risk field mappings.

Figure 9:
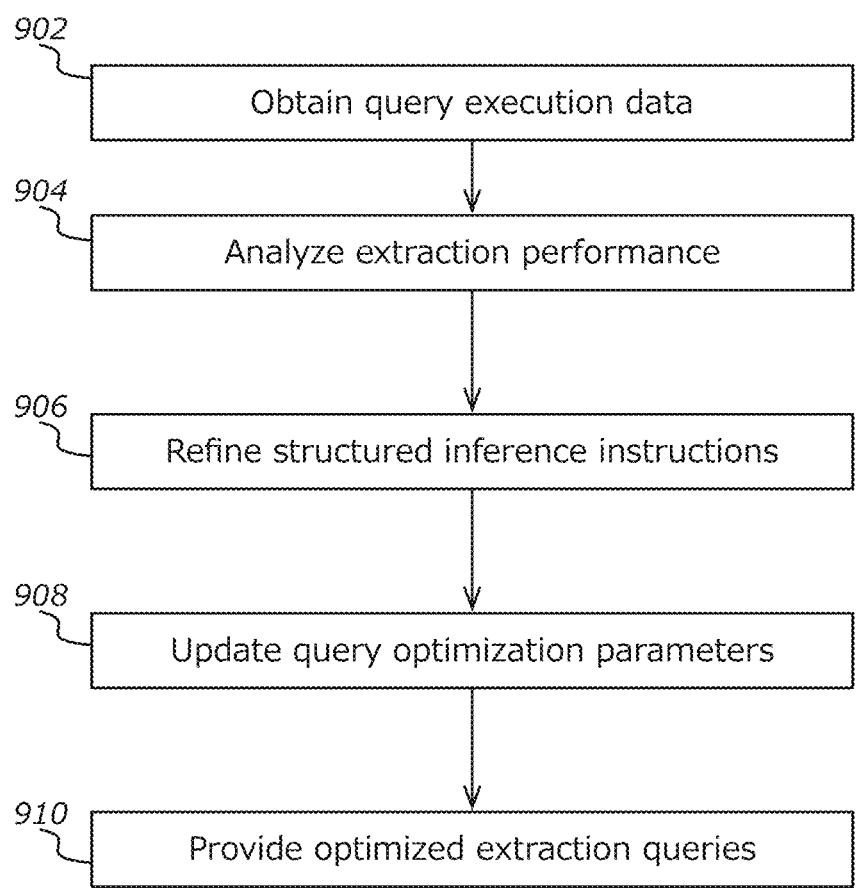
FIG. 9 illustrates an adaptive query refinement process, in accordance with various embodiments.

FIG. 9 illustrates an exemplary process for adaptive optimization of extraction queries based on historical query execution performance, in accordance with various embodiments. The steps represent operations performed by one or more components within adaptive query execution and optimization system 148, including query execution engine 510, adaptive optimization engine 512, and query and prompt database 530. In certain embodiments, this process is performed as a downstream subprocess following the generation of structured data in FIG. 6 and is used to refine prompt templates and extraction logic in connection with query workflows described in FIG. 5. The process may include additional steps, fewer steps, or steps executed in a different order without departing from the scope of the invention, as would be apparent to one of ordinary skill in the art.

At step 902, the system obtains query execution data. In various embodiments, the query execution data includes structured logs, query results, prompt inputs, user interaction metadata, and system-generated confidence scores corresponding to prior executions of extraction or retrieval tasks. This data is generated during operation of query execution engine 510 as described in FIG. 5 and includes both successful and suboptimal query attempts. Each record may contain a timestamp, user or system-issued prompt, execution outcome, extracted field values, blueprint reference, and any validation or error feedback.

In certain embodiments, adaptive optimization engine 512 analyzes the query execution data to identify recurring anomalies, degraded performance, or misaligned extraction outputs associated with specific blueprint IDs or document classifications. The system applies scoring models that incorporate field validation failure rates, prompt success metrics, and lineage tracking data. Based on the analysis, the engine generates updates to structured inference instructions or blueprint-level configuration parameters. These updates are stored in optimization repository 514 and versioned per document type and extraction configuration. Updated parameters may be deployed automatically or queued for review, enabling targeted refinement of extraction behavior and schema alignment in future executions.

In an embodiment, query execution engine 510 is operable to log query execution events to query and prompt database 530. For example, when a query such as "retrieve ending capital balance for Fund X as of Q3 2023" is executed, the system records the parsed prompt, the structured query logic, and the resulting value (e.g., $3,200,000). If the returned value fails downstream validation—such as a cross-period consistency check—the system appends a flag to the query log entry indicating a semantic mismatch or extraction anomaly. The system may also capture additional indicators, such as user corrections, overrides, or latency metrics, which inform subsequent optimization logic.

In accordance with various embodiments, query execution data is retrieved by extraction prompt refinement module 512 for analysis in downstream optimization steps. This data may be filtered by prompt type, fund schema, document class, or blueprint identifier to enable context-aware refinement. The retrieved records serve as the technical foundation for modeling prompt effectiveness, identifying failure patterns, and adapting future prompt construction logic based on empirical system performance.

At step 904, the system analyzes extraction performance using the query execution data obtained in step 902. In various embodiments, extraction prompt refinement module 512 is operable to evaluate historical query logs and structured outputs to identify prompt characteristics correlated with extraction quality, accuracy, and semantic alignment. This performance analysis is executed by the system through model-based scoring, statistical profiling, and blueprint-aware consistency checks, thereby enabling the system to identify which prompts or extraction instructions produced reliable, schema-conformant results and which led to anomalies, inconsistencies, or validation errors.

For example, when analyzing prompt logs from recent extractions applied to capital call notices, the system identifies that the prompt "What amount was requested from the investor?" yields extraction confidence scores below 0.75 across 40% of documents. In comparison, the alternate prompt "Retrieve the Capital Called amount" consistently produces structured values that pass downstream validation checks. Extraction prompt refinement module 512 logs the prompt performance metrics—such as average confidence score, validation pass rate, and field ambiguity rate—for each variant. This data is associated with the document class ("capital call notice"), fund domain ("private equity"), and blueprint version, enabling precise refinement targeting during prompt template updates.

In an embodiment, the system computes extraction performance metrics such as field-level confidence scores, reconciliation success rates, and cross-period consistency validation results. For example, if a prior prompt "Retrieve NAV for Fund X" consistently results in structured outputs that pass all validation checks across reporting periods, the prompt pattern is tagged as high-performing. Conversely, if the prompt "Ending Balance for Fund X" yields inconsistent or ambiguous field extractions that trigger anomaly detection, the pattern is marked for refinement. More specifically, the system performs statistical aggregation over prompt classes, document types, and blueprint versions to detect patterns of underperformance. In certain embodiments, blueprint-specific failure signatures—such as frequent misalignment of field labels or incorrect entity bindings—are used to localize the source of extraction variance. These indicators are appended to the performance log and used to train or update prompt refinement strategies in step 906. By executing this evaluation within the system, extraction performance is assessed using structured, machine-interpretable criteria that are integrated into downstream refinement logic.

At step 906, the system refines structured inference instructions iteratively based on extraction performance metrics and anomaly feedback. In various embodiments, extraction prompt refinement module 512 is operable to adjust blueprint-aligned extraction logic by evaluating which structured inference instructions produced schema-conformant outputs and which resulted in validation exceptions, ambiguous values, or field extraction failures. This refinement is executed entirely by the system and represents an automated optimization of the underlying blueprint configurations, including semantic anchors, context windows, and rule-based disambiguation logic. For example, if the instruction "extract value following 'Ending NAV'" produces inconsistent results across multiple document formats, the module replaces it with a conditional instruction that evaluates both token position and font weight, as defined in the blueprint metadata for the corresponding fund type.

More specifically, extraction prompt refinement module 512 maintains an internal registry of structured inference instruction variants and their associated performance metrics. Using this registry, the system is operable to update active blueprint configurations by adjusting instruction parameters such as token proximity thresholds, alternate semantic labels, or positional parsing rules. For example, if the instruction "extract value located below 'Capital Called'" repeatedly fails validation in certain document layouts, the module may refine the instruction to also consider the proximity to left-aligned labels or tabular anchors defined in blueprint ID BP-PE-CALL-V4. The revised instruction set is then versioned, stored, and propagated to parsing and text extraction engine 312 for application during subsequent document processing.

In accordance with various embodiments, these refinements are executed automatically by the system and informed by validation outcomes, anomaly detection triggers, and blueprint-specific performance history. This enables the system to continuously improve extraction accuracy and reduce downstream reconciliation errors through system-driven adjustment of structured inference instructions, rather than through manual tuning or user intervention.

At step 908, the system updates query optimization parameters using the refined structured inference instructions and associated extraction performance data. In various embodiments, extraction prompt refinement module 512 transmits updated blueprint configurations and field-level performance indicators to query execution engine 510, which is operable to revise its parameter set governing how future queries are interpreted, resolved, and matched to extraction logic. This parameter update process is executed programmatically by the system and supports adaptive improvement of semantic alignment, field disambiguation accuracy, and result consistency in subsequent querying workflows.

More specifically, the system modifies internal query optimization settings—such as vector space proximity thresholds, field-scoring weights, ranking heuristics, disambiguation rule preferences, and layout zone sensitivity parameters—based on which prior extraction attempts yielded schema-conformant outputs versus those that produced anomalies or validation failures. The updated parameters are written to query and prompt database 530 and tagged with blueprint identifiers, reporting intervals, and document classification metadata to enable selective retrieval in future executions.

In an embodiment, query execution engine 510 adjusts its query parsing behavior to favor structured inference instructions that, based on performance logs, have yielded high-confidence extractions with low anomaly rates. For example, if a prior inference instruction linked the phrase "NAV" to the canonical field "Ending Capital Balance" with consistent reconciliation success, the system raises the match confidence for that mapping in the corresponding fund class and document type. Conversely, if an instruction relying on tabular layout assumptions fails in documents lacking clear column delineation, the engine may reduce reliance on spatial layout cues for that document archetype and elevate token-frequency based disambiguation rules instead.

As another example, the system may update the query disambiguation tree associated with blueprint BP-HF-CAP-STMT-QTR-V2 to favor bold-weighted semantic anchors over left-aligned headers when resolving ambiguous field references in capital account statements. This adjustment is based on logged extraction failures where left-aligned anchors led to incorrect field resolution. The updated decision path is encoded as a parameter rule set and version-controlled within query and prompt database 530. These modifications enable subsequent queries—such as "What was the NAV in Q2?"—to resolve more accurately based on the improved extraction heuristics and context-aware matching parameters.

In accordance with various embodiments, all updates to query optimization parameters are logged with timestamped metadata, version tags, and triggering rationale. This metadata supports auditability, rollback scenarios, and administrator review of parameter evolution. The updated parameters are applied in subsequent runs by query execution engine 510 during semantic parsing, extraction instruction resolution, and scoring of candidate field matches.

At step 910, the system provides optimized extraction queries for use in subsequent document parsing workflows. In various embodiments, extraction prompt refinement module 512 and query execution engine 510 are operable to generate structured inference instructions that reflect the refined blueprint configurations and updated query optimization parameters resulting from step 908. These optimized extraction queries are system-generated and configured to align semantically and structurally with the specific characteristics of future incoming documents, as determined by document classification engine 310 and associated blueprint selection logic.

More specifically, the system constructs optimized extraction queries by synthesizing prior high-confidence instruction patterns, updated semantic anchors, and parameterized rule sets tuned for the fund class, document type, and blueprint version. The resulting structured inference instructions are represented in a machine-readable format and stored in query and prompt database 530, indexed by blueprint ID, document classification, and performance tag. These instructions are retrievable by parsing and text extraction engine 312 during the execution of semantic parsing routines for new documents that match the indexed configuration.

In an embodiment, when a new capital account statement is received and classified as belonging to the "hedge fund" domain and matched to blueprint ID BP-HF-CAP-STMT-QTR-V2, query execution engine 510 retrieves the optimized extraction queries associated with this configuration. These queries may include revised token-label mappings (e.g., "ending_capital_balance"→"NAV"), updated layout resolution logic (e.g., prioritize vertically centered bold phrases), and adjusted disambiguation paths (e.g., prefer tabular row headers over column anchors when both are present). The engine applies these queries during the parsing sequence, resulting in schema-conformant outputs with improved field resolution fidelity and reduced anomaly occurrence.

In accordance with various embodiments, the optimized extraction queries are deployed dynamically at runtime and may be further adjusted using real-time feedback from anomaly detection engine 410 or validation results from data validation and integrity system 144. This dynamic incorporation ensures that the system continually evolves and adapts its extraction strategy based on cumulative operational feedback, thereby maintaining alignment between evolving document structures and the semantic field expectations encoded in blueprint configurations.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Any of the above-mentioned systems, units, modules, engines, controllers, interfaces, components, or the like may comprise hardware and/or software as described herein. For example, the systems described in association with document ingestion and preprocessing system 140, data processing and transformation system 142, data validation and integrity system 144, structured data management and output system 146, adaptive query execution and optimization system 148, blueprint and configuration database 150, and subcomponents thereof may comprise computing hardware and/or software as described herein in association with the figures. Furthermore, any of the above-mentioned systems, units, modules, engines, controllers, interfaces, components, or the like may use and/or comprise an application programming interface (API) for communicating with other systems, units, modules, engines, controllers, interfaces, components, or the like for obtaining and/or providing data or information.

Figure 10:
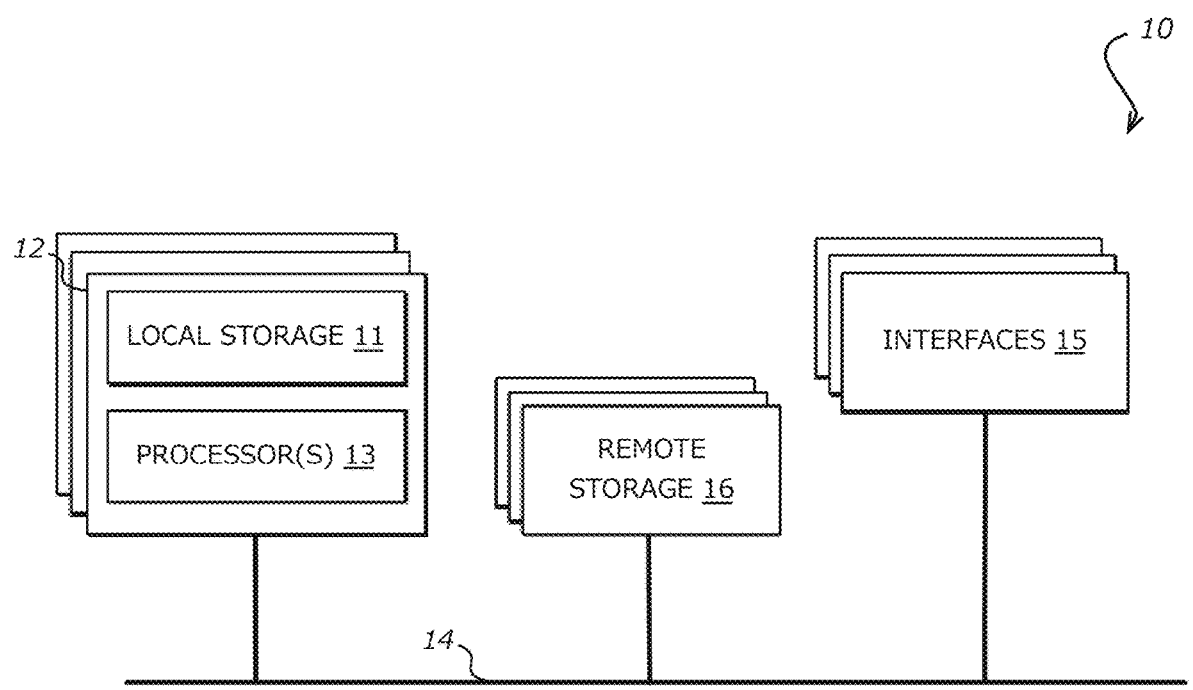
FIG. 10 illustrates an example device-level architecture that can support various embodiments.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
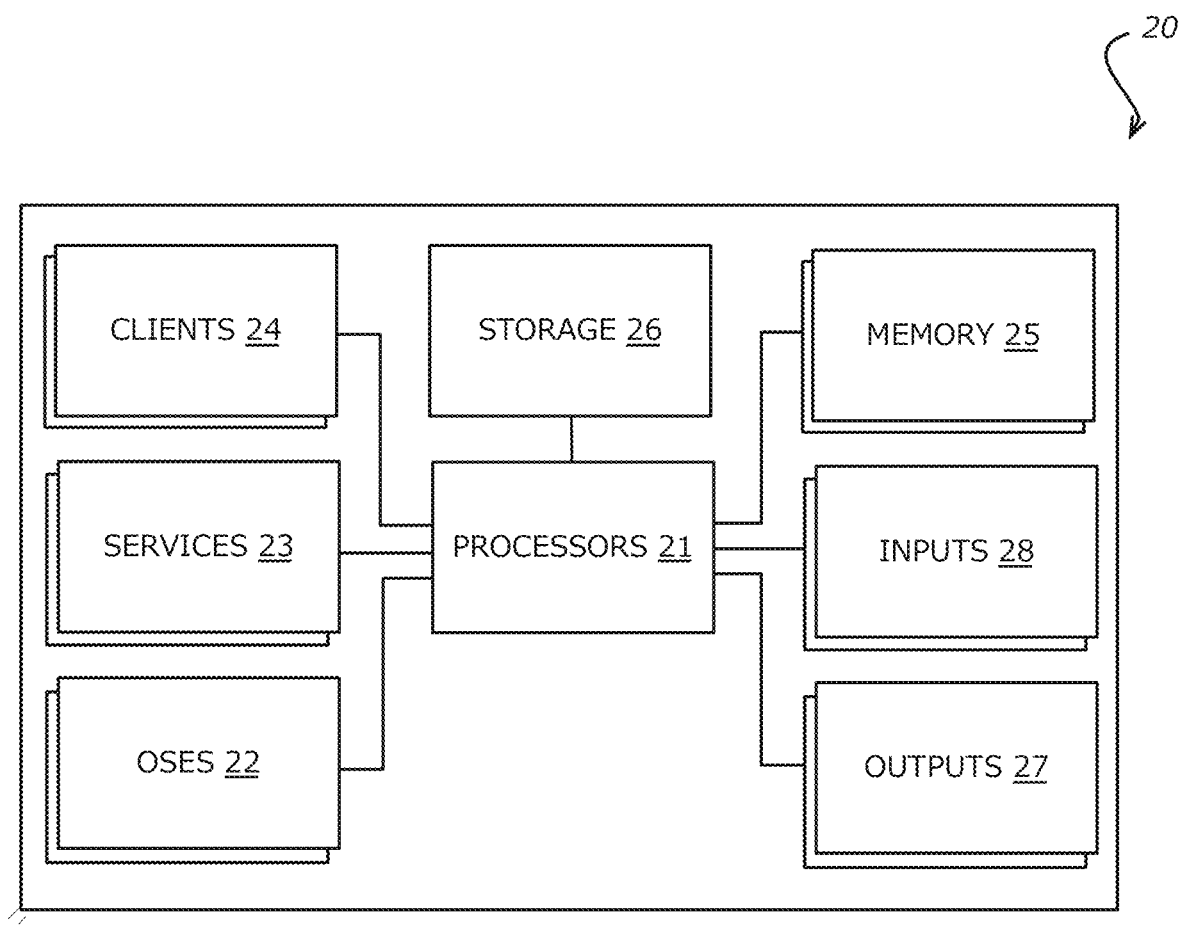
FIG. 11 illustrates components of a computing device in accordance with various embodiments.

In some embodiments, systems may be implemented on a standalone computing system. Referring now to FIG. 11, there is shown a block diagram depicting a typical exemplary architecture of one or more embodiments or components thereof on a standalone computing system. Computing device 20 includes processors 21 that may run software that carry out one or more functions or applications of embodiments, such as for example a client application. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
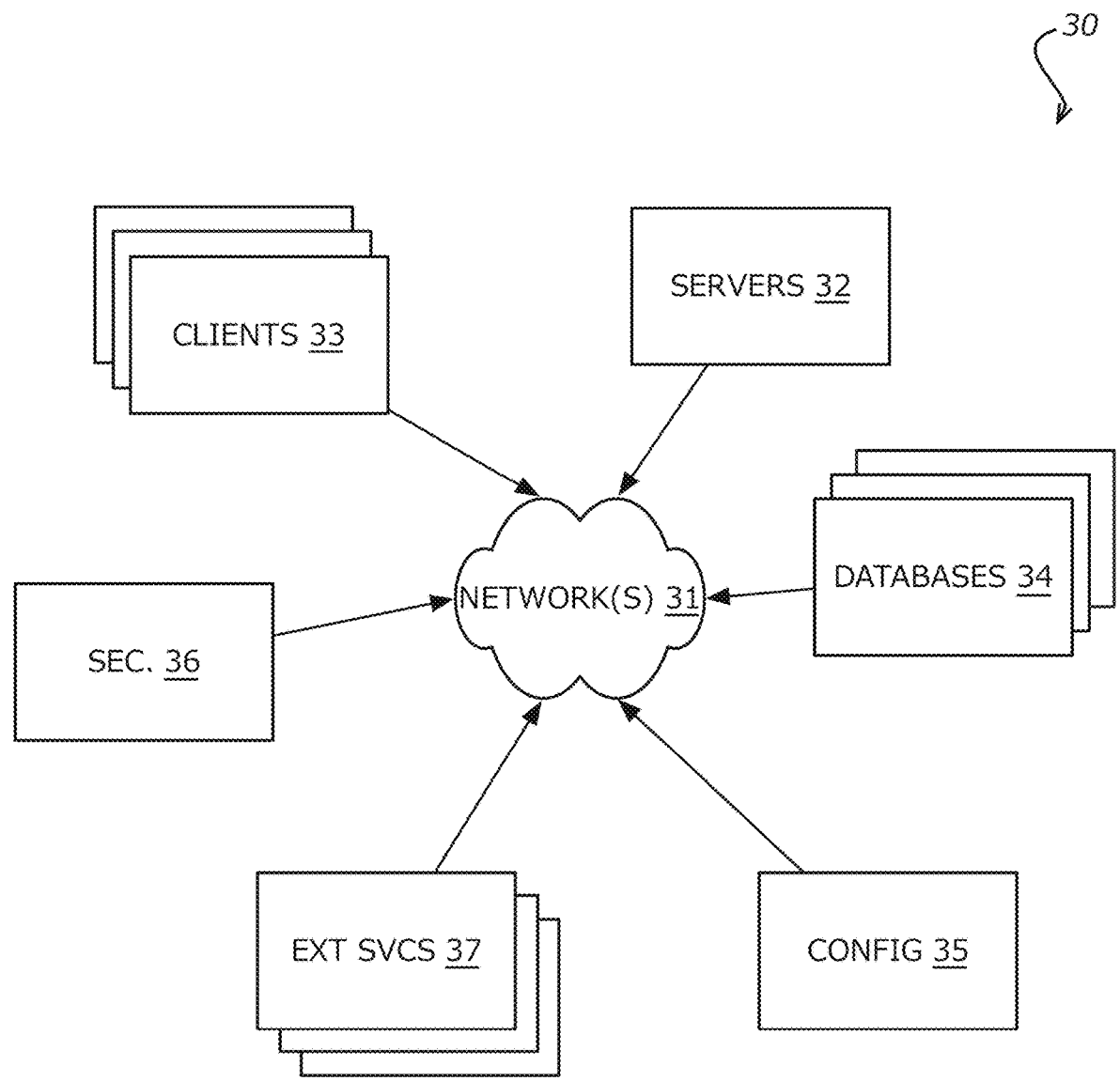
FIG. 12 illustrates an exemplary architecture of a system in accordance with various embodiments.

In some embodiments, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications are implemented on a smartphone or other electronic device, client applications may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 13:
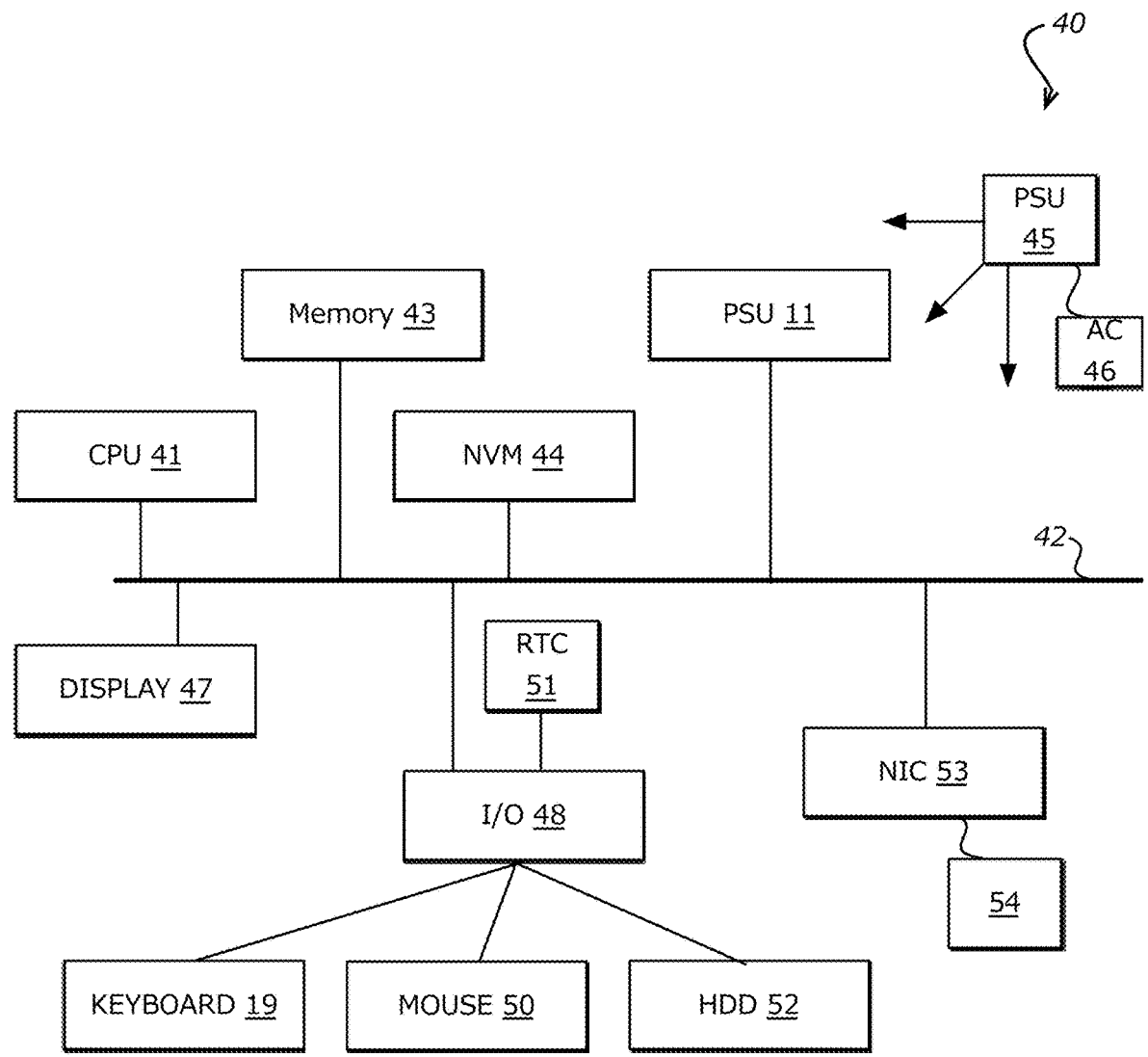
FIG. 13 illustrates components of a computing device in accordance with various embodiments.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

ADDITIONAL CONSIDERATIONS

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for facilitating database queries through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computing system for transforming document data into schema-conformant structured outputs, the computing system comprising:
 a processor; and
 a memory storing instructions that, when executed by the processor, cause the computing system to:
  obtain document data from one or more data sources, the document data comprising one or more multi-format structured documents, individual multi-format structured documents being encoded in a structured, semi-structured, or unstructured format;
  classify each individual multi-format structured document using machine-executed vector-based modeling and structural feature analysis to determine a document type and a document class;
  determine, for each individual multi-format structured document, a schema-conformant extraction configuration based on the document type and the document class;
  select an extraction configuration for each classified document based on the document type and the document class, the extraction configuration comprising machine-executable instructions for document parsing based on semantic structure and layout characteristics;
  extract semantic data from each document using the extraction configuration by machine-executed identification of field candidates, application of structured inference instructions, and isolation of field values based on document layout and semantic context;
  transform the semantic data into schema-conformant structured outputs using machine-executed transformation logic;
  validate schema-conformant structured outputs against temporal and domain-specific consistency constraints using machine-executed validation logic; and
  generate validated structured data output.

2. The computing system of claim 1, wherein classifying individual multi-format structured documents using machine-executed vector-based modeling and structural feature analysis comprises:
 encoding textual content of each multi-format structured document into a latent vector space using a transformer-based model trained on domain-relevant textual corpora to generate vector representations of document content;
 comparing the vector representations against a labeled index of document type-class pairs to generate similarity scores; and
 selecting a classification based on whether the similarity scores satisfy a predefined threshold or ranking criteria.

3. The computing system of claim 2, wherein refining the classification includes analyzing structural layout features of an individual multi-format structured document, the structural layout features comprising at least one of token frequency distributions, section headers, or tabular content indicators.

4. The computing system of claim 1, wherein determining a schema-conformant extraction configuration for a corresponding individual multi-format structured document includes retrieving an extraction configuration from a registry of configurations indexed by document type and document class.

5. The computing system of claim 1, wherein the extraction configuration comprises at least one of:
   (i) semantic anchors specifying contextual triggers for data extraction,
   (ii) field-specific parsing directives, or
   (iii) layout alignment parameters indicating spatial or hierarchical document regions.

6. The computing system of claim 1, wherein extracting semantic data using the extraction configuration comprises:
   encoding textual segments of each document using a tokenization process;
   identifying candidate regions within a corresponding individual multi-format structured document based on semantic anchors and layout zones defined by the extraction configuration;
   applying structured inference instructions to the candidate regions, the structured inference instructions comprising token-label mappings, context window constraints, or field type expectations; and
   extracting field values by isolating tokens or token groups that match the expected field definitions within each candidate region.

7. The computing system of claim 1, wherein transforming the semantic data into schema-conformant structured outputs comprises:
   applying normalization logic to standardize field formats and units;
   executing context-aware disambiguation to resolve ambiguous or overlapping values based on surrounding text and structural indicators; and
   applying rule-based post-processing validations to confirm field integrity based on schema constraints and historical field behavior.

8. The computing system of claim 1, wherein validating the schema-conformant structured outputs against temporal and domain-specific consistency constraints comprises:
   evaluating inter-field relationships across reporting periods; and
   executing schema-conformant validation logic retrieved from a validation rules and accounting logic database, the schema-conformant validation logic including rules for balance rollforwards, reporting frequency alignment, and domain-specific field dependencies.

9. The computing system of claim 1, wherein the validated structured data output comprises schema-aligned field representations, metadata annotations, and extraction configuration traceability information.

10. The computing system of claim 9, further comprising instructions that, when executed by the processor, enable the computing system to generate one or more visualizations based on the validated structured data output, the one or more visualizations including field-level reconciliation summaries, validation status indicators, or anomaly flags.

11. A computer-implemented method for transforming document data into schema-conformant structured outputs, the computer-implemented method comprising:
   obtaining document data from one or more data sources, the document data comprising one or more multi-format structured documents, individual multi-format structured documents being encoded in a structured, semi-structured, or unstructured format;
   classifying each individual multi-format structured document using machine-executed vector-based modeling and structural feature analysis to determine a document type and a document class;
   determining, for each individual multi-format structured document, a schema-conformant extraction configuration based on the document type and the document class;
   selecting an extraction configuration for each classified document based on the document type and the document class, the extraction configuration comprising machine-executable instructions for document parsing based on semantic structure and layout characteristics;
   extracting semantic data from each document using the extraction configuration by machine-executed identification of field candidates, application of structured inference instructions, and isolation of field values based on document layout and semantic context;
   transforming the semantic data into schema-conformant structured outputs using machine-executed transformation logic;
   validating the schema-conformant structured outputs against temporal and domain-specific consistency constraints using machine-executed validation logic; and
   generating validated structured data output.

12. The computer-implemented method of claim 11, wherein classifying individual multi-format structured documents using machine-executed vector-based modeling and structural feature analysis comprises:
   encoding textual content of each multi-format structured document into a latent vector space using a transformer-based model trained on domain-relevant textual corpora to generate vector representations of document content;
   comparing the vector representations against a labeled index of document type-class pairs to generate similarity scores; and
   selecting a classification based on whether the similarity scores satisfy a predefined threshold or ranking criteria.

13. The computer-implemented method of claim 12, wherein refining the classification includes analyzing structural layout features of a corresponding individual multi-format structured document, the structural layout features comprising at least one of token frequency distributions, section headers, or tabular content indicators.

14. The computer-implemented method of claim 11, wherein determining a schema-conformant extraction configuration for a corresponding individual multi-format structured document includes retrieving an extraction configuration from a registry of configurations indexed by document type and document class.

15. The computer-implemented method of claim 11, wherein the extraction configuration comprises at least one of:
   (i) semantic anchors specifying contextual triggers for data extraction,
   (ii) field-specific parsing directives, or
   (iii) layout alignment parameters indicating spatial or hierarchical document regions.

16. The computer-implemented method of claim 11, wherein extracting semantic data using the extraction configuration comprises:
   encoding textual segments of each document using a tokenization process;

identifying candidate regions within a corresponding individual multi-format structured document based on semantic anchors and layout zones defined by the extraction configuration;

applying structured inference instructions to the candidate regions, the structured inference instructions comprising token-label mappings, context window constraints, or field type expectations; and extracting field values by isolating tokens or token groups that match the field definitions within each candidate region.

17. A non-transitory computer-readable storage medium storing instructions that, when executed by at least one processor of a computing system, cause the computing system to:

obtain document data from one or more data sources, the document data comprising one or more multi-format structured documents, individual multi-format structured documents being encoded in a structured, semi-structured, or unstructured format;

classify each individual multi-format structured document using machine-executed vector-based modeling and structural feature analysis to determine a document type and a document class;

determine, for each individual multi-format structured document, a schema-conformant extraction configuration based on the document type and the document class;

select an extraction configuration for each classified document based on the document type and the document class, the extraction configuration comprising machine-executable instructions for document parsing based on semantic structure and layout characteristics;

extract semantic data from each document using the extraction configuration by machine-executed identification of field candidates, application of structured inference instructions, and isolation of field values based on document layout and semantic context;

transform the semantic data into schema-conformant structured outputs using machine-executed transformation logic;

validate the schema-conformant structured outputs against temporal and domain-specific consistency constraints using machine-executed validation logic; and generate validated structured data output.

18. The non-transitory computer-readable storage medium of claim 17, wherein the instructions further cause the computing system to:

perform machine-executed reconciliation of extracted entity references within the schema-conformant structured outputs;

identify potential canonical matches for extracted entities based on one or more similarity metrics and contextual indicators;

resolve discrepancies among conflicting entity representations using scoring logic and document-derived features; and update structured data records with reconciled entity identifiers.

19. The non-transitory computer-readable storage medium of claim 17, wherein the instructions further cause the computing system to:

evaluate temporal consistency of structured outputs using prior data records and machine-executed reconciliation logic;

analyze reported field values to identify and disaggregate embedded data structures based on layout and contextual attributes;

perform validation checks across periods using schema-aligned models and predefined tolerance parameters; and generate indicators for data anomalies based on validation outcomes.

20. The non-transitory computer-readable storage medium of claim 17, wherein the instructions further cause the computing system to:

evaluate performance of structured inference instructions based on historical extraction results and validation outcomes;

identify patterns of anomaly recurrence within the historical extraction results;

associate the patterns of anomaly recurrence with corresponding document classifications or extraction configurations; and iteratively refine the structured inference instructions based on the patterns of anomaly recurrence.

* * * * *